US008970576B2

(12) United States Patent
Azami

(10) Patent No.: US 8,970,576 B2

(45) Date of Patent: Mar. 3, 2015

(54) IMAGE DISPLAY DEVICE AND DRIVING METHOD THEREOF

(71) Applicant: Semiconductor Energy Laboratory Co., Ltd., Atsugi (JP)

(72) Inventor: Munehiro Azami, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

(21) Appl. No.: 13/896,426

(22) Filed: May 17, 2013

(65) Prior Publication Data

US 2013/0249890 A1 Sep. 26, 2013

Related U.S. Application Data

(60) Division of application No. 12/761,659, filed on Apr. 16, 2010, now Pat. No. 8,446,353, which is a continuation of application No. 11/498,166, filed on Aug. 3, 2006, now Pat. No. 7,710,375, which is a (Continued)

(30) Foreign Application Priority Data

Dec. 27, 1999 (JP) .................................... 11-371126

(51) Int. Cl.

*G06F 3/038* (2013.01)
*G09G 5/00* (2006.01)

(Continued)

(52) U.S. Cl.

CPC ...... *G09G 3/3696* (2013.01); *G09G 2320/0276* (2013.01); *G09G 3/3688* (2013.01);

(Continued)

(58) Field of Classification Search

CPC .......... G09G 2330/021; G09G 3/3696; G09G 3/3233; G09G 5/006; G09G 5/008; G09G 5/18

USPC ........................... 345/87–100, 204, 211–213

See application file for complete search history.

(56) References Cited

U.S. PATENT DOCUMENTS

| | | | |
|---|---|---|---|
| 4,904,989 | A | 2/1990 | Matsui et al. |
| 5,247,190 | A | 9/1993 | Friend et al. |

(Continued)

FOREIGN PATENT DOCUMENTS

| | | | |
|---|---|---|---|
| EP | 0086349 | A | 8/1983 |
| EP | 0 391 655 | A | 10/1990 |

(Continued)

OTHER PUBLICATIONS

Schenk et al., "Polymers for Light Emitting Diodes," Euro Display Proceedings 1999, pp. 33-37.

*Primary Examiner* — Kimnhung Nguyen

(74) *Attorney, Agent, or Firm* — Eric J. Robinson; Robinson Intellectual Property Law Office, P.C.

(57) ABSTRACT

A novel driving method is provided in which source line inverting drive or dot inverting drive is performed for a case of driving a plurality of source lines by one D/A converter circuit in a source signal line driver circuit of an active matrix image display drive that corresponds to digital image signal input. In a first driving method of the present invention, two systems of grey-scale electric power supply lines are supplied to a source signal line driver circuit in order to obtain output having differing polarities from a D/A converter circuit, switches for connecting to the two systems of grey-scale electric power supply lines are prepared in each D/A converter circuit, the grey-scale electric power supply lines connected to each D/A converter circuit are switched in accordance with a control signal input to the switches, and source line inverting drive or dot inverting drive are performed.

20 Claims, 44 Drawing Sheets

Related U.S. Application Data division of application No. 10/861,366, filed on Jun. 7, 2004, now Pat. No. 7,123,227, which is a division of application No. 09/742,670, filed on Dec. 22, 2000, now Pat. No. 6,750,835.

(51) Int. Cl.
*G09G 3/36* (2006.01)
*G09G 3/32* (2006.01)

(52) U.S. Cl.
CPC ............ *G09G3/3614* (2013.01); *G09G 3/3275* (2013.01); *G09G 2310/027* (2013.01); *G09G 2310/0297* (2013.01); *G09G 2300/0809* (2013.01)
USPC .............................. 345/212; 345/98; 345/213

(56) References Cited

U.S. PATENT DOCUMENTS

| | | | |
|---|---|---|---|
| 5,399,502 | A | 3/1995 | Friend et al. |
| 5,414,443 | A | 5/1995 | Kanatani et al. |
| 5,523,772 | A | 6/1996 | Lee |
| 5,585,816 | A | 12/1996 | Scheffer et al. |
| 5,614,730 | A | 3/1997 | Nakazawa et al. |
| 5,643,826 | A | 7/1997 | Ohtani et al. |
| 5,648,793 | A | 7/1997 | Chen |
| 5,748,165 | A | 5/1998 | Kubota et al. |
| 5,774,106 | A | 6/1998 | Nitta et al. |
| 5,790,092 | A | 8/1998 | Moriyama |
| 5,796,379 | A | 8/1998 | Enomoto et al. |
| 5,892,493 | A | 4/1999 | Enami et al. |
| 5,923,962 | A | 7/1999 | Ohtani et al. |
| 5,966,193 | A | 10/1999 | Zhang et al. |
| 6,097,362 | A | 8/2000 | Kim |
| 6,184,855 | B1 | 2/2001 | Kobayashi et al. |
| 6,256,079 | B1 | 7/2001 | Matsushima |
| 6,297,816 | B1 | 10/2001 | Nishitani et al. |
| 6,310,616 | B1 | 10/2001 | Yanagi et al. |
| 6,323,851 | B1 | 11/2001 | Nakanishi |
| 6,380,917 | B2 | 4/2002 | Matsueda et al. |
| 6,462,722 | B1 | 10/2002 | Kimura et al. |
| 6,462,735 | B2 | 10/2002 | Naito |
| 6,522,315 | B2 | 2/2003 | Ozawa et al. |
| 6,549,196 | B1 | 4/2003 | Taguchi et al. |
| 6,618,029 | B1 | 9/2003 | Ozawa |
| 6,750,835 | B2 | 6/2004 | Azami |
| 6,806,859 | B1 | 10/2004 | Kanoh et al. |
| 6,839,045 | B2 | 1/2005 | Ozawa et al. |
| 6,873,312 | B2 | 3/2005 | Matsueda |
| 6,909,114 | B1 | 6/2005 | Yamazaki |
| 6,980,275 | B1 | 12/2005 | Konuma et al. |
| 7,022,556 | B1 | 4/2006 | Adachi |
| RE39,366 | E | 10/2006 | Nitta et al. |
| 7,172,928 | B2 | 2/2007 | Yamazaki |
| 7,180,483 | B2 | 2/2007 | Kimura et al. |
| 7,221,339 | B2 | 5/2007 | Ozawa et al. |
| 7,253,793 | B2 | 8/2007 | Ozawa et al. |
| 7,397,451 | B2 | 7/2008 | Ozawa |
| 7,405,432 | B2 | 7/2008 | Adachi |
| 7,439,543 | B2 | 10/2008 | Yamazaki |
| 7,460,094 | B2 | 12/2008 | Ozawa |
| RE40,916 | E | 9/2009 | Nitta et al. |
| RE40,973 | E | 11/2009 | Nitta et al. |
| 7,710,364 | B2 | 5/2010 | Ozawa et al. |
| 7,880,696 | B2 | 2/2011 | Ozawa et al. |
| 8,049,275 | B2 | 11/2011 | Yamazaki |
| 8,154,199 | B2 | 4/2012 | Ozawa et al. |
| 8,188,647 | B2 | 5/2012 | Kimura et al. |
| 8,247,967 | B2 | 8/2012 | Ozawa et al. |
| 8,297,991 | B2 | 10/2012 | Adachi |
| 8,310,475 | B2 | 11/2012 | Ozawa |
| 8,310,476 | B2 | 11/2012 | Ozawa |
| 8,334,858 | B2 | 12/2012 | Ozawa |
| 8,354,978 | B2 | 1/2013 | Ozawa et al. |
| 8,362,489 | B2 | 1/2013 | Kimura et al. |
| 8,446,353 | B2 * | 5/2013 | Azami ............................ 345/89 |
| 2002/0105493 | A1 | 8/2002 | Komiya |
| 2002/0145602 | A1 | 10/2002 | Matsueda |
| 2003/0151568 | A1 | 8/2003 | Ozawa |
| 2003/0231273 | A1 | 12/2003 | Kimura et al. |
| 2006/0132420 | A1 | 6/2006 | Yoshida et al. |
| 2008/0246700 | A1 | 10/2008 | Ozawa et al. |
| 2012/0040501 | A1 | 2/2012 | Yamazaki |
| 2012/0061718 | A1 | 3/2012 | Yamazaki et al. |
| 2012/0074418 | A1 | 3/2012 | Yamazaki |
| 2012/0299902 | A1 | 11/2012 | Ozawa et al. |

FOREIGN PATENT DOCUMENTS

| | | | |
|---|---|---|---|
| EP | 0484965 | A | 5/1992 |
| EP | 0 837 446 | A | 4/1998 |
| EP | 0895219 | A | 2/1999 |
| EP | 0917127 | A | 5/1999 |
| EP | 0 938 074 | | 8/1999 |
| EP | 0935229 | A | 8/1999 |
| EP | 1255240 | A | 11/2002 |
| EP | 1336953 | A | 8/2003 |
| EP | 1337131 | A | 8/2003 |
| EP | 1359789 | A | 11/2003 |
| EP | 1363265 | A | 11/2003 |
| EP | 1505650 | A | 2/2005 |
| EP | 1505651 | A | 2/2005 |
| EP | 1505652 | A | 2/2005 |
| EP | 1619654 | A | 1/2006 |
| EP | 1830342 | A | 9/2007 |
| EP | 1830343 | A | 9/2007 |
| EP | 1830344 | A | 9/2007 |
| EP | 2112693 | A | 10/2009 |
| JP | 58-140781 | A | 8/1983 |
| JP | 59-195268 | A | 11/1984 |
| JP | 01-282587 | A | 11/1989 |
| JP | 03-089393 | A | 4/1991 |
| JP | 04-052684 | A | 2/1992 |
| JP | 04-333828 | A | 11/1992 |
| JP | 05-027266 | A | 2/1993 |
| JP | 05-040451 | A | 2/1993 |
| JP | 05-257164 | A | 10/1993 |
| JP | 06-252402 | A | 9/1994 |
| JP | 07-130652 | | 5/1995 |
| JP | 07-140905 | A | 6/1995 |
| JP | 07-294959 | A | 11/1995 |
| JP | 08-087251 | A | 4/1996 |
| JP | 08-137443 | A | 5/1996 |
| JP | 08-171101 | A | 7/1996 |
| JP | 09-026601 | A | 1/1997 |
| JP | 09-026765 | A | 1/1997 |
| JP | 09-114420 | A | 5/1997 |
| JP | 10-031235 | A | 2/1998 |
| JP | 10-069256 | A | 3/1998 |
| JP | 10-134959 | | 5/1998 |
| JP | 10-177371 | A | 6/1998 |
| JP | 10-213796 | A | 8/1998 |
| JP | 11-003068 | A | 1/1999 |
| JP | 11-024606 | A | 1/1999 |
| JP | 11-102174 | A | 4/1999 |
| JP | 11-167373 | | 6/1999 |
| JP | 11-175042 | A | 7/1999 |
| JP | 11-249629 | A | 9/1999 |
| JP | 11-272241 | A | 10/1999 |
| JP | 2000-137467 | A | 5/2000 |
| WO | WO 90/13148 | | 11/1990 |
| WO | WO-98/36407 | | 8/1998 |

* cited by examiner

P/A converter circuit A source signal line selection circuit A

IMAGE DISPLAY DEVICE AND DRIVING METHOD THEREOF

BACKGROUND OF THE INVENTION

1. Field of the Invention

The present invention relates to an image display device for performing display of information such as a image by switching elements and pixels arranged in a matrix state (an active matrix image display device). More particular, the present invention relates to a digital type driving method, and to an image display device having the digital type driving method.

2. Description of the Related Art

Techniques of manufacturing a semiconductor device formed of a semiconductor thin film on a low cost glass substrate, for example a thin film transistor (TFT), have been rapidly developing recently. This is because the demand for active matrix liquid crystal display devices, one type of active matrix image display device, has risen.

In addition, active matrix EL display devices (hereafter referred to as EL display devices), one type of active matrix image display device using a self-illuminating electroluminescence (EL) element, are being actively researched.

An active matrix liquid crystal display device as a typical example of an active matrix image display device, is explained below.

As shown in FIG. 40, an active matrix liquid crystal display device has a source signal line driver circuit 101, a gate signal line driver circuit 102, and a pixel array portion 103 arranged in a matrix state. The source signal line driver circuit 101 samples an input image signal synchronously with a timing signal, such as a clock signal, and writes data to source signal lines 104. The gate signal line driver circuit 102 selects gate signal lines 105 in order and synchronously with a timing signal, such as a clock signal, and controls TFTs 106, which are switching elements within each pixel of the pixel array portion 103, to be on or off. Thus the data written into each source signal line 104 is written in order to each pixel.

There are analog type and digital type methods of driving the source signal line driver circuits, and a digital active matrix liquid crystal display device capable of high definition and high speed operation has been gaining attention.

A conventional digital source signal line driver circuit is shown in FIG. 41. Reference numeral 201 denotes a shift register portion in FIG. 41, and is composed of basic shift register circuits 202 containing circuits such as flip flop circuits. A sampling pulse is sent in order to latch 1 circuits (LAT1) 203 synchronously with a clock signal CLK when a start pulse SP is input to the shift register portion 201.

The latch 1 circuits (LAT1) 203 store in order n-bit digital image signals (where n is a natural number) supplied from a data bus line DATA synchronously with the sampling pulse from the shift register portion.

After one single horizontal pixel portion signal is written to the LAT1 group, the signals stored in each latch 1 circuit (LAT1) 203 are output at the same time to latch 2 circuits (LAT2) 204 synchronously with a latch pulse sent from a latch signal bus line LP.

The start pulse SP is again input when the digital image signal is stored in the latch (2) circuits (LAT2) 204, and the digital image signal for the next pixel row portion is newly written into the LAT1 group. At this point the previous pixel row portion of the digital image signal is stored in the LAT2 group, and an analog image signal corresponding to the digital image signal, in accordance with a D/A conversion circuit (digital/analog signal conversion circuit) 205, is written to each source signal line.

A voltage which has its polarity inverted each frame in order to increase reliability is imparted to a liquid crystal in driving the liquid crystal display device, an AC driving method. In order to prevent flicker in the AC driving method, there are: a gate line inverting driver which performs polarity inversion of the voltage written into the source signal lines for each single gate signal line; a source line inverting driver which writes a polarity inverted voltage for each single source signal line; and a dot inversion driver for writing a voltage which has its polarity inverted in units of one pixel in the horizontal and vertical directions.

Two systems of a plurality of grey-scale electric power supply lines for supplying the D/A conversion circuit 205 are shown in FIG. 41. Vref(+) with a positive polarity, and Vref (−) with a negative polarity, are the grey-scale electric power supply lines for outputting from each D/A converter circuit. Provided that there is a connection like that shown in FIG. 41, a voltage possessing a positive polarity is input to a first source signal line SL1, a voltage possessing a negative polarity is input to a second source signal line SL2, a voltage possessing a positive polarity is input to a third source signal line SL3, and a voltage possessing a negative polarity is input to a fourth source signal line SL4. Note that, if the polarity of the electric power supply voltage of the grey-scale electric power supply lines has its polarity inverted each frame in this state, then the source signal line driver circuit shown in FIG. 41 performs source line inversion driving. Further, provided that the electric power supply voltage of the grey-scale electric power supply lines has its polarity inverted for each gate signal line, then the source signal line driver circuit shown in FIG. 41 performs dot inversion driving.

Furthermore, differing from FIG. 41, provided that the electric power supply voltage of the grey-scale electric power supply lines has its polarity inverted for each gate signal line by only the input of one system of grey-scale power supply lines, then gate line inversion driving is performed (not shown in the figure).

The D/A converter circuits of FIG. 41 each drive one source signal line. However, when producing a high resolution, high definition liquid crystal display device, making the same number of D/A converter circuits which occupy a large surface area as the number of source signal lines is an impediment to reducing the size of the liquid crystal display device, desirable in recent years. A method of driving a plurality of source signal lines by one D/A conversion circuit has been proposed by Japanese Patent Application Laid-open No. Hei 11-167373.

An example of a composition of a source signal line driver circuit for driving four source signal lines by using one D/A conversion circuit is shown in FIG. 42. As is understood by comparing with FIG. 41, a parallel/serial converter circuit (P/S converter circuit) 301, a source signal line selection circuit 302, and a selection signal (SS) input to these circuit have been newly added. In spite of the addition of these circuits, provided that four source signal lines can be driven by one D/A conversion circuit, the effect of reducing the required number of D/A converter circuits to one-fourth has a large effect, and it becomes possible to reduce the surface area occupied by the source signal line driver circuit.

Even with this type of driving method in which a plurality of source signal lines are driven by one D/A converter circuit, it is necessary to perform AC driving of the liquid crystal, as stated above. With a conventional way of thinking, each D/A conversion circuit always outputs the same polarity during at least one horizontal write-in period. Accordingly, with a method of driving a plurality of source signal lines by one D/A converter circuit, the gate line inverting driver or the frame inverting driver was employed as the AC driver of the liquid crystal.

An explanation of the problem point associated with the conventional thinking of using the source line inverting driver or the dot inverting driver as a method of driving a plurality of source signal lines by one D/A converter circuit is made here using FIG. 43. A specific example of a case of driving four source signal lines by one D/A converter circuit is shown in FIG. 43. Similar to FIG. 41, grey-scale electric power supply lines are connected to adjacent D/A converter circuits so that the polarity of output from the D/A converter circuits is inverted, the polarity is inverted every four source signal lines, and it does not become a complete source line inverting driver. Similarly, it does not become a complete dot inverting driver. This cannot be considered sufficient provided that a high quality image is sought. Thus a novel driving method needs to be constructed in order to perform a method of source line inverting drive or a method of dot inverting drive when one D/A conversion circuit drives a plurality of source signal lines.

SUMMARY OF THE INVENTION

An object of the present invention is to provide such a novel driving method.

In order to obtain differing polarity output from D/A converter circuits in a first driving method of the present invention, two systems of grey-scale electric power supply lines supply a source signal line driver circuit, and there are switches for switching connection of each D/A converter circuit to the two systems of grey-scale electric power supply lines (hereafter referred to as connection switching switches). The grey-scale electric power supply lines connected to each D/A converter circuit are switched in accordance with a control signal input to the connection switching switches, and source line inverting drive or dot inverting drive is performed.

For convenience of explanation, grey-scale electric power supply lines for obtaining positive polarity output when connected to a D/A converter circuit are hereafter referred to as "plus polarity output grey-scale electric power supply lines" throughout this specification, and conversely, grey-scale electric power supply lines for obtaining negative polarity output when connected to a D/A converter circuit are hereafter referred to as "minus polarity output grey-scale electric power supply lines." Further, applying a voltage to each grey-scale electric power supply line connected to the D/A converter circuits so as to obtain plus polarity from the D/A converter circuits is referred to as "supplying a plus polarity output voltage to the grey-scale electric power supply lines." Similarly, applying a voltage to each grey-scale electric power supply line connected to the D/A converter circuits so as to obtain minus polarity from the D/A converter circuits is referred to as "supplying a minus polarity output voltage to the grey-scale electric power supply lines."

Note that, the electric power supply voltage of corresponding grey-scale electric power supply lines have an inverted polarity relationship, respectively, for each plus polarity output grey-scale electric power supply line and each minus polarity output grey-scale electric power supply line. Therefore, if the electric power supply voltage polarity of all of one set of grey-scale electric power supply lines is inverted, then they can assume the same role as the other set of grey-scale electric power supply lines.

In order to perform source line inverting drive by the composition of the above first driving method, the following is done. Plus polarity output grey-scale electric power supply lines are connected to the D/A converter circuits in a period for selecting odd numbered source signal lines, and minus polarity output grey-scale electric power supply lines are connected to the D/A converter circuits in a period for selecting even number source signal lines within each gate signal line selection period of a certain frame period. Within each gate signal line selection period of the next frame period, minus polarity output grey-scale electric power supply lines are connected to the D/A converter circuits in the period for selecting odd numbered source signal lines, and plus polarity output grey-scale electric power supply lines are connected to the D/A converter circuits in the period for selecting even number source signal lines. By thus controlling the connection switching switch control signal, source line inverting drive becomes possible.

In particular, in the above driving method, by arranging together the periods for selecting the odd numbered source signal lines or the period for selecting the even numbered source signal lines into a certain fixed period of a gate signal line selection period, the period of the control signal of the connection switching switch can be lengthened, and at the same time the operating load on the circuit can be reduced.

Further, in order to perform dot inverting drive by the above first driving method composition, the following is done. Plus polarity output grey-scale electric power supply lines are connected to the D/A converter circuits in a period for selecting odd numbered source signal lines, and minus polarity output grey-scale electric power supply lines are connected to the D/A converter circuits in a period for selecting even number source signal lines within odd numbered gate signal line selection period of a certain frame period. Within even number gate signal line selection period of the same frame period, minus polarity output grey-scale electric power supply lines are connected to the D/A converter circuits in the period for selecting odd numbered source signal lines, and plus polarity output grey-scale electric power supply lines are connected to the D/A converter circuits in the period for selecting even number source signal lines. In addition, minus polarity output grey-scale electric power supply lines are connected to the D/A converter circuits in a period for selecting odd numbered source signal lines, and plus polarity output grey-scale electric power supply lines are connected to the D/A converter circuits in a period for selecting even number source signal lines within odd numbered gate signal line selection period of the next frame period. Then, within even number gate signal line selection period of the same frame period, plus polarity output grey-scale electric power supply lines are connected to the D/A converter circuits in the period for selecting odd numbered source signal lines, and minus polarity output grey-scale electric power supply lines are connected to the D/A converter circuits in the period for selecting even number source signal lines. By thus controlling the connection switching switch control signal, dot inverting drive becomes possible.

In particular, by dividing the period for selecting the odd numbered source signal lines and the period for selecting the even numbered source signal lines into a first half and a second half of each gate signal line selection period, the period of the connection switching switch control signal can be lengthened, and at the same time the operating load on the circuit can be reduced.

In a second driving method of the present invention, differing from the first method, one system of grey-scale electric power supply lines is supplied to a source signal line driver circuit, and is directly connected to each D/A converter circuit. The second driving method performs source line inverting drive and dot inverting drive by inverting the polarity of the electric power supply voltage of the grey-scale power supply lines.

In order to perform source line inverting drive by the composition of the above second driving method, the following is done. A plus polarity output voltage is supplied to the grey-scale electric power supply lines in a period for selecting odd numbered source signal lines, and a minus polarity output voltage is supplied to the grey-scale electric power supply lines in a period for selecting even number source signal lines within each gate signal line selection period of a certain frame period. Within each gate signal line selection period of the next frame period, a minus polarity output voltage is supplied to the grey-scale electric power supply lines in a period for selecting odd numbered source signal lines, and a plus polarity output voltage is supplied to the grey-scale electric power supply lines in a period for selecting even number source signal lines. By thus inverting the polarity of the electric power supply voltage of the grey-scale electric power supply lines, source line inverting drive becomes possible.

In particular, by arranging together the periods for selecting the odd numbered source signal lines or the period for selecting the even numbered source signal lines into a certain fixed period of a gate signal line selection period in the above driving method, the period for inverting the polarity of the electric power supply voltage of the grey-scale power supply lines can be lengthened, and at the same time the operating load on the circuit can be reduced.

Further, in order to perform dot inverting drive by the above second driving method composition, the following is done. A plus polarity output voltage is supplied to the grey-scale electric power supply lines in a period for selecting odd numbered source signal lines, and a minus polarity output voltage is supplied to the grey-scale electric power supply lines in a period for selecting even number source signal lines within odd numbered gate signal line selection period of a certain frame period. Then, within even number gate signal line selection period of the same frame period, a minus polarity output voltage is supplied to the grey-scale electric power supply lines in a period for selecting odd numbered source signal lines, and a plus polarity output voltage is supplied to the grey-scale electric power supply lines in a period for selecting even number source signal lines. In addition, a minus polarity output voltage is supplied to the grey-scale electric power supply lines in a period for selecting odd numbered source signal lines, and a plus polarity output voltage is supplied to the grey-scale electric power supply lines in a period for selecting even number source signal lines within odd numbered gate signal line selection period of the next frame period. Then, within even number gate signal line selection period of the same frame period, a plus polarity output voltage is supplied to the grey-scale electric power supply lines in a period for selecting odd numbered source signal lines, and a minus polarity output voltage is supplied to the grey-scale electric power supply lines in a period for selecting even number source signal lines. By thus inverting the polarity of the electric power supply voltage of the grey-scale electric power supply lines as described above, dot inverting drive becomes possible.

In particular, by dividing the period for selecting the odd numbered source signal lines and the period for selecting the even numbered source signal lines into a first half and a second half of each gate signal line selection period, the period for inverting the polarity of the electric power supply voltage of the grey-scale electric power supply lines can be lengthened, and at the same time the operating load on the circuit can be reduced.

In a third driving method of the present invention, in order to obtain outputs from D/A converter circuits with differing polarities, similar to the first method, two systems of grey-scale electric power supply lines are supplied to a source signal line driver circuit. Note that, a plurality of source signal lines connected to each D/A converter circuit is arranged together by odd numbers or even numbers. A first system of grey-scale electric power supply lines is connected to each D/A converter circuit connected to the odd numbered source signal lines, and a second system of grey-scale electric power supply lines is connected to each D/A converter circuit connected to the even numbered source signal lines. In addition, by periodically inverting the polarity of the electric power supply voltage of all of the grey-scale electric power supply lines, source line inverting drive and dot inverting drive can be performed.

In order to perform source line inverting drive by the composition of the above third driving method, the following is done. Within a certain frame period, a plus polarity output voltage is supplied to the first system of grey-scale electric power supply lines, and a minus polarity output voltage is supplied to the second system of grey-scale electric power supply lines. A minus polarity output voltage is supplied to the first system of grey-scale electric power supply lines within the next frame period, and a plus polarity output voltage is supplied to the second system of grey-scale electric power supply lines. Source line inverting drive becomes possible by thus applying the electric power supply voltage to the grey-scale electric power supply lines.

Further, the following is done in order to perform dot inverting drive by the composition of the above third driving method. Within an odd numbered gate signal line selection period of a certain frame period, a plus polarity output voltage is supplied to the first system of grey-scale electric power supply lines, and a minus polarity output voltage is supplied to the second system of grey-scale electric power supply lines. Within an even number gate signal line selection period of the same frame period, a minus polarity output voltage is supplied to the first system of grey-scale electric power supply lines, and a plus polarity output voltage is supplied to the second system of grey-scale electric power supply lines. In addition, within an odd numbered gate signal line selection period of the next frame period, a minus polarity output voltage is supplied to the first system of grey-scale electric power supply lines, and a plus polarity output voltage is supplied to the second system of grey-scale electric power supply lines. Then, within an even number gate signal line selection period of the same frame period, a plus polarity output voltage is supplied to the first system of grey-scale electric power supply lines, and a minus polarity output voltage is supplied to the second system of grey-scale electric power supply lines. Dot inverting drive becomes possible by applying an electric power supply voltage as described above to the grey-scale electric power supply lines.

DETAILED DESCRIPTION OF THE PREFERRED EMBODIMENTS

Embodiment modes of the present invention are explained below while referring to the figures.

Embodiment Mode 1

A certain method is explained in embodiment mode 1 in order to obtain outputs having differing polarities from D/A converter circuits, in which two independent systems of grey-scale electric power supply lines are supplied to source signal line driver circuits. By switching a connection between each D/A converter circuit and the two systems of grey-scale electric power supply lines using a connection switching switch, source line inverting drive and dot inverting drive is possible.

As an example of driving an even number of source signal lines by one D/A converter circuit, a case in which four source signal lines are driven, and which corresponds to input of an (n+1) bit (where n is an integer greater than or equal to 0) digital image signal is explained in embodiment mode 1.

Figure 1:
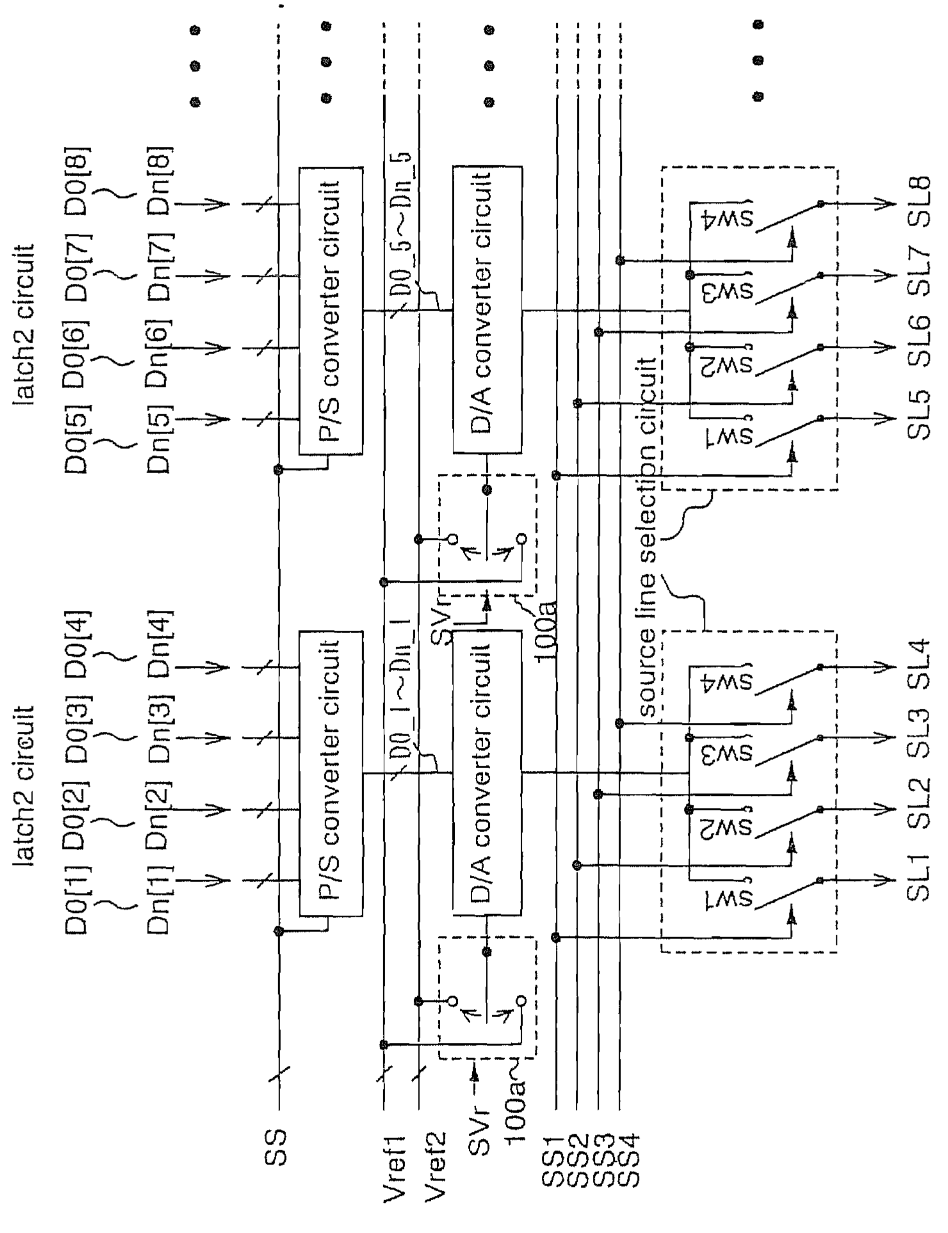
FIG. 1 is a schematic diagram of a driver circuit in accordance with embodiment mode 1 and embodiment mode 3 of the present invention.

A schematic circuit diagram of embodiment mode 1 is shown in FIG. 1. A shift register portion for generating a sampling pulse in order to sample the digital image signal in order, a latch 1 circuit portion for latching the digital image signal in accordance with the sampling pulse, and a latch 2 circuit portion for simultaneously latching the digital image signals stored in the latch 1 circuit portion in accordance with a latch pulse input, are omitted from FIG. 1. A parallel/serial converter circuit (P/S converter circuit) gathers together each bit of parallel output data from the latch 2 circuit (D0[4k+1] to Dn[4k+1], D0[4k+2] to Dn[4k+2], D0[4k+3] to Dn[4k+3], and D0[4k+4] to Dn[4k+4], where k is an integer greater than or equal to 0) and converts it into serial data. D0[4k+1] denotes the least significant bit (LSB, first bit) of the digital image signal corresponding to the (4k+1) source signal line, and Dn[4k+1] similarly denotes the most significant bit (MSB, bit n+1) of the digital image signal corresponding to the (4k+1) source signal line. Hereafter Di[s] is used to denote the (i+1) bit of the digital image signal corresponding to the s source signal line.

Reference numeral 100*a* denotes a connection switching switch for performing connection switching between two systems of grey-scale electric power supply lines Vref1 and Vref2, and the D/A converter circuit. The connection switching switch 100*a* connects to one in accordance with a switch control signal SVr. Of the two systems of grey-scale electric power supply lines, the D/A converter circuit connecting Vref1 is set to output plus polarity, while the D/A converter circuit connecting Vref2 is set to output minus polarity. Further, for convenience in this specification, the connection switching switch 100*a* and a connection switching switch 100*b* (shown in FIG. 3) are connected to a lower terminal when SVr is HI and are connected to an upper terminal when SVr is LO. Note that, the present invention is not limited to this connection switching switch circuit structure, and applications corresponding to circuits which perform similar operations can be made.

A source line selection circuit is composed of four switches sw1, sw2, sw3, and sw4. When sw1 is on, the (4k+1) source signal line is connected to the output of each D/A converter circuit, and when sw2 is on, the (4k+2) source signal line is connected to the output of each D/A converter circuit. Similarly, when sw3 is on, the (4k+3) source signal line is connected to the output of each D/A converter circuit, and when sw4 is on, the (4k+4) source signal line is connected to the output of each D/A converter circuit. Reference numerals SS1 to SS4 denote selection signals for controlling the on/off state of the switches sw1 to sw4.

Figure 2:
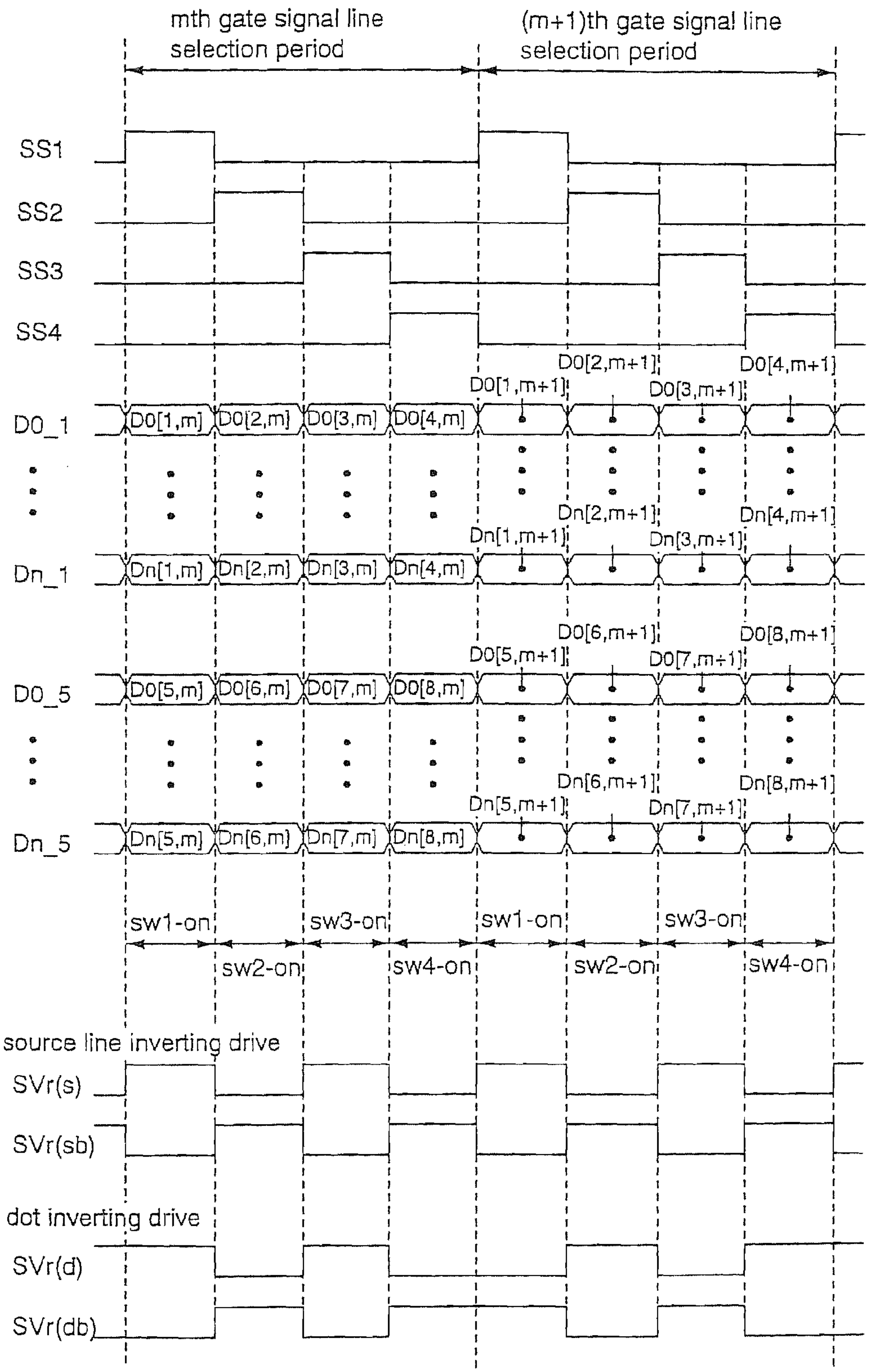
FIG. 2 is an example of operation timing in accordance with embodiment mode 1 of FIG. 1.

A signal operation timing diagram of FIG. 1 is shown in FIG. 2. One gate signal line selection period is divided into four, and SS1 is set to the HI level and sw1 is turned on in a first period. In a second period, SS2 is set to the HI level, and sw2 turns on, while SS3 is set to the HI level and sw3 turns on in a third period. In a fourth period, SS4 is set to the HI level and sw4 turns on. Note that, the output of each bit of data from each P/S converter circuit is synchronized with the above selection signals SS1 to SS4. The gate signal line selection period is divided into four periods. The P/S converter circuit is controlled in accordance with a selection signal SS so that the (4k+1) source signal line data is output during the first of the four periods, and the (4k+2) source signal line data is output during the second period, while the (4k+3) source signal line data is output during the third period and the (4k+4) source signal line data is output during the fourth period. The digital image signal corresponding to each source signal line is thus written into the appropriate source signal line. This state is shown by reference numerals D0_1 to Dn_1, and in D0_5 to Dn_5 in FIG. 2. Reference numeral Di_1 denotes the (i+1) bit of the output data of the left P/S converter circuit in FIG. 1, and reference numeral Di_5 denotes the (i+1) bit of the output data of the right P/S converter circuit in FIG. 1. Further, reference numeral Di[s,g] in FIG. 2 denotes the (i+1) bit of data corresponding to an s column, g row pixel, and the above reference numeral Di[s] is added to the gate signal line information so as to be clearly understood. (Hereafter the reference numeral Di[s,g] has the same meaning.)

Next, source line inverting drive and dot inverting drive are shown to be possible in accordance with a control signal SVr for the input method of switching the grey-scale electric power supply lines to the D/A converter circuit.

Figure 12A:
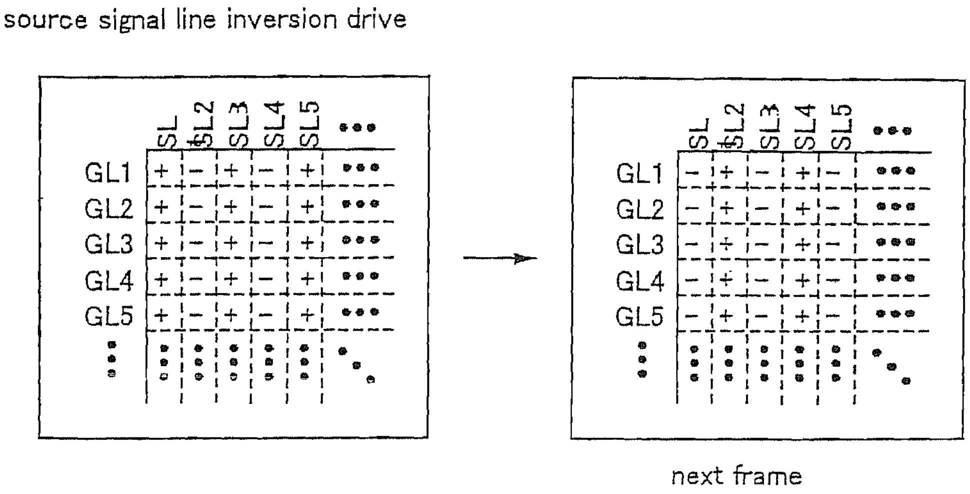
FIGS. 12A-B are diagrams showing the polarity of each pixel at the time of source line inversion driving and at dot inversion driving.

An input signal of the control signal SVr in a case of performing source line inverting drive is denoted by SVr(s) and SVr(sb) in FIG. 2. Reference symbol SVr(sb) denotes the control signal SVr of the next frame period when SVr(s) is being input. This is an inverted signal of SVr(s). As a result, the polarity written into each pixel becomes as shown in FIG. 12A.

Figure 12B:
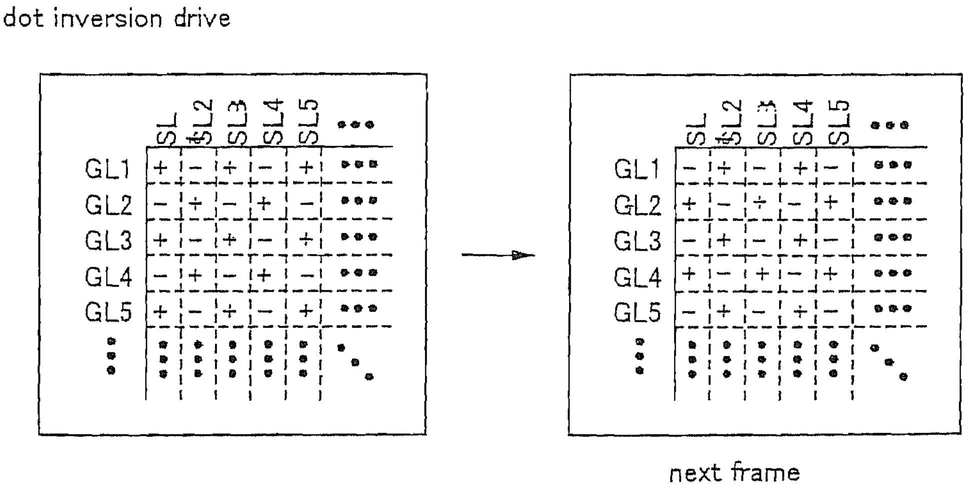

An input signal of the control signal SVr in a case of performing dot inverting drive is denoted by SVr(d) and SVr (db) in FIG. 2. Reference symbol SVr(db) denotes the control signal SVr of the next frame period when SVr(d) is being input. This is an inverted signal of SVr(d). As a result, the polarity written into each pixel becomes as shown in FIG. 12B.

As stated above, it becomes possible to perform source line inverting drive and dot inverting drive in a case of driving four source lines by one D/A converter circuit in accordance with embodiment mode 1. Note that, an example of driving four source signal lines by one D/A converter circuit is given in embodiment mode 1, but the present invention is not limited to this example. The present invention can be applied to driving an even number of source signal lines, such as two, four, or six, by using one D/A converter circuit.

Embodiment Mode 2

Another method is explained in embodiment mode 2, similar to that of embodiment mode 1, in order to obtain outputs having differing polarities from D/A converter circuits, in which two independent systems of grey-scale electric power supply lines are supplied by source signal line driver circuits. By switching a connection between each D/A converter circuit and the two systems of grey-scale electric power supply lines using a connection switching switch, source line inverting drive and dot inverting drive is possible.

As an example of driving an odd numbered of source signal lines by one D/A converter circuit, a case in which three source signal lines are driven, and which corresponds to input of an (n+1) bit (where n is an integer greater than or equal to 0) digital image signal is explained in embodiment mode 2.

Figure 3:
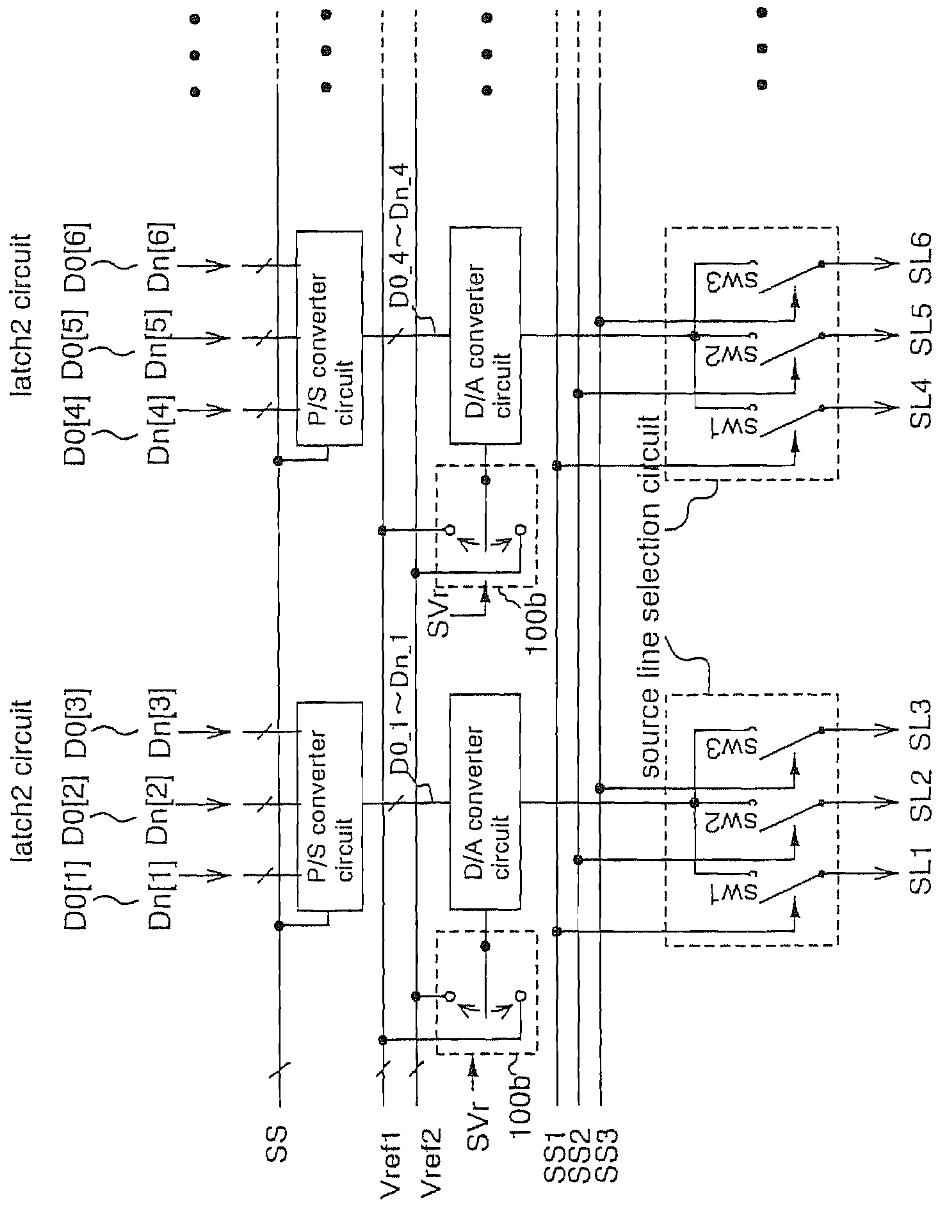
FIG. 3 is a schematic diagram of a driver circuit in accordance with embodiment mode 2 and embodiment mode 4 of the present invention.

A schematic circuit diagram of embodiment mode 2 is shown in FIG. 3. Similar to embodiment mode 1, a shift register portion, a latch 1 circuit portion, and a latch 2 circuit portion are omitted from FIG. 3. A parallel/serial converter circuit (P/S converter circuit) gathers together each bit of parallel output data from the latch 2 circuit (D0[3k+1] to Dn[3k+1], D0[3k+2] to Dn[3k+2], and D0[3k+3] to Dn[3k+3], where k is an integer greater than or equal to 0) and converts it into serial data.

Differences are focused upon for a connection method for connecting between grey-scale electric power supply lines and a connection switching switch 100*b* for performing connection switching between two systems of grey-scale electric power supply lines Vref1 and Vref2, and the D/A converter circuit. As shown in FIG. 3, two adjacent connection switching switches 100*b* are connected conversely with the two systems of grey-scale electric power supply lines Vref1 and Vref2. Each connection switching switch 100*b* is controlled by the same control signal SVr, and therefore adjacent D/A converter circuits are always connected to inverse polarity output grey-scale electric power supply lines at the same time. Reflecting this, the output of adjacent D/A converter circuits always has inverse polarity at any one instant. Therefore, when three source signal lines are driven by one D/A converter circuit, it becomes possible to write electric potentials having inverted polarities into adjacent source signal lines, which differs from embodiment mode 1.

Note that, as stated above, without changing the connection method of adjacent connection switching switches 100*b* with the grey-scale electric power supply lines, even if the operation of adjacent connection switching switches is inverted, the same result can be obtained.

A source line selection circuit is composed of three switches sw1, sw2 and sw3. When sw1 is on, the (3k+1) source signal line is connected to the output of each D/A converter circuit, and when sw2 is on, the (3k+2) source signal line is connected to the output of each D/A converter circuit. Similarly, when sw3 is on, the (3k+3) source signal line is connected to the output of each D/A converter circuit. Reference numerals SS1 to SS3 denote selection signals for controlling the on/off state of the switches sw1 to sw3.

Figure 4:
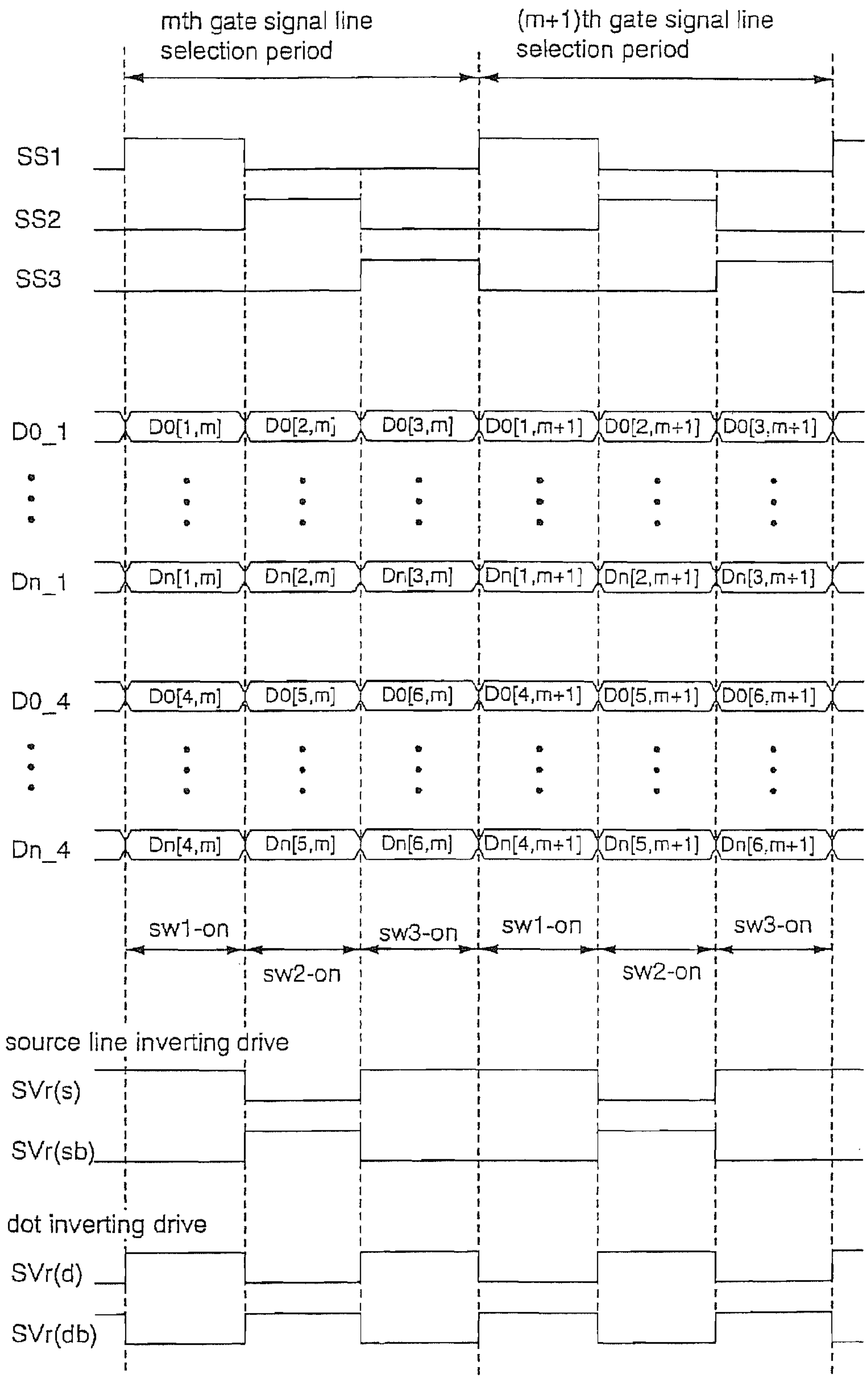
FIG. 4 is an example of operation timing in accordance with embodiment mode 2 of FIG. 3.

A signal operation timing diagram of FIG. 3 is shown in FIG. 4. One gate signal line selection period is divided into three, and SS1 is set to the HI level and sw1 is turned on in a first period. In a second period, SS2 is set to the HI level, and sw2 turns on, while SS3 is set to the HI level and sw3 turns on in a third period. Note that, the output of each bit of data from each P/S converter circuit is synchronized with the above selection signals SS1 to SS3. The gate signal line selection period is divided into three periods. The P/S converter circuit is controlled in accordance with a selection signal SS so that the (3k+1) source signal line data is output during the first of the three periods, and the (3k+2) source signal line data is output during the second period, while the (3k+3) source signal line data is output during the third period. The digital image signal corresponding to each source signal line is thus written into the appropriate source signal line. This state is shown by reference numerals D0_1 to Dn_1, and in D0_4 to Dn_4 in FIG. 4. Reference numeral Di_1 denotes the (i+1) bit of the output data of the left P/S converter circuit in FIG. 3, and reference numeral Di_4 denotes the (i+1) bit of the output data of the right P/S converter circuit in FIG. 4.

Next, source line inverting drive and dot inverting drive are shown to be possible in accordance with a control signal SVr for the input method of switching the grey-scale electric power supply lines to the D/A converter circuits.

An input signal of the control signal SVr in a case of performing source line inverting drive is denoted by SVr(s) and SVr(sb) in FIG. 4. Reference symbol SVr(sb) denotes the control signal SVr of the next frame period when SVr(s) is being input. This is an inverted signal of SVr(s). As a result, the polarity written into each pixel becomes as shown in FIG. 12A.

Further, an input signal of the control signal SVr in a case of performing dot inverting drive is denoted by SVr(d) and SVr(db) in FIG. 4. Reference symbol SVr(db) denotes the control signal SVr of the next frame period when SVr(d) is being input. This is an inverted signal of SVr(d). As a result, the polarity written into each pixel becomes as shown in FIG. 12B.

It thus becomes possible to perform source line inverting drive and dot inverting drive in a case of driving three source lines by one D/A converter circuit in accordance with embodiment mode 2. Note that, an example of driving three source signal lines by one D/A converter circuit is given in embodiment mode 2, but the present invention is not limited to this example. The present invention can be applied to driving an odd numbered of source signal lines, such as three, five, or seven, by using one D/A converter circuit.

Embodiment Mode 3

The circuit structure in embodiment mode 3 is the same as that of embodiment mode 1, but by changing the signal input method, a method of lengthening the period of a control signal for controlling a connection switching switch of grey-scale electric power supply lines is shown.

Figure 5:
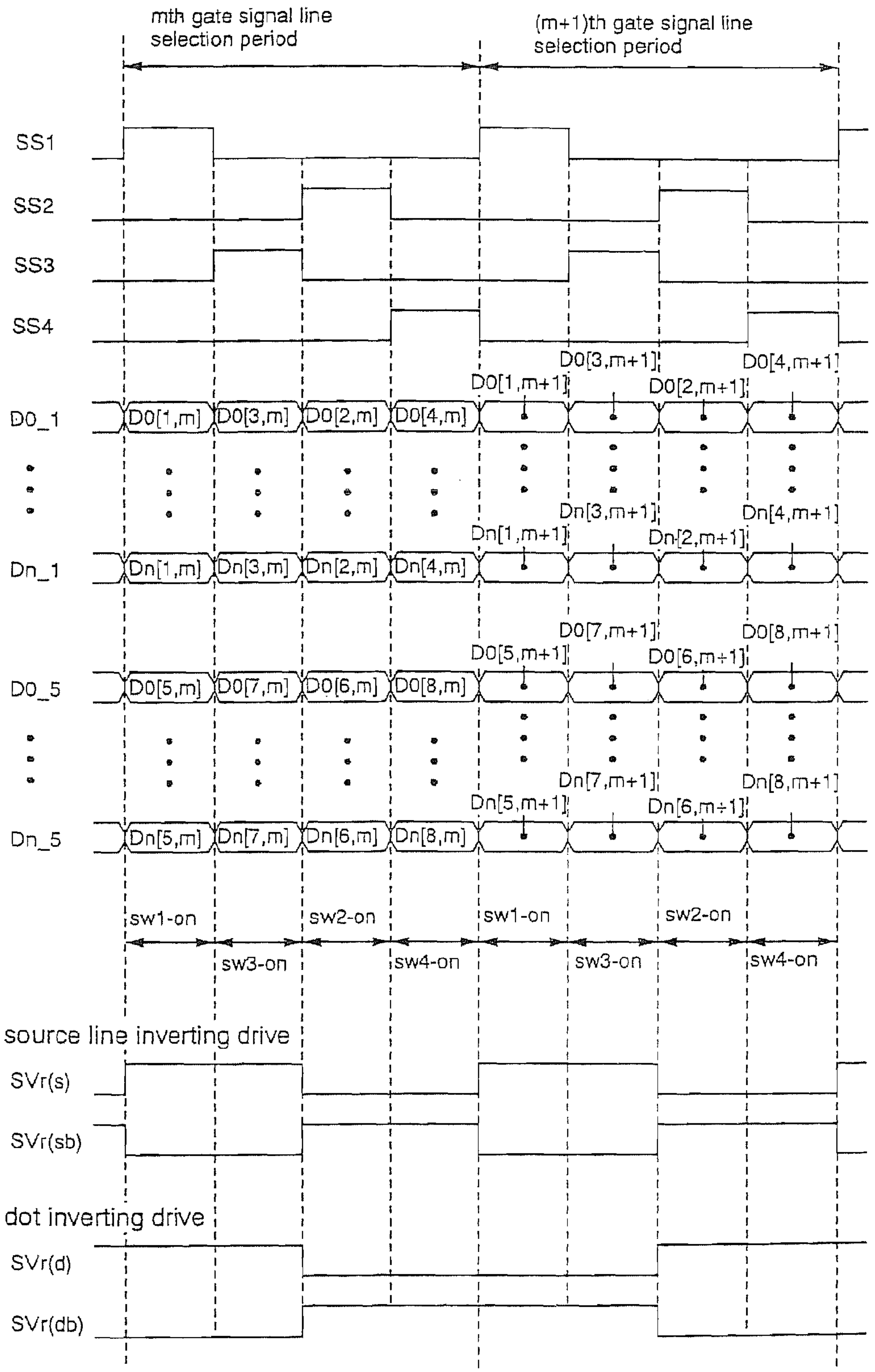
FIG. 5 is an example of operation timing in accordance with embodiment mode 3 of FIG. 1.

An operation timing diagram with respect to FIG. 1 at this time is shown in FIG. 5. Similar to embodiment mode 1, one gate signal line selection period is divided into four, and SS1 is set to the HI level and sw1 is turned on in a first period. In a second period, SS3 is set to the HI level, and sw3 is turned on, while SS2 is set to the HI level and sw2 is turned on in a third period. In a fourth period, SS4 is set to the HI level and sw4 is turned on. Note that, the output of each bit of data from each P/S converter circuit is synchronized with the above selection signals SS1 to SS4. The gate signal line selection period is divided into four periods. The P/S converter circuit is controlled in accordance with a selection signal SS so that the (4k+1) source signal line data is output during the first of the four periods, and the (4k+3) source signal line data is output during the second period, while the (4k+2) source signal line data is output during the third period and the (4k+4) source signal line data is output during the fourth period. The digital image signal corresponding to each source signal line is thus written into the appropriate source signal line. This state is shown by reference numerals D0_1 to Dn_1, and in D0_5 to Dn_5 in FIG. 5. Reference numeral Di_1 denotes the (i+1) bit of the output data of the left P/S converter circuit in FIG. 1, and reference numeral Di_5 denotes the (i+1) bit of the output data of the right P/S converter circuit in FIG. 1.

An input signal of a control signal SVr for a case of performing source line inverting drive is denoted by SVr(s) and SVr(sb) in FIG. 5. Reference symbol SVr(sb) denotes the control signal SVr of the next frame period when SVr(s) is being input. This is an inverted signal of SVr(s). As a result, the polarity written into each pixel becomes as shown in FIG. 12A. It can be seen that the signals SVr(s) and SVr(sb) of FIG. 5 each have a period which is longer than the corresponding signals of FIG. 2.

An input method of the control signal SVr for a case of performing dot inverting drive is denoted by SVr(d) and SVr (db) in FIG. 5. Reference symbol SVr(db) denotes the control signal SVr of the next frame period when SVr(d) is being input. This is an inverted signal of SVr(d). As a result, the polarity written into each pixel becomes as shown in FIG. 12B. It can be seen that the signals SVr(d) and SVr(db) of FIG. 5 each have a period which is longer than the corresponding signals of FIG. 2. Further, when compared to the signals SVr(s) and SVr(sb) of FIG. 5, it can be seen that the signals SVr(d) and SVr(db) have periods which are the longest.

It thus becomes possible to perform source line inverting drive and dot inverting drive for a case of driving four source signal lines by one D/A converter circuit in accordance with embodiment mode 3. In addition, it becomes possible to lengthen the period of the control signals selecting the grey-scale electric power supply lines. Note that, an example of driving four source signal lines by one D/A converter circuit is given in embodiment mode 3, but the present invention is not limited to this example. The present invention can also be applied to driving an even number, greater than or equal to four, of source signal lines, by using one D/A converter circuit. Note that, when driving two source signal lines by using one D/A converter circuit, embodiment mode 3 becomes equivalent to embodiment mode 1.

Embodiment Mode 4

The circuit structure in embodiment mode 4 is the same as that of embodiment mode 2, but by changing the signal input method, a method of lengthening the period of a control signal for controlling a connection switching switch of grey-scale electric power supply lines is shown.

Figure 6:
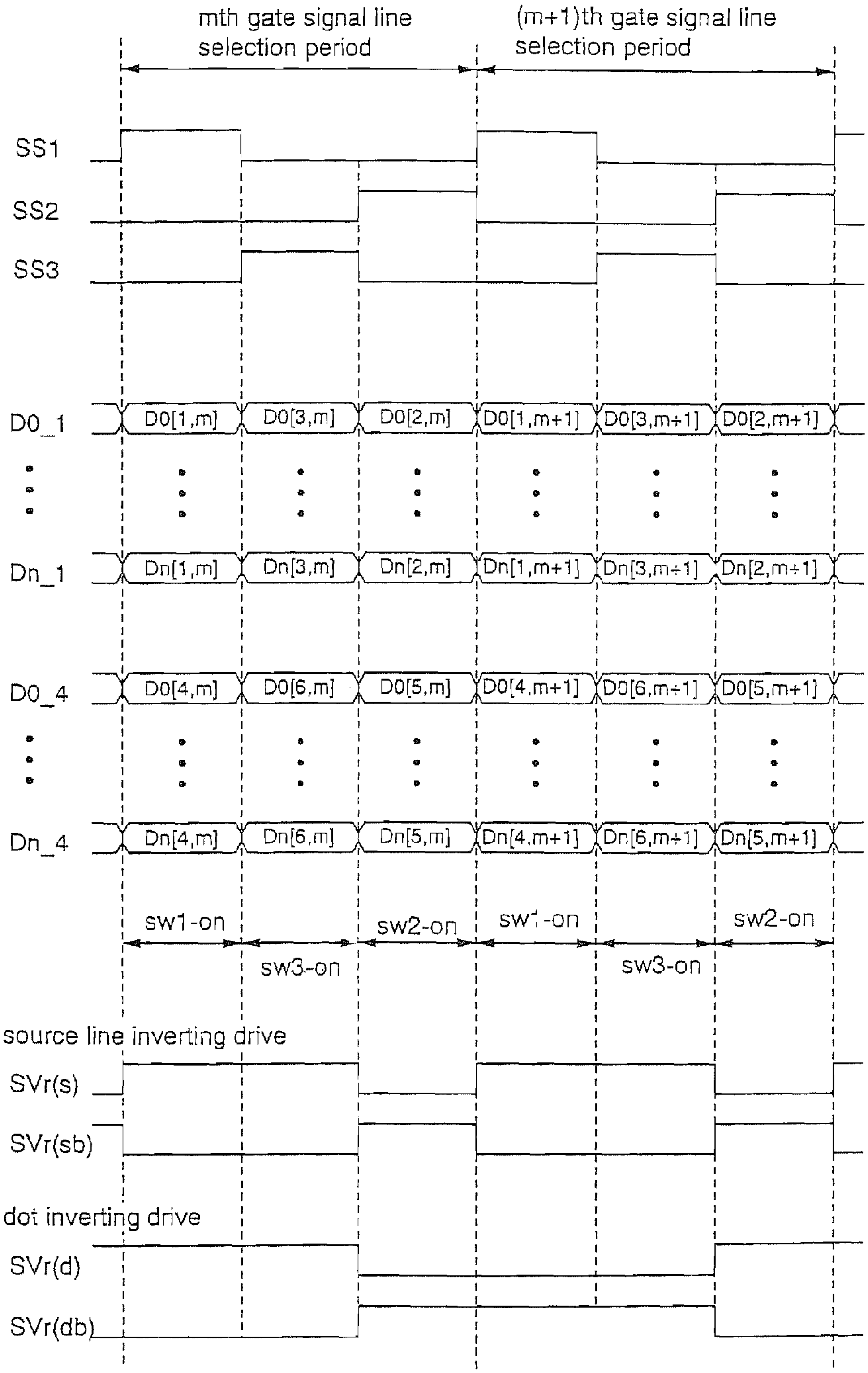
FIG. 6 is an example of operation timing in accordance with embodiment mode 4 of FIG. 3.

A signal operation timing diagram of FIG. 3 at this time is shown in FIG. 6. Similar to embodiment 2, one gate signal line selection period is divided into three, and SS1 is set to the HI level and sw1 is turned on in a first period. In a second period, SS3 is set to the HI level, and sw3 turns on, while SS2 is set to the HI level and sw2 is turned on in a third period. Note that, the output of each bit of data from each P/S converter circuit is synchronized with the above selection signals SS1 to SS3. The gate signal line selection period is divided into three periods. The P/S converter circuit is controlled in accordance with a selection signal SS so that the (3k+1) source signal line data is output during the first of the three periods, and the (3k+3) source signal line data is output during the second period, while the (3k+2) source signal line data is output during the third period. The digital image signal corresponding to each source signal line is thus written into the appropriate source signal line. This state is shown by reference numerals D0_1 to Dn_1, and in D0_4 to Dn_4 in FIG. 6. Reference numeral Di_1 denotes the (i+1) bit of the output data of the left P/S converter circuit in FIG. 3, and reference numeral Di_4 denotes the (i+1) bit of the output data of the right P/S converter circuit in FIG. 3.

An input signal of a control signal SVr for a case of performing source line inverting drive is denoted by SVr(s) and SVr(sb) in FIG. 6. Reference symbol SVr(sb) denotes the control signal SVr of the next frame period when SVr(s) is being input. This is an inverted signal of SVr(s). As a result, the polarity written into each pixel becomes as shown in FIG. 12A. It can be seen that the signals SVr(s) and SVr(sb) each have a period which is the same as the corresponding signals of FIG. 4.

Further, an input method of the control signal SVr for a case of performing dot inverting drive is denoted by SVr(d) and SVr(db) in FIG. 6. Reference symbol SVr(db) denotes the control signal SVr of the next frame period when SVr(d) is being input. This is an inverted signal of SVr(d). As a result, the polarity written into each pixel becomes as shown in FIG. 12B. It can be seen that the signals SVr(d) and SVr(db) in FIG. 6 each have a period which is longer than the corresponding signals of FIG. 4. Further, when compared to the signals SVr(s) and SVr(sb) of FIG. 6, it can be seen that the signals SVr(d) and SVr(db) have periods which are the longest.

It thus becomes possible to perform source line inverting drive and dot inverting drive for a case of driving three source lines by one D/A converter circuit in accordance with embodiment mode 4. In addition, it becomes possible to lengthen the period of the control signals selecting the grey-scale electric power supply lines equal to or longer than those of embodiment 2. Note that, an example of driving three source signal lines by one D/A converter circuit is given in embodiment mode 4, but the present invention is not limited to this example. The present invention can also be applied to driving an odd number, greater than or equal to three, of source signal lines, by using one D/A converter circuit. Note that, provided that five or more source signal lines are being driven by one D/A conversion circuit, the period of the control signal for selecting the grey-scale electric power supply lines in source line inverting drive can be made longer than those of embodiment mode 2.

Embodiment Mode 5

Differing from embodiment mode 1, a certain method is explained in embodiment mode 5 in order to obtain outputs having differing polarities from D/A converter circuits, in which one system of grey-scale electric power supply lines is supplied by source signal line driver circuits. By inverting the polarity of an electric power supply voltage of the grey-scale electric power supply lines, source line inverting drive and dot inverting drive is possible.

An example of a case corresponding to (n+1) bit (where n is an integer greater than or equal to 0) digital image signal input, in which four source signal lines are driven by one D/A converter circuit, is explained in embodiment mode 5.

Figure 7:
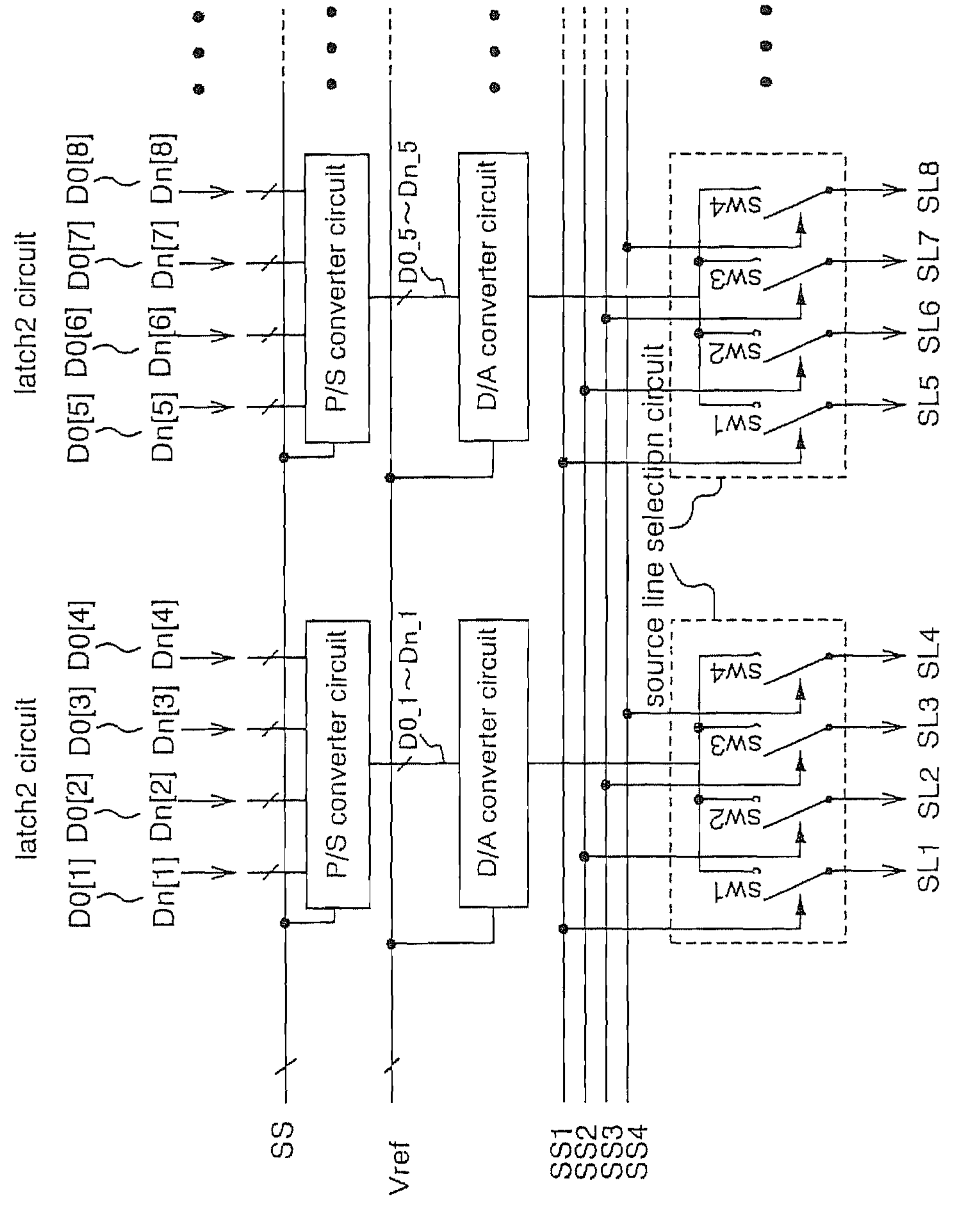
FIG. 7 is a schematic diagram of a driver circuit in accordance with embodiment mode 5 and embodiment mode 6 of the present invention.

A schematic circuit diagram of embodiment mode 5 is shown in FIG. 7. Similar to FIG. 1, a shift register portion, a latch (1) circuit portion, and a latch (2) circuit portion are omitted from FIG. 7. A parallel/serial converter circuit (P/S converter circuit) gathers together each bit of parallel output data from the latch (2) circuit (D0[4k+1] to Dn[4k+1], D0[4k+2] to Dn[4k+2], D0[4k+3] to Dn[4k+3], and D0[4k+4] to Dn[4k+4], where k is an integer greater than or equal to 0) and converts it into serial data.

A source line selection circuit is composed of four switches sw1, sw2, sw3, and sw4. When sw1 is on, the (4k+1) source signal line is connected to the output of each D/A converter circuit, and when sw2 is on, the (4k+2) source signal line is connected to the output of each D/A converter circuit. Similarly, when sw3 is on, the (4k+3) source signal line is connected to the output of each D/A converter circuit, and when sw4 is on, the (4k+4) source signal line is connected to the output of each D/A converter circuit. Reference numerals SS1 to SS4 denote selection signals for controlling the on/off state of the respective switches sw1 to sw4.

Figure 8:
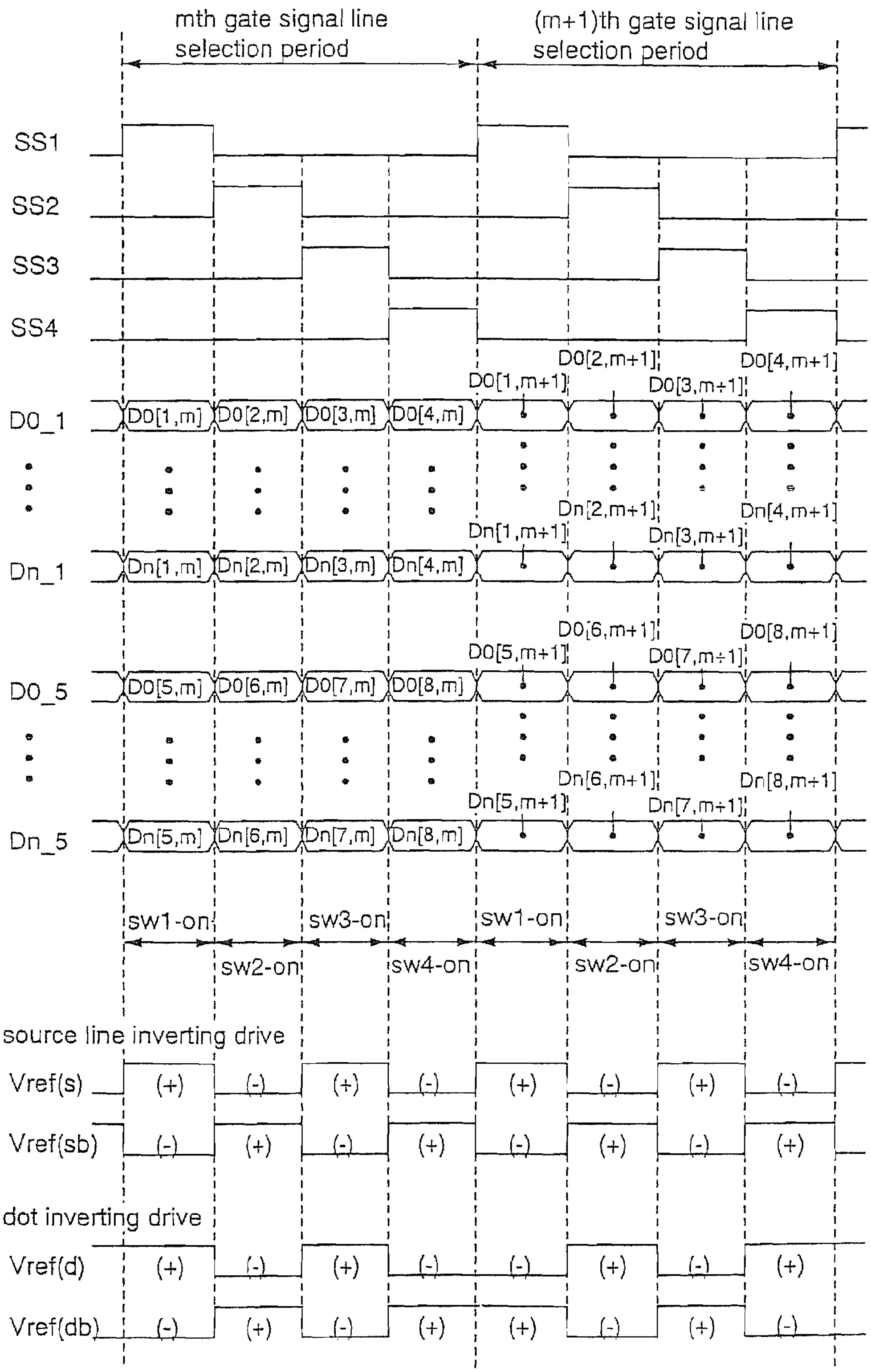
FIG. 8 is an example of operation timing in accordance with embodiment mode 5 of FIG. 7.

A signal operation timing diagram of FIG. 7 is shown in FIG. 8. One gate signal line selection period is divided into four, and SS1 is set to the HI level and sw1 is turned on in a first period. In a second period, SS2 is set to the HI level, and sw2 is turned on, while SS3 is set to the HI level and sw3 is turned on in a third period. In a fourth period, SS4 is set to the HI level and sw4 is turned on. Note that, the output of each bit of data from each P/S converter circuit is synchronized with the above selection signals SS1 to SS4. The gate signal line selection period is divided into four periods. The P/S converter circuit is controlled in accordance with a selection signal SS so that the (4k+1) source signal line data is output during the first of the four periods, and the (4k+2) source signal line data is output during the second period, while the (4k+3) source signal line data is output during the third period and the (4k+4) source signal line data is output during the fourth period. The digital image signal corresponding to each source signal line is thus written into the appropriate source signal line. This state is shown by reference numerals D0_1 to Dn_1, and in D0_5 to Dn_5 in FIG. 8. Reference numeral Di_1 denotes the (i+1) bit of the output data of the left P/S converter circuit in FIG. 7, and reference numeral Di_5 denotes the (i+1) bit of the output data of the right P/S converter circuit in FIG. 7.

Next, source line inverting drive and dot inverting drive are shown to be possible in accordance with a method of inputting an electric power supply voltage Vref of the grey-scale electric power supply lines connected to the D/A converter circuit.

A method of inputting the electric power supply voltage Vref of the grey-scale power supply lines for a case of performing source line inverting drive is shown in reference symbols Vref(s) and Vref(sb) in FIG. 8. A symbol "+" in the figures denotes supplying a plus polarity output voltage to the grey-scale electric power supply lines, while a symbol "–"

denotes supplying a negative polarity output voltage to the grey-scale electric power supply lines. Further, reference symbol Vref(sb) denotes the method of input of the electric power supply voltage Vref of the grey-scale electric power supply line in the next frame period when Vref(s) is being input. This has an inverse relationship with Vref(s). As a result, the polarity written into each pixel becomes as shown in FIG. 12A.

A method of inputting the electric power supply voltage Vref of the grey-scale power supply lines for a case of performing dot inverting drive is shown in reference symbols Vref(d) and Vref(db) in FIG. 8. Reference symbol Vref(db) denotes the method of input of the electric power supply voltage Vref of the grey-scale electric power supply line in the next frame period when Vref(d) is being input. This has an inverse relationship with Vref(d). As a result, the polarity written into each pixel becomes as shown in FIG. 12B.

It thus becomes possible to perform source line inverting drive and dot inverting drive for a case of driving a plurality of source lines by one D/A converter circuit in accordance with embodiment mode 5. Note that, an example of driving four source signal lines by one D/A converter circuit is given in embodiment mode 5, but the present invention is not limited to this example. The present invention can be applied to driving an even number of source signal lines, such as two, four, or six, by using one D/A converter circuit.

Embodiment Mode 6

The circuit structure of embodiment mode 6 is the same as that of embodiment mode 5, but a method is shown in which the length of a period during which the polarity of the electric power supply voltage of the grey-scale electric power supply lines inverts is lengthened by changing the method of inputting an electric power supply voltage of grey-scale electric power supply line.

Figure 9:
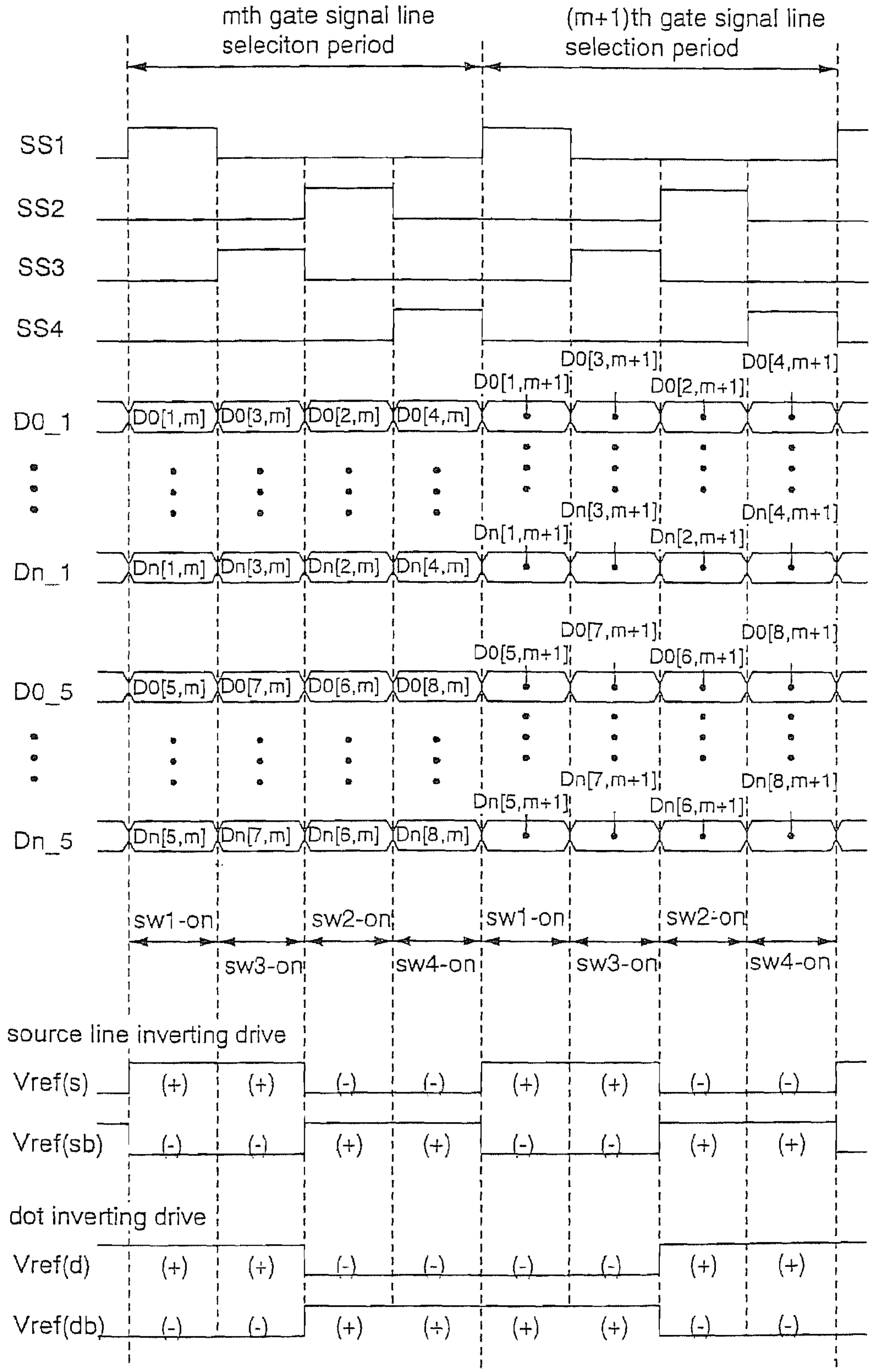
FIG. 9 is an example of operation timing in accordance with embodiment mode 6 of FIG. 7.

An operating timing corresponding to FIG. 7 at this time is shown in FIG. 9. Similar to embodiment mode 5, one gate signal line selection period is divided into four, and SS1 is set to the HI level and sw1 is turned on in a first period. In a second period, SS3 is set to the HI level, and sw3 is turned on, while SS2 is set to the HI level and sw2 is turned on in a third period. In a fourth period, SS4 is set to the HI level and sw4 is turned on. Note that, the output of each bit of data from each P/S converter circuit is synchronized with the above selection signals SS1 to SS4. The gate signal line selection period is divided into four periods. The P/S converter circuit is controlled in accordance with a selection signal SS so that the (4k+1) source signal line data is output during the first of the four periods, and the (4k+3) source signal line data is output during the second period, while the (4k+2) source signal line data is output during the third period, and the (4k+4) source signal line data is output during the fourth period. The digital image signal corresponding to each source signal line is thus written into the appropriate source signal line. This state is shown by reference numerals D0_1 to Dn_1, and in D0_5 to Dn_5 in FIG. 9. Reference numeral Di_1 denotes the (i+1) bit of the output data of the left P/S converter circuit in FIG. 9, and reference numeral Di_5 denotes the (i+1) bit of the output data of the right P/S converter circuit in FIG. 9.

Next, source line inverting drive and dot inverting drive are shown to be possible, and it is shown that the period during which the electric power supply voltage polarity inverts can be lengthened compared to embodiment 5, in accordance with a method of inputting an electric power supply voltage Vref of the grey-scale electric power supply lines connected to the D/A converter circuit.

A method of inputting the electric power supply voltage Vref of the grey-scale power supply lines for a case of performing source line inverting drive is shown in reference symbols Vref(s) and Vref(sb) in FIG. 9. A symbol "+" in the figures denotes supplying a plus polarity output voltage to the grey-scale electric power supply lines, while a symbol "–" denotes supplying a negative polarity output voltage to the grey-scale electric power supply lines. Further, reference symbol Vref(sb) denotes the method of input of the electric power supply voltage Vref of the grey-scale electric power supply line in the next frame period when Vref(s) is being input. This has an inverse relationship with Vref(s). As a result, the polarity written into each pixel becomes as shown in FIG. 12A. It can be seen that the period of polarity inversion for Vref(s) and Vref(sb) of FIG. 9 is longer that of FIG. 8.

Further, a method of inputting the electric power supply voltage Vref of the grey-scale power supply lines for a case of performing dot inverting drive is shown in reference symbols Vref(d) and Vref(db) in FIG. 9. Reference symbol Vref(db) denotes the method of input of the electric power supply voltage Vref of the grey-scale electric power supply line in the next frame period when Vref(d) is being input. This has an inverse relationship with Vref(d). As a result, the polarity written into each pixel becomes as shown in FIG. 12B. It can be seen that the period of polarity inversion for Vref(d) and Vref(db) of FIG. 9 is longer that of FIG. 8. Furthermore, compared with Vref(s) and Vref(sb) as well, it can be seen that Vref(d) and Vref(db) have the longest period.

It thus becomes possible to perform source line inverting drive and dot inverting drive for a case of driving a plurality of source signal lines by one D/A converter circuit in accordance with embodiment mode 6, and it also becomes possible to lengthen the period during which the polarity of the electric power supply voltage of the grey-scale electric power supply lines is inverted. Note that, an example of driving four source signal lines by one D/A converter circuit is given in embodiment mode 6, but the present invention is not limited to this example. The present invention can be applied to driving an even number, greater than or equal to four, of source signal lines by using one D/A converter circuit. Note that, when one D/A converter circuit is used for driving two source signal lines, embodiment mode 6 becomes equivalent to embodiment mode 5.

Embodiment Mode 7

A certain method in which two independent systems of grey-scale electric power supply lines are supplied by source signal line driver circuits in embodiment mode 7, similar to embodiment mode 1, in order to obtain outputs having differing polarities from D/A converter circuits, is explained. However, source signal lines driven by each D/A circuit are divided up into odd numbers and even numbers, and a first system of grey-scale electric power supply lines is connected to each D/A converter circuit which drives odd numbered source lines, while a second system of grey-scale electric power supply lines is connected to each D/A converter circuit which drives even numbered source signal lines. In addition, source line inverting drive and dot line inverting drive are possible in accordance with changing the polarity of the grey-scale electric power supply lines.

An example of a case corresponding to (n+1) bit (where n is an integer greater than or equal to 0) digital image signal input in which two source signal lines are driven by one D/A converter circuit is explained in embodiment mode 7.

Figure 10:
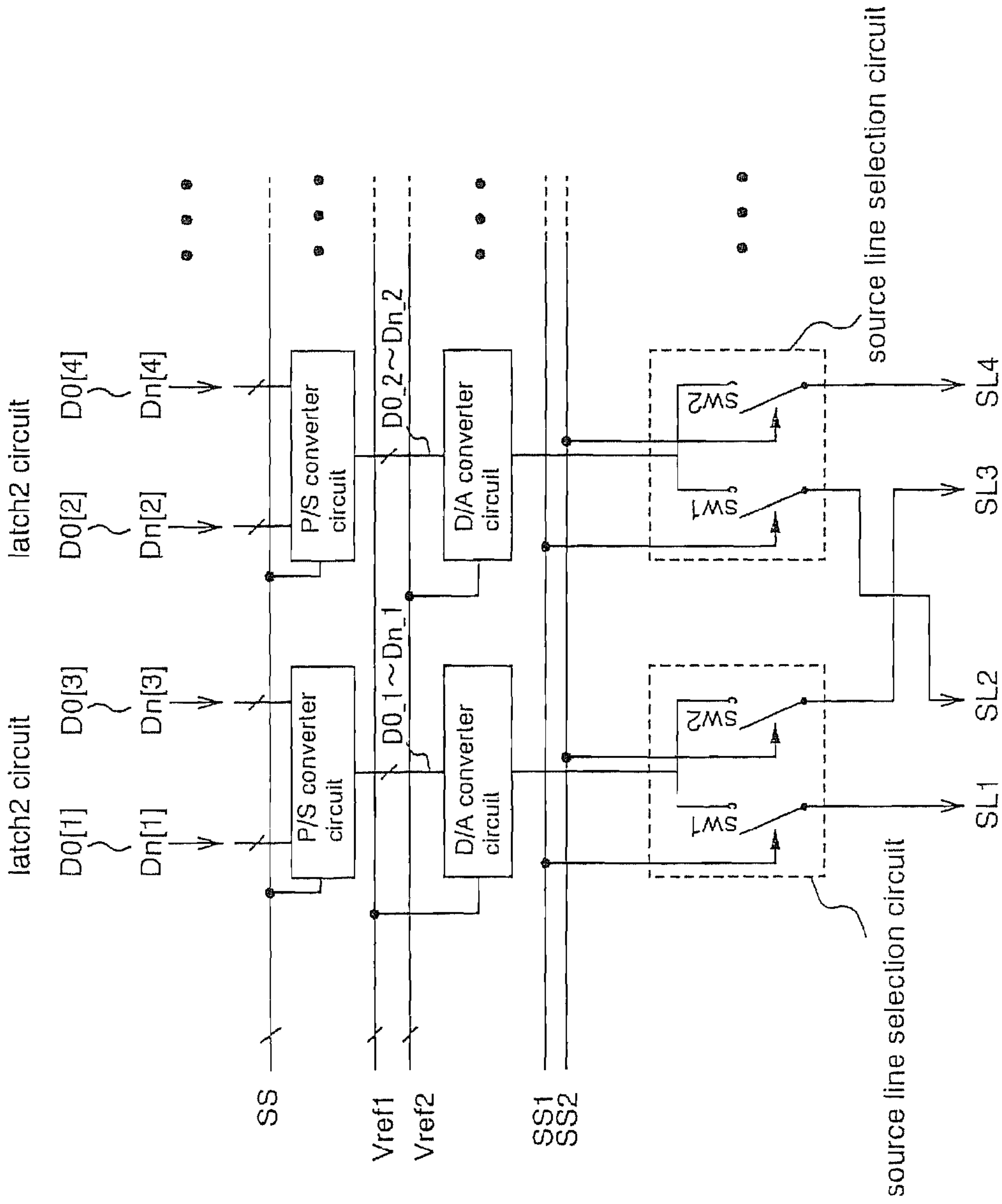
FIG. 10 is a schematic diagram of a driver circuit in accordance with embodiment mode 7 of the present invention.

A schematic circuit diagram of embodiment mode 7 is shown in FIG. 10. Similar to FIG. 1, a shift register portion, a latch (1) circuit portion, and a latch (2) circuit portion are omitted from FIG. 10. A parallel/serial converter circuit (P/S converter circuit) gathers together each bit of parallel output data from the latch (2) circuit (D0[4k+1] to Dn[4k+1] and D0[4k+3] to Dn[4k+3], or D0[4k+2] to Dn[4k+2] and D0[4k+4] to Dn[4k+4], where k is an integer greater than or equal to 0) and converts it into serial data.

The digital image signal input to each parallel/serial converter circuit is one of either the odd numbered source signal lines or the even numbered source signal lines. As a result, the digital image signal input to each D/A converter circuit is also one of either the odd numbered source signal lines or the even numbered source signal lines.

The first system of grey-scale electric power supply lines Vref1 is connected to each D/A converter circuit when the digital image signals of odd numbered source signal lines are input, and the second system of grey-scale electric power supply lines Vref2 is connected to each D/A converter circuit when the digital image signals of even numbered source signal lines are input.

A source line selection circuit is composed of two switches sw1 and sw2. When sw1 is on, the (4k+1) source signal line and the (4k+2) source signal line are connected to the output of each D/A converter circuit, and when sw2 is on, the (4k+3) source signal line and the (4k+4) source signal line are connected to the output of each D/A converter circuit. Reference numerals SS1 and SS2 denote selection signals for controlling the on/off state of the respective switches sw1 and sw2.

Figure 11:
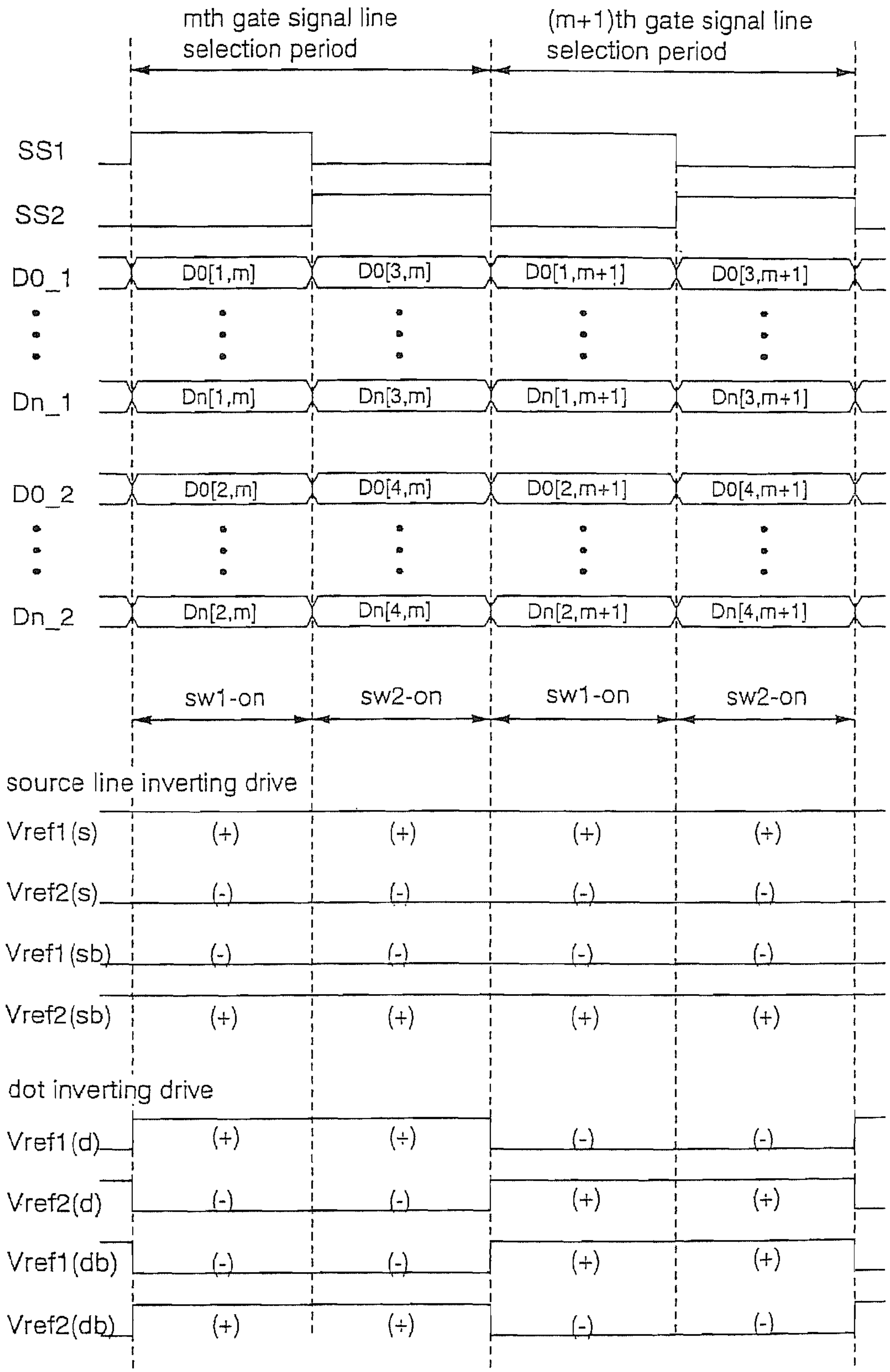
FIG. 11 is an example of operation timing in accordance with embodiment mode 7 of FIG. 10.

A signal operation timing diagram of FIG. 10 is shown in FIG. 11. One gate signal line selection period is divided into two, and SS1 is set to the HI level and sw1 is turned on in a first period. In a second period, SS2 is set to the HI level, and sw2 is turned on. Note that, the output of each bit of data from each P/S converter circuit is synchronized with the above selection signals SS1 to SS2. The gate signal line selection period is divided into two periods. The P/S converter circuit is controlled in accordance with an input selection signal so that the (4k+1) source signal line data or the (4k+2) source signal line data is output during the first of the four periods, while the (4k+3) source signal line data or the (4k+4) source signal line data is output during the second period. The digital image signal corresponding to each source signal line is thus written into the appropriate source signal line. This state is shown by reference numerals D0_1 to Dn_1, and in D0_2 to Dn_2 in FIG. 11. Reference numeral Di_1 denotes the (i+1) bit of the output data of the left P/S converter circuit in FIG. 10, and reference numeral Di_2 denotes the (i+1) bit of the output data of the right P/S converter circuit in FIG. 10.

A method of inputting the electric power supply voltage Vref of the first system of grey-scale power supply lines, and the electric power supply voltage Vref2 of the second system of grey-scale electric power supply lines, for a case of performing source line inverting drive is shown in reference symbols Vref1(*s*) and Vref1(*sb*), and in reference symbols Vref2(*s*) and Vref2(*sb*), in FIG. 11. A symbol "+" in the figure denotes supplying a plus polarity output voltage to the grey-scale electric power supply lines, while a symbol "–" denotes supplying a negative polarity output voltage to the grey-scale electric power supply lines. Further, reference symbol Vref1 (*sb*) denotes the method of input of the electric power supply voltage Vref1 of the first system of grey-scale electric power supply line in the next frame period when Vref1(*s*) is being input. This has an inverse relationship with Vref1(*s*). Similarly, reference symbol Vref2(*sb*) denotes the method of input of the electric power supply voltage Vref2 of the second system of grey-scale electric power supply line in the next frame period when Vref2(*s*) is being input. This has an inverse relationship with Vref2(*s*). As a result, the polarity written into each pixel becomes as shown in FIG. 12A.

Further, a method of inputting the electric power supply voltage Vref1 of the first system of grey-scale power supply lines and the electric power supply voltage Vref2 of the second system of grey-scale electric power supply lines for a case of performing dot inverting drive is shown in reference symbols Vref1(*d*) and Vref1(*db*), and in reference symbols Vref2(*d*) and Vref2(*db*), in FIG. 11. Reference symbol Vref1 (*db*) denotes the method of input of the electric power supply voltage Vref1 of the first system of grey-scale electric power supply line in the next frame period when Vref1(*d*) is being input. This has an inverse relationship with Vref1(*d*). Similarly, reference symbol Vref2(*db*) denotes the method of input of the electric power supply voltage Vref2 of the second system of grey-scale electric power supply line in the next frame period when Vref2(*d*) is being input. This has an inverse relationship with Vref2(*d*). As a result, the polarity written into each pixel becomes as shown in FIG. 12B.

It thus becomes possible to perform source line inverting drive and dot inverting drive for a case of driving two source signal lines by one D/A converter circuit in accordance with embodiment mode 7. Note that, an example of driving two source signal lines by one D/A converter circuit is given in embodiment mode 7, but the present invention is not limited to this example. The present invention can be applied to driving an arbitrary number of source signal lines by using one D/A converter circuit. Note that, when one D/A converter circuit is used for driving two source signal lines, embodiment mode 6 becomes equivalent to embodiment mode 5.

Although a parallel/serial converter circuit (P/S converter circuit) is used in all of the embodiment modes, as stated above, the present invention is not limited by the presence or absence of the parallel/serial converter circuit. In other words, the present invention can also be applied to a method of serial input of a digital image signal of a plurality of source signal lines to a D/A converter circuit during one horizontal write in period.

Embodiments

Embodiments of the present invention are explained below while referring to the figures. The present invention is not limited to the below embodiments.

Embodiment 1

An active matrix liquid crystal display device is taken as an example and explained in embodiment 1 as a specific embodiment of embodiment mode 1.

Figure 40:
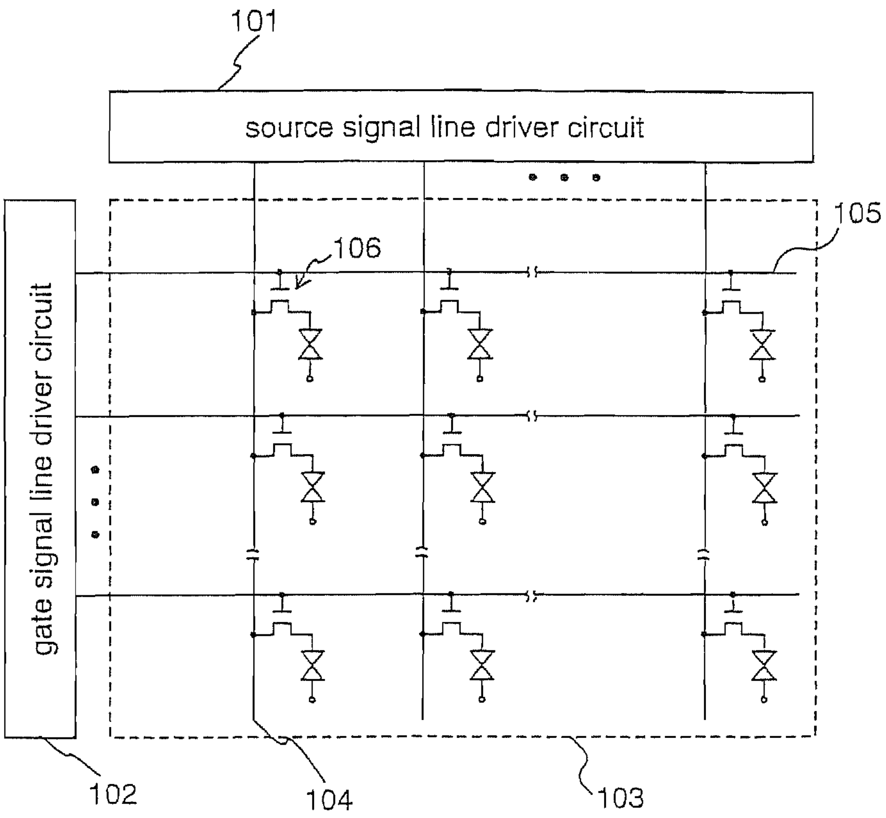
FIG. 40 is a schematic diagram of an active matrix liquid crystal display device.
Figure 41:
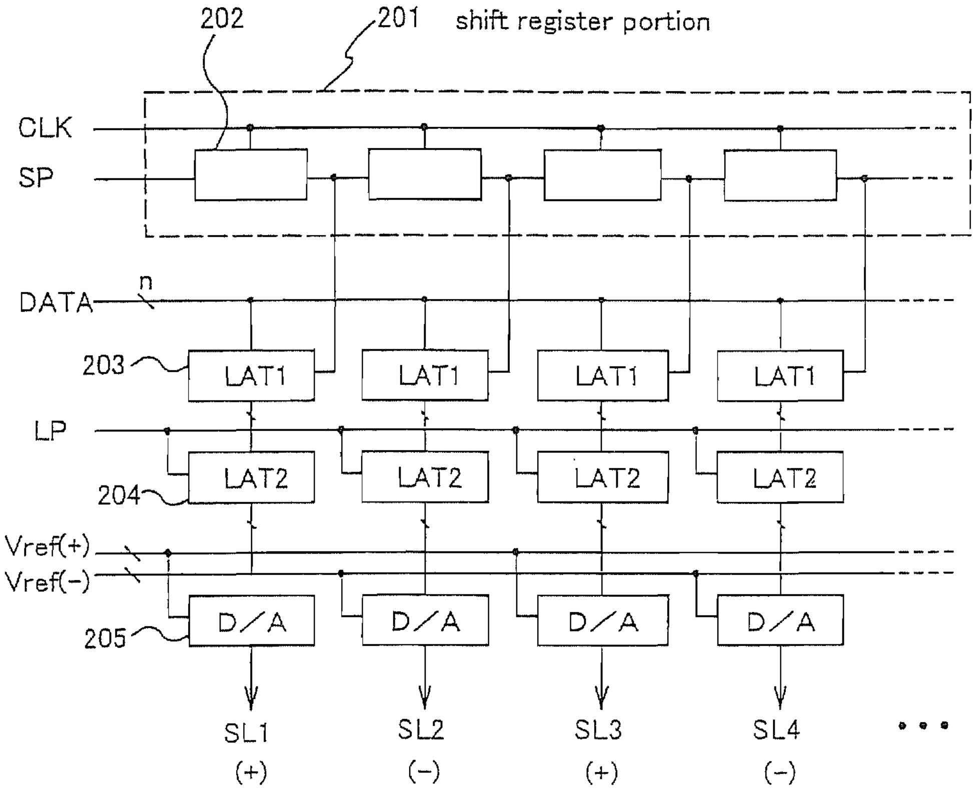
FIG. 41 is a schematic diagram of a conventional digital source signal line driver circuit.
Figure 42:
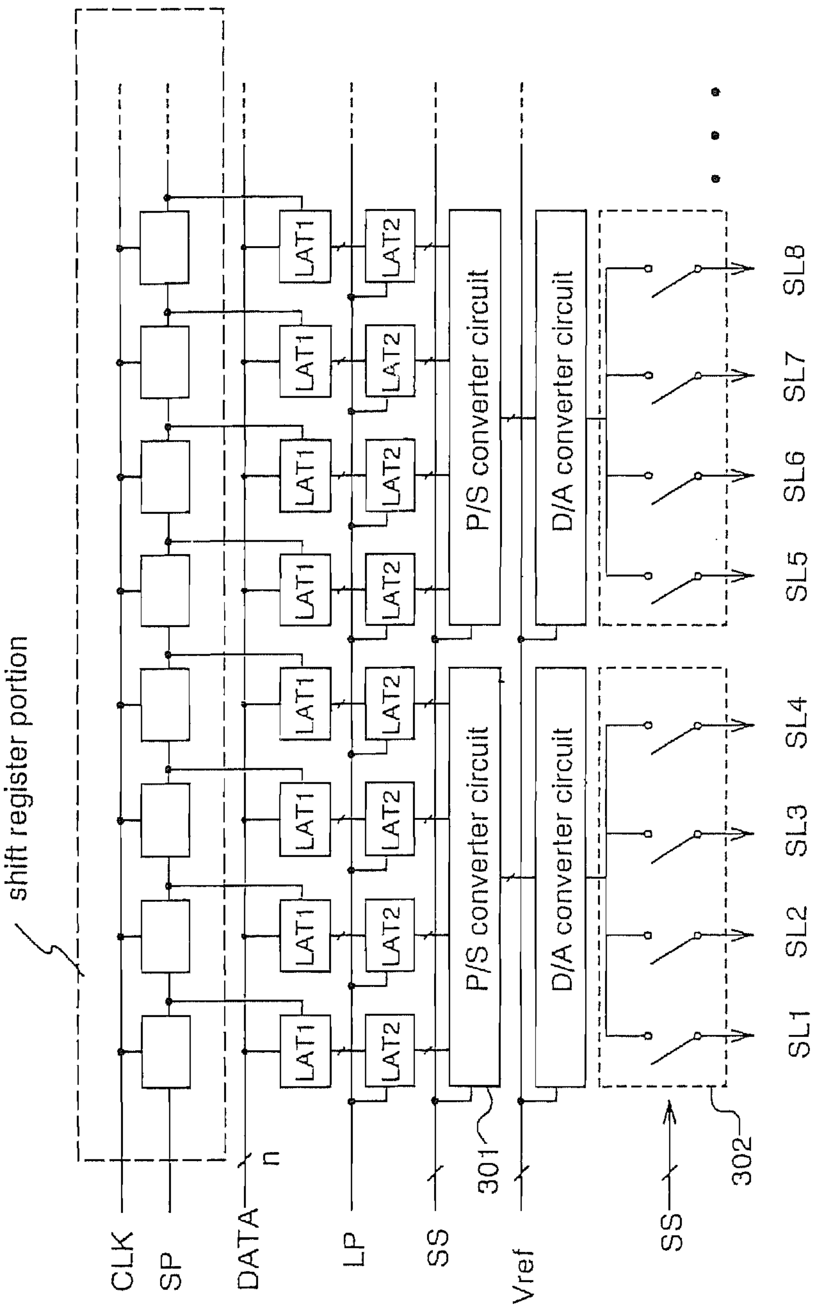
FIG. 42 is a schematic diagram of a source signal line driver circuit for driving four source signal lines by using one D/A converter circuit.
Figure 43:
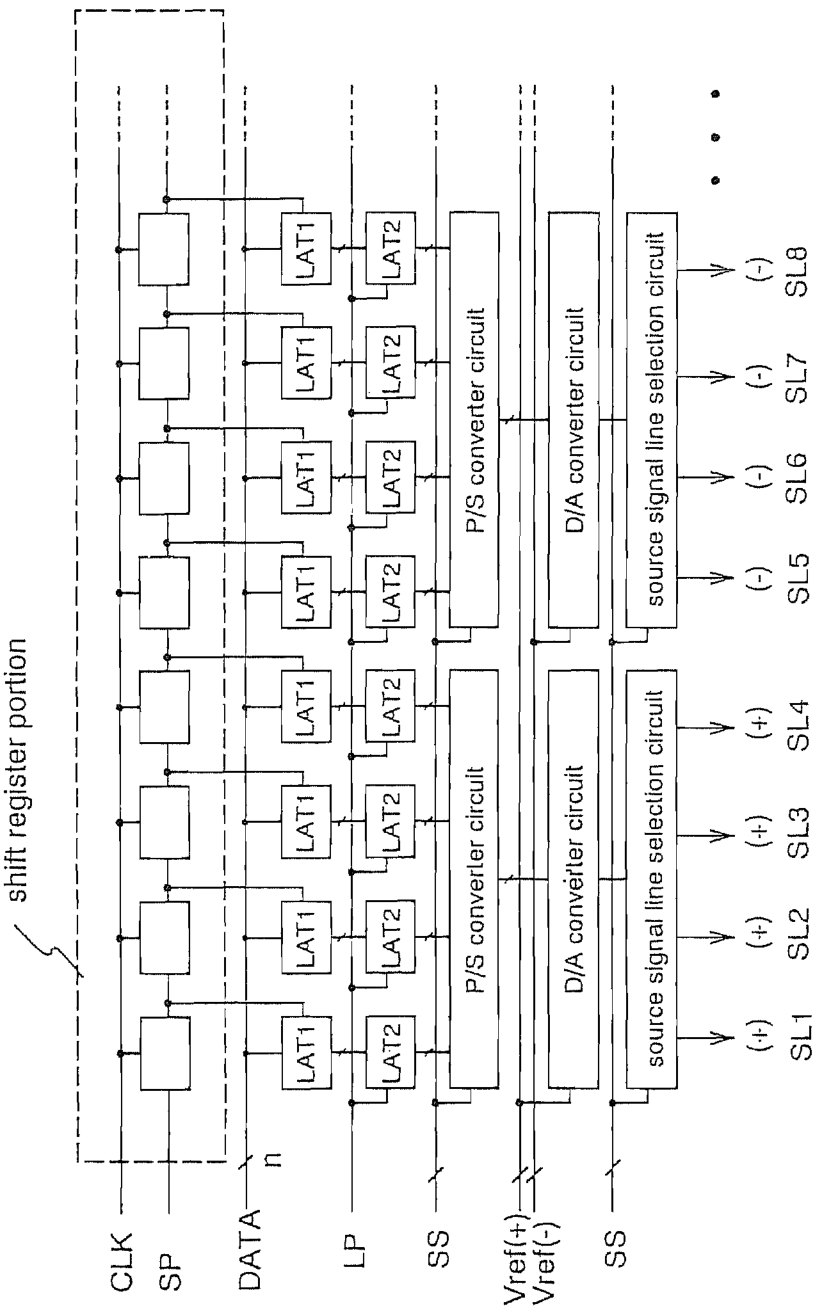
FIG. 43 is a schematic diagram of a source signal line driver circuit in a case of connecting a grey-scale electric power supply line to a D/A converter circuit and of driving four source signal lines by using one D/A converter circuit.

As shown in FIG. 40, the active matrix liquid crystal display device is composed of a source signal line driver circuit 101, a gate signal line driver circuit 102, and a pixel array portion 103 arranged in matrix.

Figure 13:
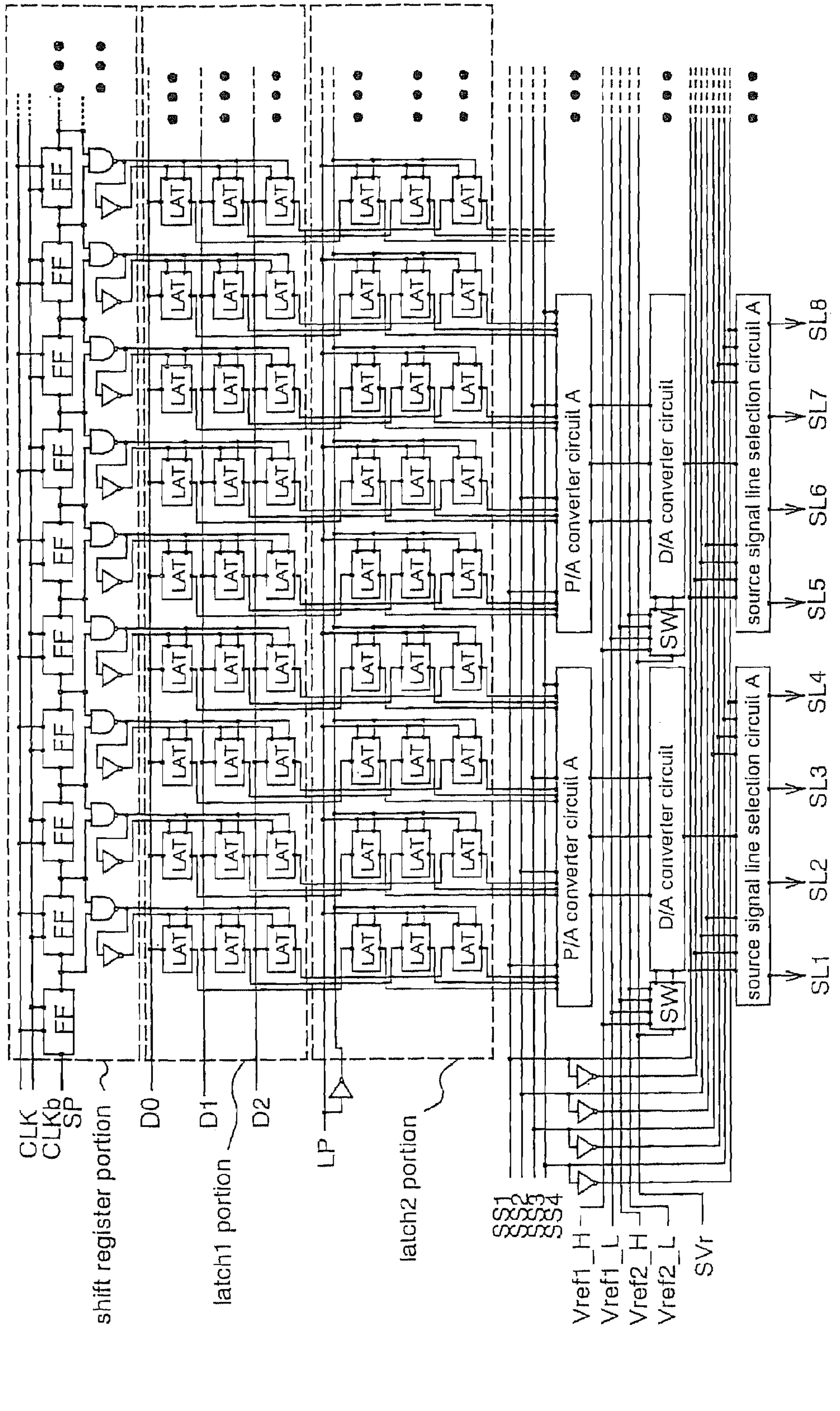
FIG. 13 is a schematic diagram of a source signal line driver circuit in accordance with embodiment 1.

A circuit structure example of a source signal line driver circuit corresponding to embodiment mode 1 is shown in FIG. 13. Further, for convenience, an input digital image signal is taken as having three bits, and a case of driving four source signal lines by using one D/A converter circuit is explained.

Figure 14A:
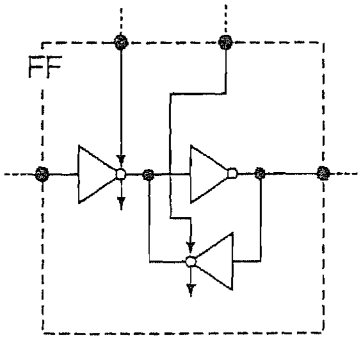
FIG. 14A is a diagram showing a flip flop circuit in FIG. 13.

Please refer to FIG. 13. A shift register portion has a flip-flop circuit FF, a NAND circuit, and an inverter, and a clock signal CLK, a clock signal CLKb which is an inverted clock signal CLK, and a start pulse SP are input. As shown in FIG. 14A, the flip-flop circuit is structured by a clocked inverter and an inverter.

When the start pulse SP is input, sampling pulses are shifted in order synchronously with the clock signals CLK and CLKb.

Figure 14B:
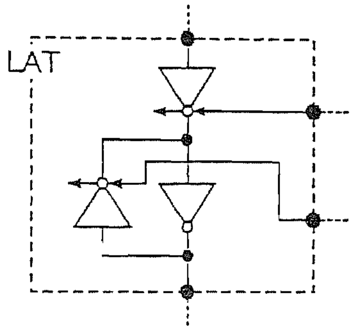
FIG. 14B is a diagram showing a basic latch circuit LAT in FIG. 13.

A latch 1 portion and a latch 2 portion which are the storage circuits, are composed of basic latch circuits LAT. FIG. 14B shows a basic latch circuit. The basic latch circuit LAT is structured by a clocked inverter and an inverter. A three-bit digital image signal (D0, D1, D2) is input to the latch 1 portion, and the digital image signal is latched in accordance with the sampling pulse from the shift register portion. The latch 2 portion simultaneously latches the digital image signal stored in the latch 1 portion, in accordance with a latch pulse LP input during a horizontal return period, and at the same time transmits information to circuits downstream. One horizontal write-in period of data is stored in the latch 2 portion at this time.

Note that, the connections of p-channel type clock input terminal of each clocked inverter is omitted in FIGS. 14A and 14B, and in practice an inverted signal of a clock signal input to n-channel type clocked input terminal is input. Further, the flip-flop circuit FF and the basic latch circuit LAT have the same circuit structure in embodiment 1, but different circuit structures may also be used.

Figure 15A:
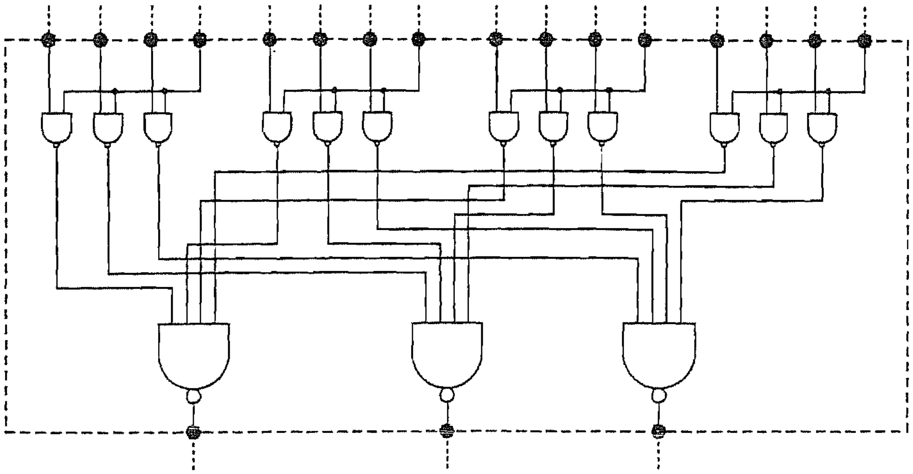
FIG. 15A is a diagram showing a P/S conversion circuit of FIG. 13.

The 3 bit data×4 (a four source signal line portion) digital image signal stored in the latch 2 portion is input to a parallel/serial converter circuit (taken as a P/S converter circuit A in FIG. 13), along with externally input selection signals SS1 to SS4. As shown in FIG. 15A, the P/S converter circuit A is structured by the NAND circuit.

Figure 17:
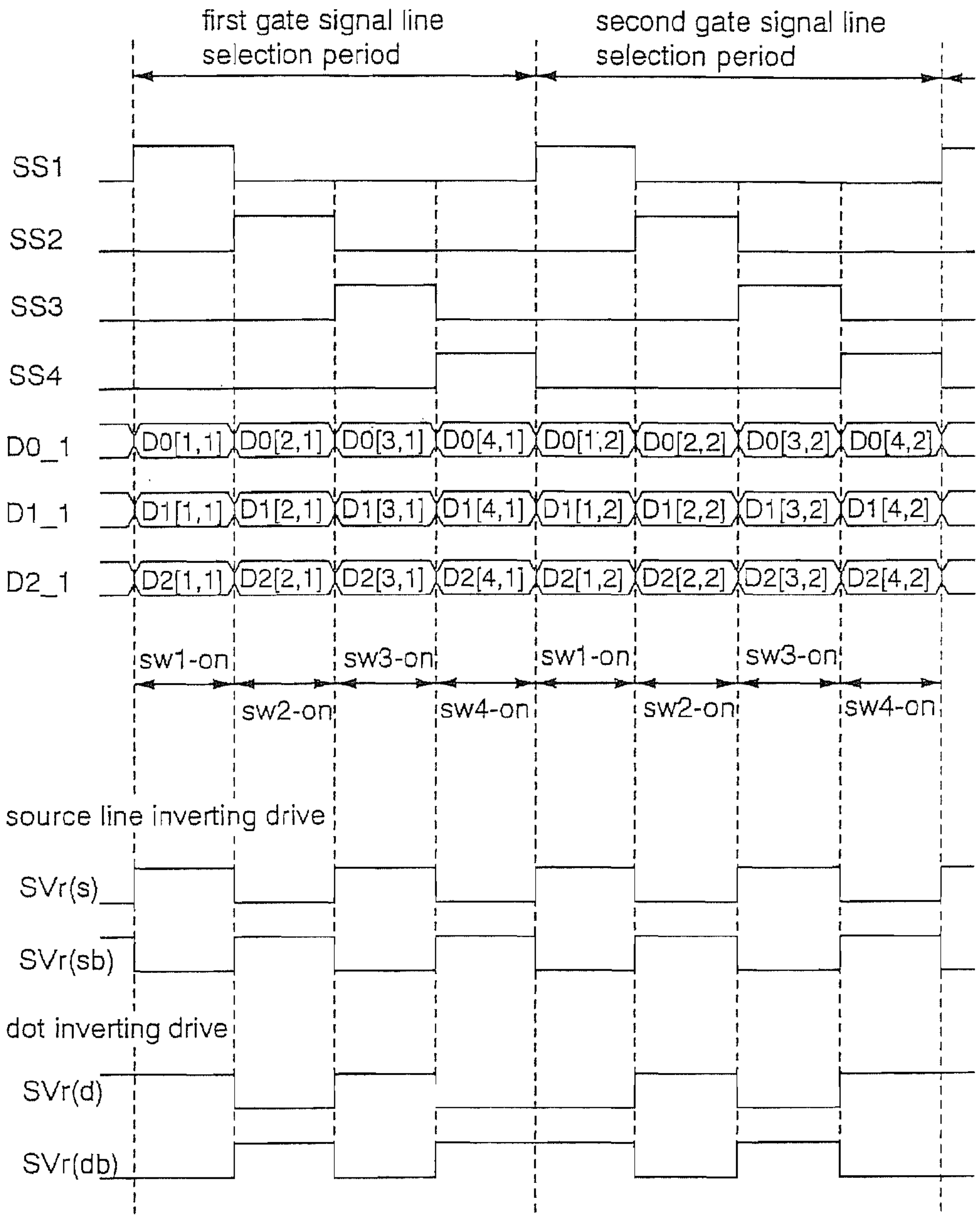
FIG. 17 is an example of operation timing in accordance with embodiment 1.

Signal operation timing focusing on the P/S converter circuit A involving first to fourth source signal lines SL1 to SL4 is shown in FIG. 17. One gate signal line selection period is divided into four, SS1 is set to HI level in the first period, and the digital image signal of the first source signal line SL1 is output to the D/A converter circuit. During the second period, SS2 is set to HI level and the digital image signal of the second source signal line SL2 is output to the D/A converter circuit, while during the third period SS3 is set to HI level and the digital image signal of the third source signal line SL3 is output to the D/A converter circuit. In the final fourth period SS4 is set to HI level, and the digital image signal of the fourth source signal line SL4 is output to the D/A converter circuit. This state is shown in D0_1, D1_1, and D2_1 in FIG. 17. Di_1 is the (i+1) bit of the output data from the P/S converter circuit A relating to the first to fourth source signal lines SL1 to SL4 which are focused upon here. Further, as stated above, the symbol Di[s,g] denotes the (i+1) bit of data corresponding to an s column, g row pixel.

Similar operations relating to other source signal lines (such as SL5 to SL8, and SL9 to SL12), are also performed in parallel by the P/S converter circuit A.

Figure 16:
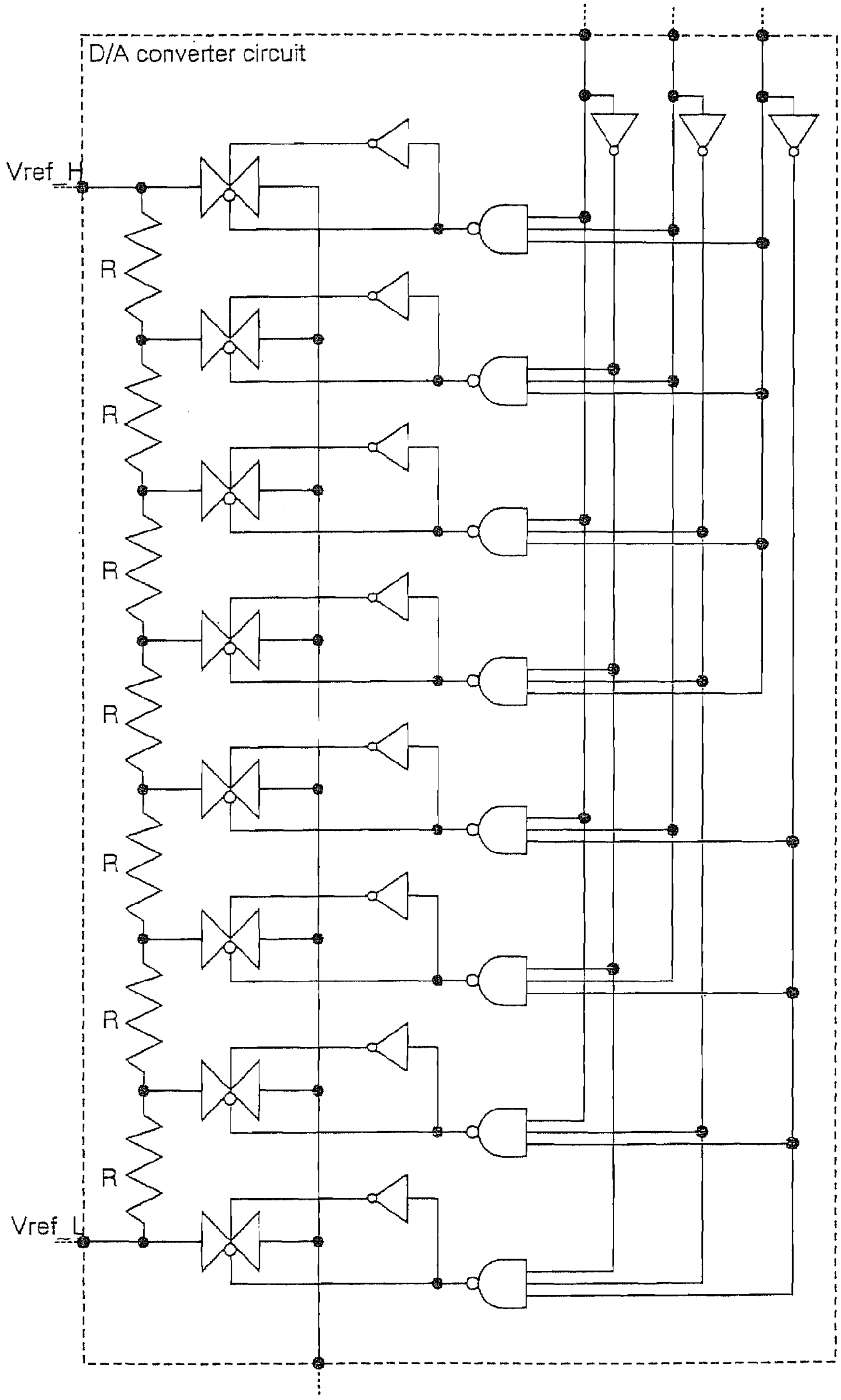
FIG. 16 is a D/A conversion circuit diagram.

An example of a circuit structure of the D/A converter circuit is shown in FIG. 16. FIG. 16 is a resistive string type D/A converter circuit, and it is necessary to supply two grey-scale electric power supply lines in order to obtain an output in a certain electric voltage range. These are shown by symbols Vref_L and Vref_H in FIG. 16. The grey-scale electric power supply lines are divided by a resistor, and voltage values corresponding to the 3-bit input digital image signal are output.

In accordance with embodiment mode 1, two systems of independent grey-scale electric power supply lines are supplied to the source signal line driver circuit, and therefore four grey-scale electric power supply lines are required in total. A first system is denoted by symbols Vref1_L and Vref1_H, and a second system is denoted by symbols Vref2_L and Vref2_H in FIG. 13.

Figure 14C:
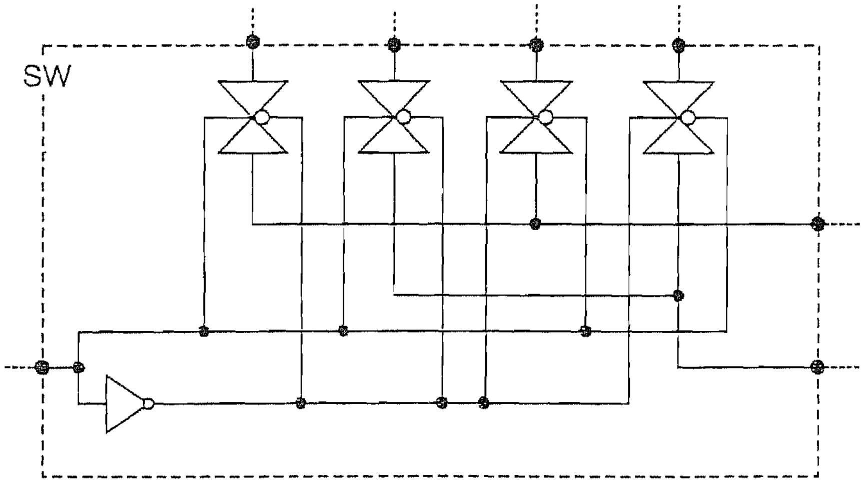
FIG. 14C is a diagram showing a switch SW for switching a connection between gray-scale electric power supply lines and a D/A conversion circuit.

An example of a circuit structure of a connection switching switch SW for switching the connection of the above two systems of grey-scale electric power supply lines and the D/A converter circuit is shown in FIG. 14C. When a control signal SVr is HI, the first system of grey-scale electric power supply lines Vref1_L and Vref1_H is connected to the D/A converter circuit, and when the control signal SVr is LO, the second system of grey-scale electric power supply lines Vref2_L and Vref2_H is connected to the D/A converter circuit, provided that connection example of FIG. 13 is used.

Figure 15B:
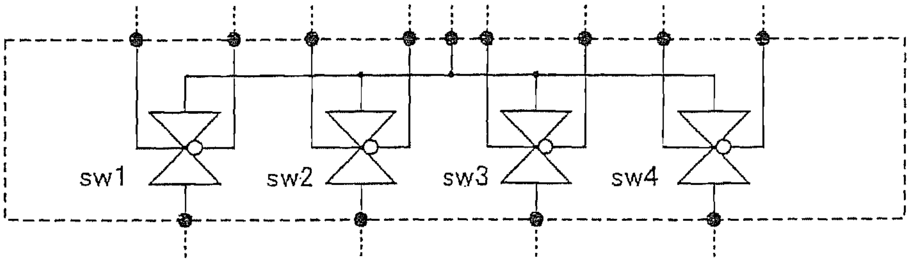
FIG. 15B is a diagram showing a source line selection circuit A of FIG. 13.

The output of the D/A converter circuit is connected to appropriate source signal lines via a source line selection circuit A. An example circuit structure of the source line selection circuit A is shown in FIG. 15B. The source line selection circuit A is composed of four transfer gates (switches), and the selection signals SS1 to SS4, and the inversions of those signals, are input to each gate. In accordance with the signal operation timing of FIG. 17, one gate signal line selection period is divided into four, a switch sw1 is set to ON in a first period, and the output of the D/A converter circuit is written to the first source signal line SL1. A switch sw2 is turned on in a second period, and the output of the D/A converter circuit is written to the second source signal line SL2: Next, a switch sw3 is set on in a third period, and the output of the D/A converter circuit is written to the third source signal line SL3, while finally a fourth switch sw4 is set on in a fourth period and the output of the D/A converter circuit is written to the fourth source signal line SL4.

This type of write-in is performed in parallel for other source signal lines. The data written into each source signal line is written into each pixel in order in accordance with the work of the gate signal line driver circuit and pixel TFTs.

An example of the input of the control signal SVr when performing source line inverting drive is shown in symbols SVr(s) and SVr(sb) in FIG. 17. The symbol SVr(sb) denotes the control signal SVr of the next frame period when SVr(s) is being input, and is an inverted signal of SVr(s).

Within a certain frame period, one gate signal line selection period is divided into four, the control signal SVr is set to HI in a first period and a third period, and the first system of grey-scale electric power supply lines is connected to the D/A converter circuit. The control signal SVr is set to LO in a second period and in a fourth period, and the second system of grey-scale electric power supply lines is connected to the D/A converter circuit (Refer to see SVr(s) of FIG. 17).

One gate signal line selection period is divided into four within the next frame period, the control signal SVr is set to HI in a first period and a third period, and the second system of grey-scale electric power supply lines is connected to the D/A converter circuit. The control signal SVr is set to HI in a second period and in a fourth period, and the first system of grey-scale electric power supply lines is connected to the D/A converter circuit (Refer to SVr(sb) of FIG. 17).

Voltage values of the first system of grey-scale electric power supply lines Vref1_L and Vref1_H are set to +1 V and +5 V, respectively, in embodiment 1, while voltage values of the second system of grey-scale electric power supply lines Vref2_L and Vref2_H are set to −1 V and −5 V, respectively. This indicates that a plus polarity is output provided that the D/A converter circuit is connected to the first system of grey-scale electric power supply lines, and that a minus polarity is output provided that the D/A converter is connected to the second system of grey-scale electric power supply lines.

The source line inverting drive shown by FIG. 12A becomes possible in accordance with the above method.

Furthermore, an example of input of the control signal SVr is shown in SVr(d) and SVr(db) of FIG. 17 for a case of performing dot inverting control. The symbol SVr(db) denotes the control signal SVr of the next frame period when SVr(d) is being input, and is an inversion of SVr(d). In addition, the control signal SVr of a certain gate signal line selection period is an inversion of the control signal of the directly preceding gate signal line selection period.

Thus the dot inverting drive shown by FIG. 12B becomes possible.

Note that, the selection signals SS1 to SS4 input to the P/S converter circuit A and to the source line selection circuit A are identical in embodiment 1, but it is also possible to use separate systems.

Furthermore, a circuit driver electric voltage supply supplied to the source signal line driver circuit in embodiment 1 is assumed to be that of one system, but a level shifter circuit may be inserted in portions where necessary for two or more systems.

Embodiment 2

An active matrix liquid crystal display device is taken as a specific example of embodiment mode 2 and explained in embodiment 2. Further, the explanation below focuses on a source signal line driver circuit, similar to embodiment 1.

Figure 18:
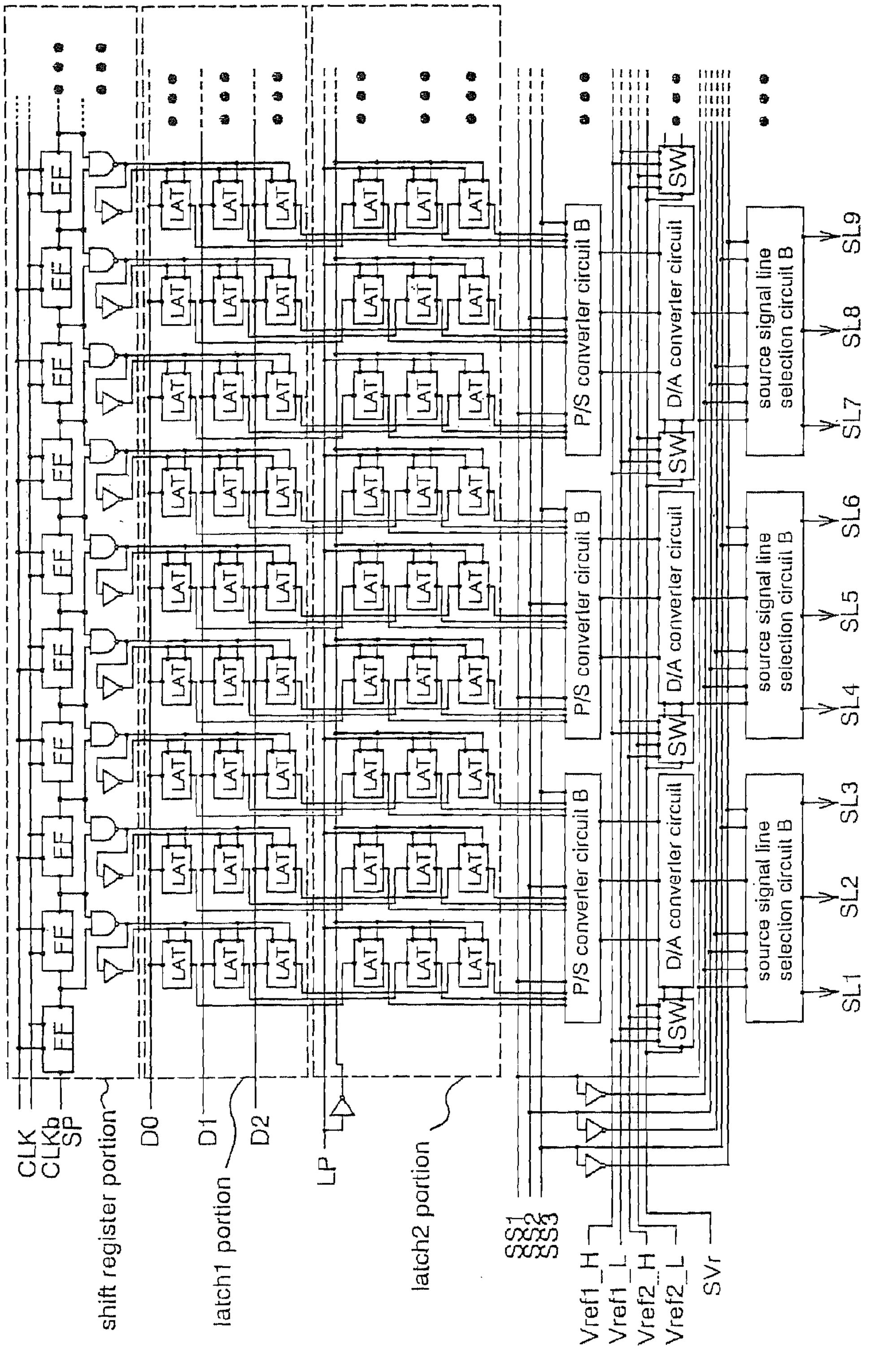
FIG. 18 is a schematic diagram of a source signal line driver circuit in accordance with embodiment 2.

An example circuit structure of a source signal line driver circuit corresponding to embodiment mode 2 is shown in FIG. 18. Further, for convenience, an input digital image signal is taken as having three bits, and a case of driving three source signal lines by using one D/A converter circuit is explained.

Please refer to FIG. 18. A shift register portion, a latch 1 portion, and a latch 2 portion are the same as those of embodiment 1.

Figure 23A:
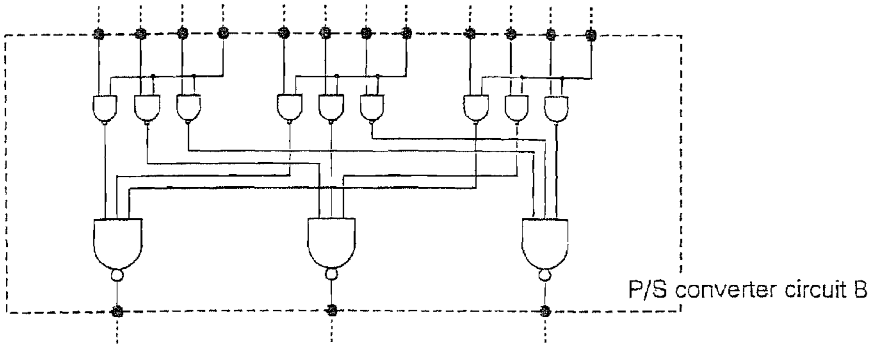
FIG. 23A is a diagram showing a P/S conversion circuit B in FIG. 18.

A 3 bit data×3 (a three source signal line portion) digital image signal stored in the latch 2 portion is input to a parallel/serial converter circuit (taken as a P/S converter circuit B in FIG. 18), along with externally input selection signals SS1 to SS3. The P/S converter circuit B is composed of NAND circuits, as shown in FIG. 23A.

Figure 19:
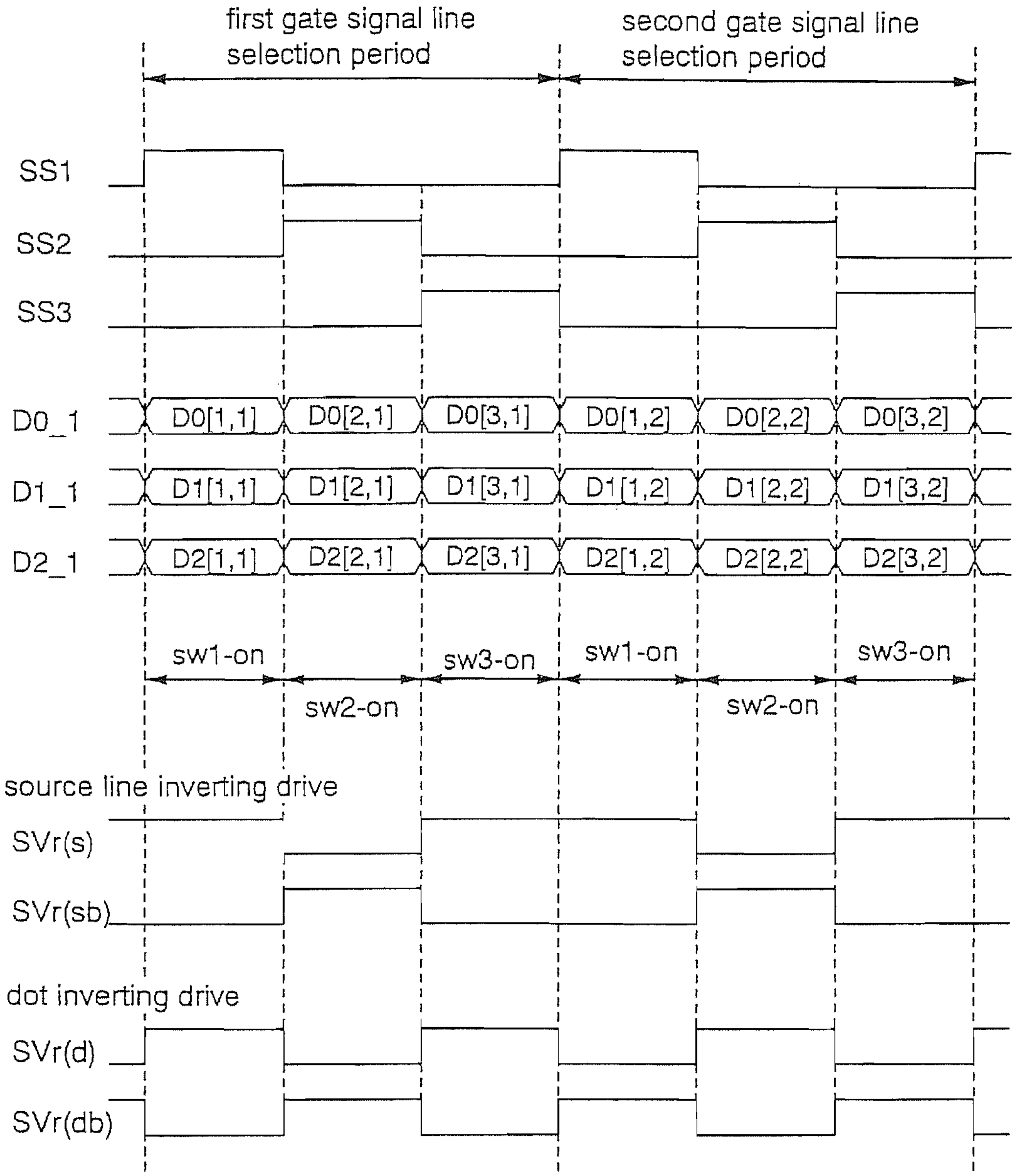
FIG. 19 is an example of operation timing in accordance with embodiment 2.

Signal operation timing focusing on the P/S converter circuit B involving first to third source signal lines SL1 to SL3 is shown in FIG. 19. One gate signal line selection period is divided into three, SS1 is set to HI level in the first period, and the digital image signal of the first source signal line SL1 is output to the D/A converter circuit. During the second period, SS2 is set to HI level and the digital image signal of the second source signal line SL2 is output to the D/A converter circuit, while during the final third period SS3 is set to HI level and the digital image signal of the third source signal line SL3 is output to the D/A converter circuit. This state is shown in D0_1, D1_1, and D2_1 in FIG. 19. Di_1 is the (i+1) bit of the output data from the P/S converter circuit B relating to the first to third source signal lines SL1 to SL3 which are focused on here. Further, as stated above, the symbol Di[s,g] denotes the (i+1) bit of data corresponding to an s column, g row pixel.

Similar operations relating to other source signal lines (such as SL4 to SL6, and SL7 to SL9), are also performed in parallel by the P/S converter circuit B.

The D/A converter circuit is the same as that shown by FIG. 16 of embodiment 1.

In embodiment mode 2 as well, two systems of independent grey-scale electric power supply lines are supplied to the source signal line driver circuit, and therefore four grey-scale electric power supply lines are required in total. A first system is denoted by symbols Vref1_L and Vref1_H, and a second system is denoted by symbols Vref2_L and Vref2_H in FIG. 18.

An example of a circuit structure of a connection switching switch SW for switching the connection of the two systems of grey-scale electric power supply lines and the D/A converter circuit is shown in FIG. 14C. However, the method of connecting the grey-scale electric power supply lines differs. In other words, the connection of adjoining connection switching switches SW to the first system and the second system of grey-scale electric power supply lines is alternately changed. When a control signal SVr is HI, the first system of grey-scale electric power supply lines Vref1_L and Vref1_H is connected to the D/A converter circuit, and when the control signal SVr is LO, the second system of grey-scale electric power supply lines Vref2_L and Vref_H is connected to the D/A converter circuit, provided that connection example of FIG. 18 is used. On the other hand, for the connection switching switches SW related to neighboring fourth to sixth source signal lines SL4 to SL6, when the control signal SVr is HI, the second system of grey-scale electric power supply lines Vref2_L and Vref2_H is connected to the D/A converter circuit, and when the control signal SVr is LO, the first system of grey-scale electric power supply lines Vref1_L and Vref1_H is connected to the D/A converter circuit.

Figure 23B:
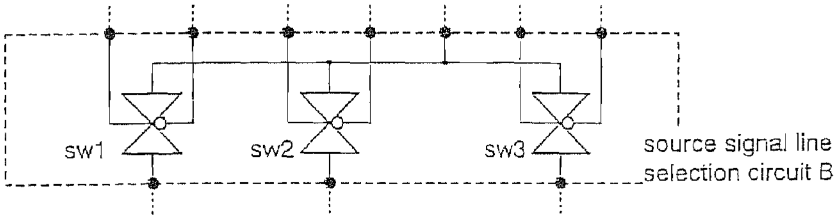
FIG. 23B is a diagram showing a source line selection circuit B in FIG. 18.

The output of the D/A converter circuit is connected to appropriate source signal lines via a source line selection circuit B. An example circuit structure of the source line selection circuit B is shown in FIG. 23B. The source line selection circuit B is composed of three transfer gates (switches), and the selection signals SS1 to SS3, and the inversions of those signals, are input to each gate. In accordance with the signal operation timing of FIG. 19, one gate signal line selection period is divided into three, a switch sw1 is set to ON in a first period, and the output of the D/A converter circuit is written to the first source signal line SL1. A switch sw2 is turned on in a second period, and the output of the D/A converter circuit is written to the second source signal line SL2. Finally, a switch sw3 is set on in a third period, and the output of the D/A converter circuit is written to the third source signal line SL3.

This type of write-in is performed in parallel for other source signal lines. The data written into each source signal line is written into each pixel in order in accordance with the work of the gate signal line driver circuit and the pixel TFTs.

An example of the input of the control signal SVr when performing source line inverting drive is shown in symbols SVr(s) and SVr(sb) in FIG. 19. The symbol SVr(sb) denotes the control signal SVr of the next frame period when SVr(s) is being input, and is an inverted signal of SVr(s).

Within a certain frame period, one gate signal line selection period is divided into three, the control signal SVr is set to HI in a first period and a third period, and the connection switching switches SW relating to first to third source signal lines SL1 to SL3, seventh to ninth signal lines SL7 to SL9, and so on, connect the second system of grey-scale electric power supply lines to corresponding D/A converter circuits. The connection switching switches SW related to fourth to sixth source signal lines SL4 to SL6, tenth to twelfth source signal lines SL10 to SL12, and so on, connect the second system of grey-scale electric power supply lines to corresponding D/A converter circuits. Conversely, one gate signal line selection period is divided into three, the control signal SVr is set to LO in a second period, and the connection switching switches SW relating to first to third source signal lines SL1 to SL3, seventh to ninth signal lines SL7 to SL9, and so on, connect the second system of grey-scale electric power supply lines to corresponding D/A converter circuits. The connection switching switches SW related to fourth to sixth source signal lines SL4 to SL6, tenth to twelfth source signal lines SL10 to SL12, and so on, connect the first system of grey-scale electric power supply lines to corresponding D/A converter circuits (Refer to SVr(s) of FIG. 19).

Within the next frame period, one gate signal line selection period is divided into three, the control signal SVr is set to LO in a first period and a third period, and the connection switching switches SW relating to first to third source signal lines SL1 to SL3, seventh to ninth signal lines SL7 to SL9, and so on, connect the second system of grey-scale electric power supply lines to corresponding D/A converter circuits. The connection switching switches SW related to fourth to sixth source signal lines SL4 to SL6, tenth to twelfth source signal lines SL10 to SL12, and so on, connect the first system of grey-scale electric power supply lines to corresponding D/A converter circuits. Conversely, one gate signal line selection period is divided into three, the control signal SVr is set to HI in a second period, and the connection switching switches SW relating to first to third source signal lines SL1 to SL3, seventh to ninth signal lines SL7 to SL9, and so on, connect the first system of grey-scale electric power supply lines to corresponding D/A converter circuits. The connection switching switches SW related to fourth to sixth source signal lines SL4 to SL6, tenth to twelfth source signal lines SL10 to SL12, and so on, connect the second system of grey-scale electric power supply lines to corresponding D/A converter circuits (Refer to SVr(sb) of FIG. 19).

Similar to embodiment 1, voltage values of the first system of grey-scale electric power supply lines Vref1_L and Vref1_H are set to +1 V and +5 V, respectively, in embodiment 2, while voltage values of the second system of grey-scale electric power supply lines Vref2_L and Vref2_H are set to −1 V and −5 V, respectively. Thus, a plus polarity is output provided that the D/A converter circuit is connected to the first system of grey-scale electric power supply lines, and a minus polarity is output provided that the D/A converter is connected to the second system of grey-scale electric power supply lines.

The source line inverting drive shown by FIG. 12A becomes possible in accordance with the above method.

Furthermore, an example of inputting the control signal SVr is shown in SVr(d) and SVr(db) of FIG. 19 for a case of performing dot inverting drive. The symbol SVr(db) denotes the control signal SVr of the next frame period when SVr(d) is being input, and is an inversion of SVr(d). In addition, the control signal SVr of a certain gate signal line selection period is an inversion of the control signal of the directly preceding gate signal line selection period.

Thus, the dot inverting drive shown by FIG. 12B becomes possible.

Note that, the selection signals SS1 to SS3 input to the P/S converter circuit B and to the source line selection circuit B are identical in embodiment 2, but it is also possible to use separate systems.

Furthermore, a circuit driver electric power supply supplied to the source signal line driver circuit in embodiment 2 is assumed to be that of one system, but a level shifter circuit may be inserted in portions where necessary for two or more systems.

Embodiment 3

An active matrix liquid crystal display device is taken as a specific example of embodiment mode 3 and explained simply in embodiment 3.

An example circuit structure of a source signal line driver circuit corresponding to embodiment mode 3 is the same as embodiment 1 and is shown in FIG. 13. What differs from embodiment 1 is a method of inputting selection signals SS1 to SS4 and a control signal SVr. The selection signals SS1 to SS4 as shown by FIG. 5 are input, and the control signal SVr may be input as SVr(s) and SVr(sb) when performing source line inverting drive, and as SVr(d) and SVr(db) when performing dot inverting drive.

Embodiment 4

An active matrix liquid crystal display device is taken as a specific example of embodiment mode 4 and explained simply in embodiment 4.

An example circuit structure of a source signal line driver circuit corresponding to embodiment mode 4 is the same as embodiment 2 and is shown in FIG. 13. What differs from embodiment 2 is a method of inputting selection signals SS1 to SS3 and a control signal SVr. The selection signals SS1 to SS3 as shown by FIG. 6 are input, and the control signal SVr may be input as SVr(s) and SVr(sb) when performing source line inverting drive, and as SVr(d) and SVr(db) when performing dot inverting drive.

Embodiment 5

An active matrix liquid crystal display device is taken as an example and explained in embodiment 5 as a specific embodiment of embodiment mode 6. Furthermore, similar to that of embodiments 1 to 4, the explanation below is made focusing on a source signal line driver circuit.

Figure 20:
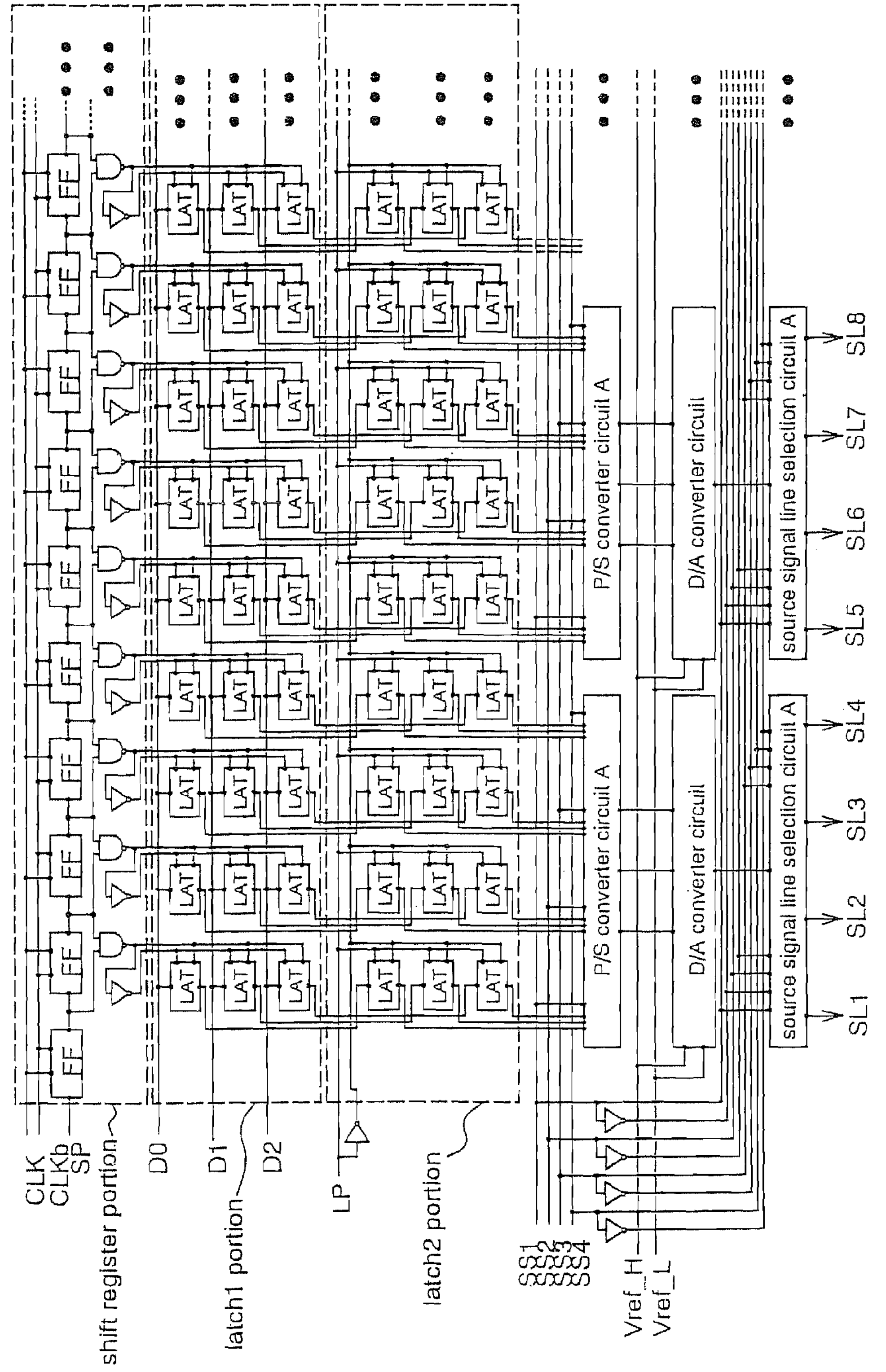
FIG. 20 is a schematic diagram of a source signal line driver circuit in accordance with embodiment 5.

An example circuit diagram of a source signal line driver circuit corresponding to embodiment mode 6 is shown in FIG. 20. Further, for convenience, an input digital image signal is taken as having three bits, and a case of driving four source signal lines by using one D/A converter circuit is explained.

Please refer to FIG. 20. A shift register portion, a latch 1 portion, and a latch 2 portion are the same as those of embodiments 1 to 4.

A 3 bit data×4 (a four source signal line portion) digital image signal stored in the latch 2 portion is input to a parallel/serial converter circuit A (a P/S converter circuit A), along with externally input selection signals SS1 to SS4. As shown in FIG. 15A, the P/S converter circuit is composed of NAND circuits. This is the same circuit as used by embodiment 1.

Figures 21, 21A, 21B, 21C, 21D:
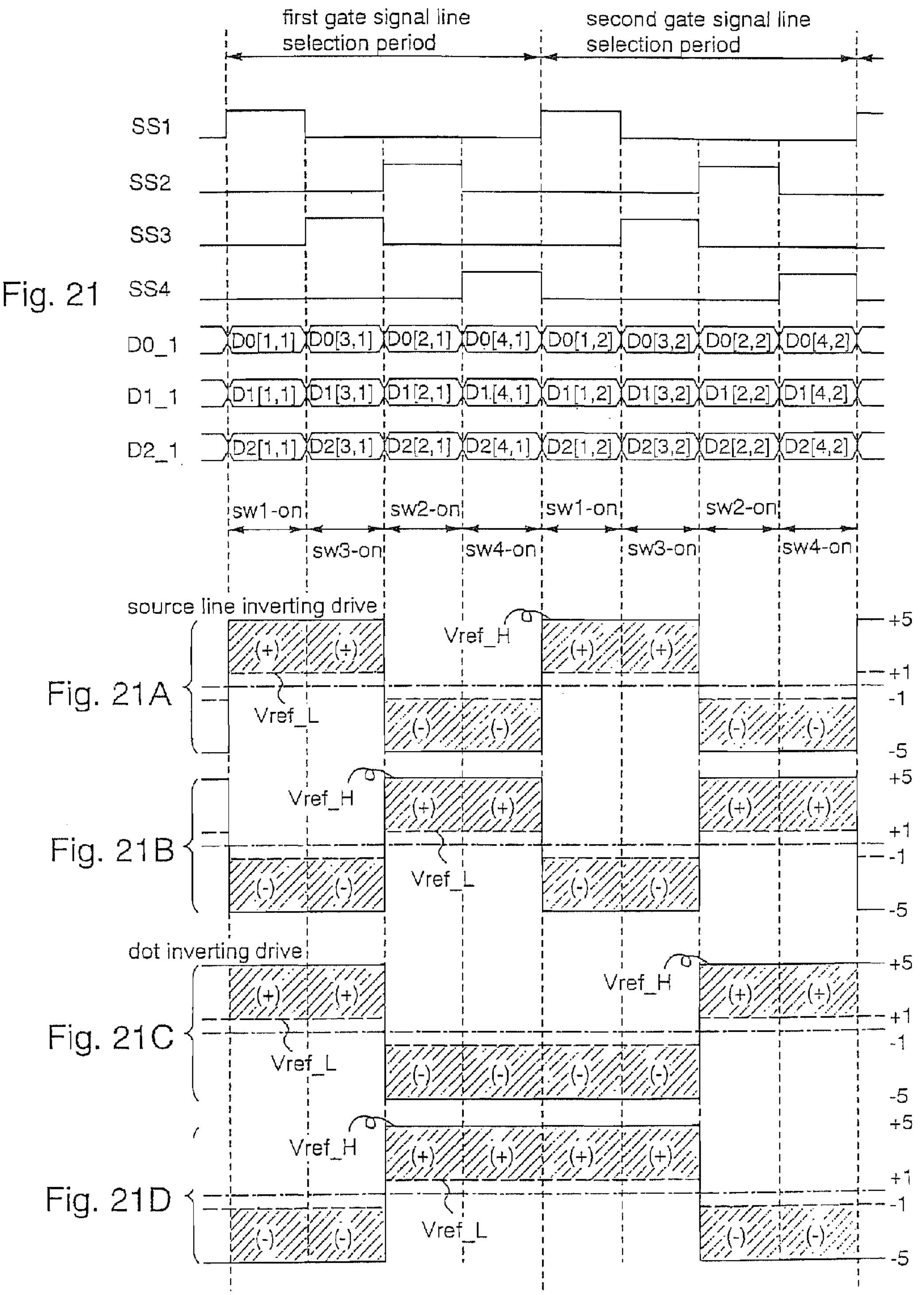
FIGS. 21 and 21A-D are examples of operation timing in accordance with embodiment 5.

Signal operation timing focusing on a portion for driving first to fourth source signal lines SL1 to SL4 is shown in FIG. 21. One gate signal line selection period is divided into four, SS1 is set to HI level in the first period, and the digital image signal of the first source signal line SL1 is output to the D/A converter circuit. During the second period, SS3 is set to HI level and the digital image signal of the third source signal line SL3 is output to the D/A converter circuit, while during the third period SS2 is set to HI level and the digital image signal of the second source signal line SL2 is output to the D/A converter circuit. In the final fourth period SS4 is set to HI level, and the digital image signal of the fourth source signal line SL4 is output to the D/A converter circuit. This state is shown in D0_1, D1_1, and D2_1 in FIG. 21. Di_1 is the (i+1) bit of the output data from the P/S converter circuit A relating to the first to fourth source signal lines SL1 to SL4 which are focused upon here. Further, as stated above, the symbol Di[s,g] denotes the (i+1) bit of data corresponding to an s column, g row pixel.

Similar operations relating to other source signal lines (such as SL5 to SL8, and SL9 to SL12), are also performed in parallel by the P/S converter circuit A.

The D/A converter circuit is the same as that of embodiments 1 to 4 shown in FIG. 16. One system of two grey-scale electric power supply lines Vref_L and Vref_H, and the three-bit digital image signal from the P/S converter circuit A are input to the D/A converter circuit.

The output of the D/A converter circuit is connected to appropriate source signal lines via a source line selection circuit A. An example circuit structure of the source line selection circuit A is shown in FIG. 15B. This circuit is also the same as that used in embodiment 1. The source line selection circuit A is composed of four transfer gates (switches), and the selection signals SS1 to SS4, and the inversions of those signals, are input to each gate. In accordance with the signal operation timing of FIG. 21, one gate signal line selection period is divided into four, a switch sw1 is set to ON in a first period, and the output of the D/A converter circuit is written to the first source signal line SL1. A switch sw3 is turned on in a second period, and the output of the D/A converter circuit is written to the third source signal line SL3. Next, a switch sw2 is set on in a third period, and the output of the D/A converter circuit is written to the second source signal line SL2, while a fourth switch sw4 is set on in a final fourth period and the output of the D/A converter circuit is written to the fourth source signal line SL4.

This type of write-in is also performed in parallel to other source signal lines. The data written into each source signal line is written into each pixel in order in accordance with the work of the gate signal line driver circuit and pixel TFTs.

An example of the input of the electric power supply voltage of the two grey-scale electric power supply lines Vref_L and Vref_H when performing source line inverting drive is shown in FIGS. 21A and 21B. FIG. 21B shows the electric power supply voltage of the grey-scale electric power supply lines Vref_L and Vref_H of the next frame period when the grey-scale electric power supply lines shown by FIG. 21A are input. This has an inverse relationship with FIG. 21A.

Note that, voltage values of the grey-scale electric power supply lines are set so that Vref_L takes −1 and +1 V, and Vref_H takes −5 and +5 V. When a combination of voltage values of the grey-scale electric power supply lines is {Vref_L=−1 V, Vref_H=−5 V}, the output of the D/A converter circuit is a minus polarity from −5 V to −1 V, and when the combination is {Vref_L=+1 V, Vref_H=+5 V}, the output of the D/A converter circuit is a plus polarity from +1 V to +5 V. Differing from embodiments 1 to 4, the polarity of the electric power supply voltage of the grey-scale electric power supply lines inverts within one horizontal write-in period.

The source line inverting drive shown by FIG. 12A thus becomes possible in accordance with the above method.

An example of the input of the electric power supply voltage of the two grey-scale electric power supply lines Vref_L and Vref_H when performing dot inverting drive is shown in FIGS. 21C and 21D. FIG. 21D shows the electric power supply voltage of the grey-scale electric power supply lines Vref_L and Vref_H of the next frame period when the grey-scale electric power supply lines shown by FIG. 21C are input. This has an inverse relationship with FIG. 21C.

Thus the dot inverting drive shown by FIG. 12B becomes possible.

Note that, the selection signals SS1 to SS4 input to the P/S converter circuit A and to the source line selection circuit A are identical in embodiment 5, but it is also possible to use separate systems.

Furthermore, a circuit driver electric power supply applied to the source signal line driver circuit in embodiment 5 is assumed to be that of one system, but a level shifter circuit may be inserted in portions where necessary for two or more systems.

Embodiment 6

An active matrix liquid crystal display device is taken as an example and explained in embodiment 6 as a specific embodiment of embodiment mode 5.

An example circuit structure of a source signal line driver circuit corresponding to embodiment mode 5 is the same as embodiment 5 and is shown in FIG. 20. What differs from embodiment 5 is a method of inputting selection signals SS1 to SS4 and electric power supply voltages of grey-scale electric power supply lines Vref_L and Vref_H. The selection signals SS1 to SS4 as shown by FIG. 8 are input, and the grey-scale electric power supply lines Vref_L and Vref_H are input so as to have the polarities shown by Vref(s) and Vref(sb) for a case of performing source line inverting drive, to have the polarities shown by Vref(d) and Vref(db) when performing dot inverting drive.

In this case the period in which the polarity of the electric power supply voltage of the grey-scale electric power supply lines is inverted becomes shorter than that shown in embodiment 5.

Embodiment 7

An active matrix liquid crystal display device is taken as an example and explained in embodiment 7 as a specific embodiment of embodiment mode 7. Furthermore, similar to that of embodiments 1 to 6, the explanation below is made focusing on a source signal line driver circuit.

Figure 22:
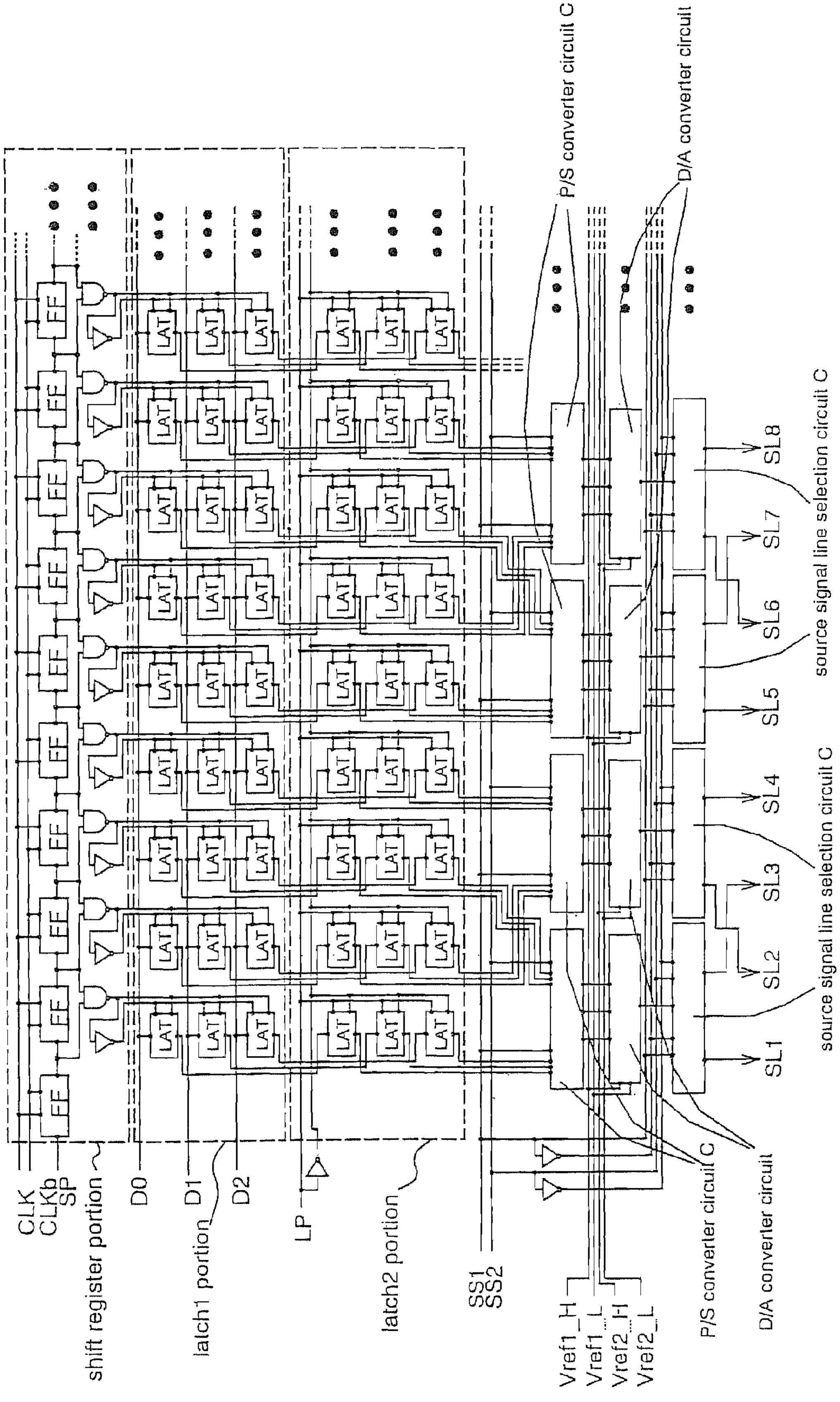
FIG. 22 is a schematic diagram of a source signal line driver circuit in accordance with embodiment 7.

An example circuit diagram of a source signal line driver circuit corresponding to embodiment mode 7 is shown in FIG. 22. Further, for convenience, an input digital image signal is taken as having three bits, and a case of driving two source signal lines by using one D/A converter circuit is explained.

Please refer to FIG. 22. A shift register portion, a latch 1 portion, and a latch 2 portion are the same as those of embodiments 1 to 6.

A 3 bit data×2 (a two source signal line portion) digital image signal stored in the latch 2 portion is input to a parallel/serial converter circuit (a P/S converter circuit C), along with externally input selection signals SS1 and SS2. Regarding the digital image signal input from the latch 2 portion, data relating to second and third source signal lines, data relating to sixth and seventh source signal lines, in general, data relating to (4k+2) and (4k+3) source signal lines (where k is an integer greater than or equal to 0), is replaced and input to the P/S converter circuit C. By doing so, each P/S converter circuit C only outputs data information relating to odd numbered source signal lines or to even number source signal lines to each D/A converter circuit. Thus, each D/A converter circuit drives either the odd number or the even number source signal lines. As shown by FIG. 22, from among the output of a source line selection circuit, the data which is replaced is once again replaced when inputting to the P/S converter circuit C, and thus the data is written to appropriate source signal lines.

Figure 23C:
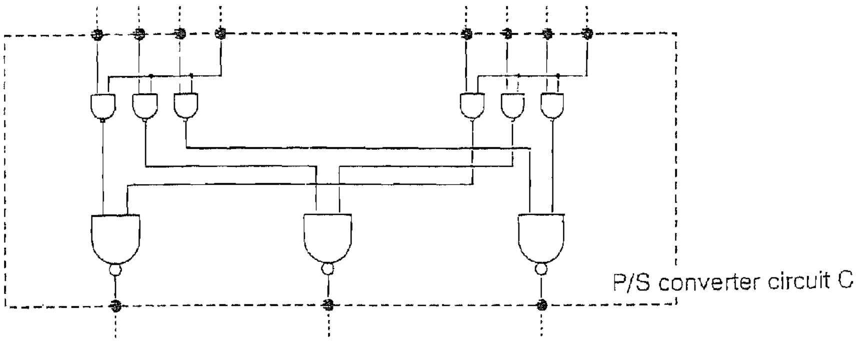
FIG. 23C is a diagram showing a P/S conversion circuit C in FIG. 22.

Note that, the P/S converter circuit C is composed of NAND circuits, as shown in FIG. 23C.

Figure 24:
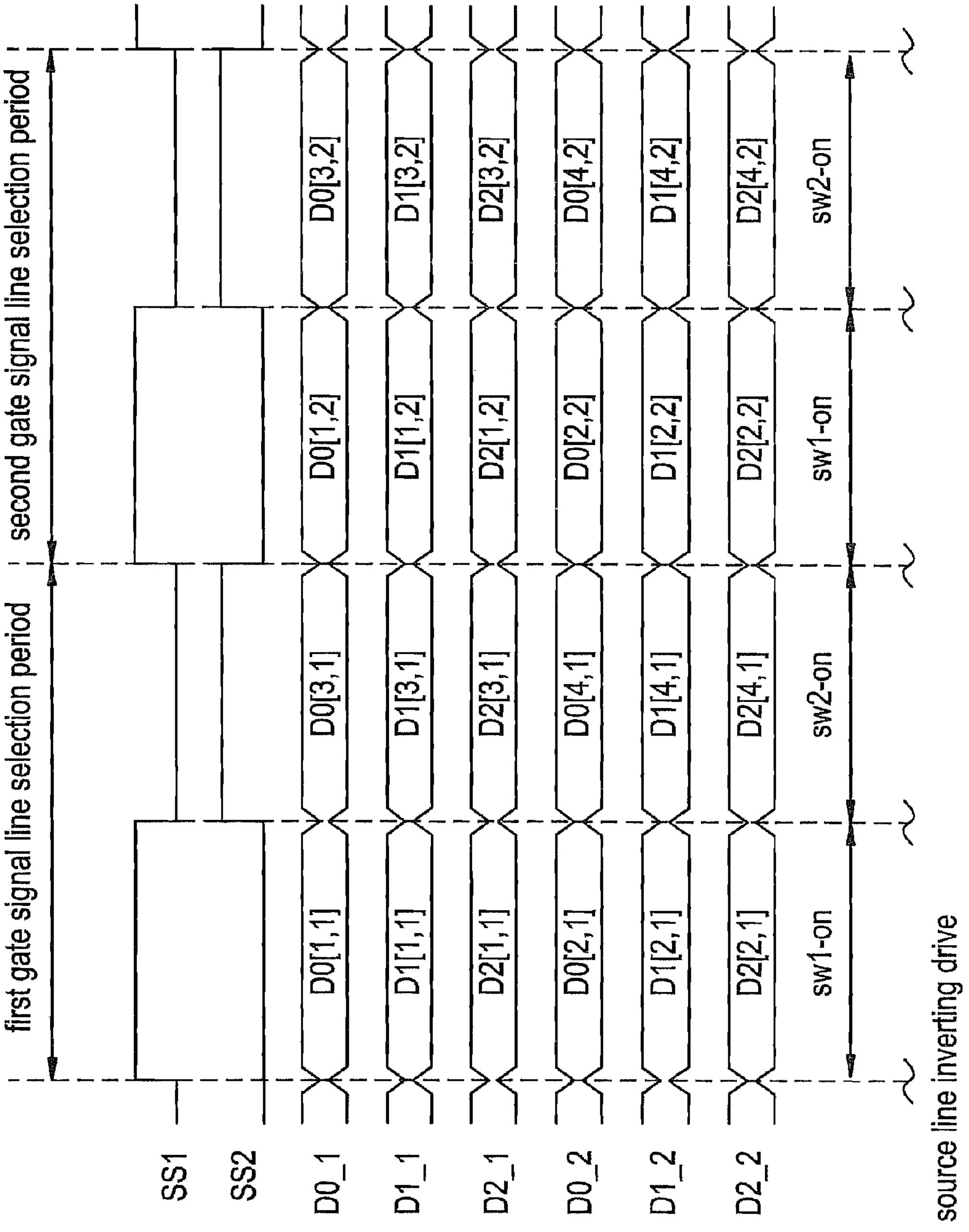
FIGS. 24 and 24A-D are examples of operation timing in accordance with embodiment 7.

Signal operation timing focusing on a portion for driving first to fourth source signal lines SL1 to SL4 is shown in FIG. 24. Two each of the P/S converter circuit C, the D/A converter circuit, and a source line selection circuit C exist in a portion for driving the four source signal lines as shown in FIG. 22. In order to distinguish these, one is referred to as a left side P/S converter circuit C, while the other is referred to as a right side P/S converter circuit C, and so on. The term left side corresponds to circuits having a position on the leftmost portion in FIG. 22.

In the first period where one gate signal line selection period is divided into two, SS1 is set to HI level, and the left side P/S converter circuit C outputs the digital image signal of the first source signal line SL1 to the left side D/A converter circuit. At this point the right side P/S converter circuit C outputs the digital image signal of the second source signal line SL2 to the right side D/A converter circuit. In the second period, SS2 is set to HI level, and the left side P/S converter circuit C outputs the digital image signal of the third source signal line SL3 to the left side D/A converter circuit, while the right side P/S converter circuit C outputs the digital image signal of the fourth source signal line SL4 to the right side D/A converter circuit at this time. The output of the left side P/S converter circuit C is shown in D0_1, D1_1, and D2_1 of FIG. 24, and the output of the right side P/S converter circuit C is shown in D0_2, D1_2, and D2_2 in FIG. 24. As stated above, the symbol Di[s,g] denotes the (i+1) bit of data corresponding to an s column, g row pixel.

Similar operations relating to other source signal lines (such as SL5 to SL8, and SL9 to SL12), are also performed in parallel by the P/S converter circuits C.

The D/A converter circuit is the same as that of embodiments 1 to 6 shown by FIG. 16. As shown in FIG. 22, the D/A converter circuit for driving the odd numbered source signal lines is connected to Vref1_L and Vref1_H, a first set of grey-scale electric power supply lines, and the D/A converter circuit for driving the even numbered source signal lines is connected to Vref2_L and Vref2_H, a second set of grey-scale electric power supply lines.

Figure 23D:
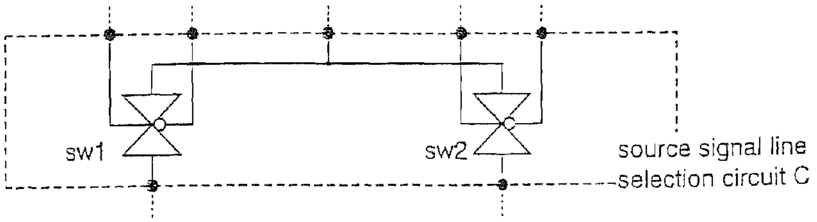
FIG. 23D is a diagram showing a source line selection circuit C in FIG. 22.

The output of the D/A converter circuits is connected to appropriate source signal lines via the source line selection circuits C. An example circuit structure of the source line selection circuit C is shown in FIG. 23D. The source line selection circuit C is composed of two transfer gates (switches), and the selection signals SS1 and SS2, and the inversions of those signals, are input to each gate. In accordance with the signal operation timing of FIG. 24, in a first period with one gate signal line selection period divided into two, a switch sw1 is set to ON in a first period, and the left side source line selection circuit C writes the output of the left side D/A converter circuit to the first source signal line SL1. At this time, the right side source line selection circuit C writes the output of the right side D/A converter circuit to the second source signal line SL2. In a second period one gate signal line selection period is divided into two, a switch sw2 is set to ON, and the left side source line selection circuit C writes the output of the left side D/A converter circuit to the third source signal line SL3. At this time, the right side source line selection circuit C writes the output of the right side D/A converter circuit to the fourth source signal line SL4. This type of write-in is also performed in parallel with respect to other source signal lines.

Figures 24A, 24B, 24C, 24D:
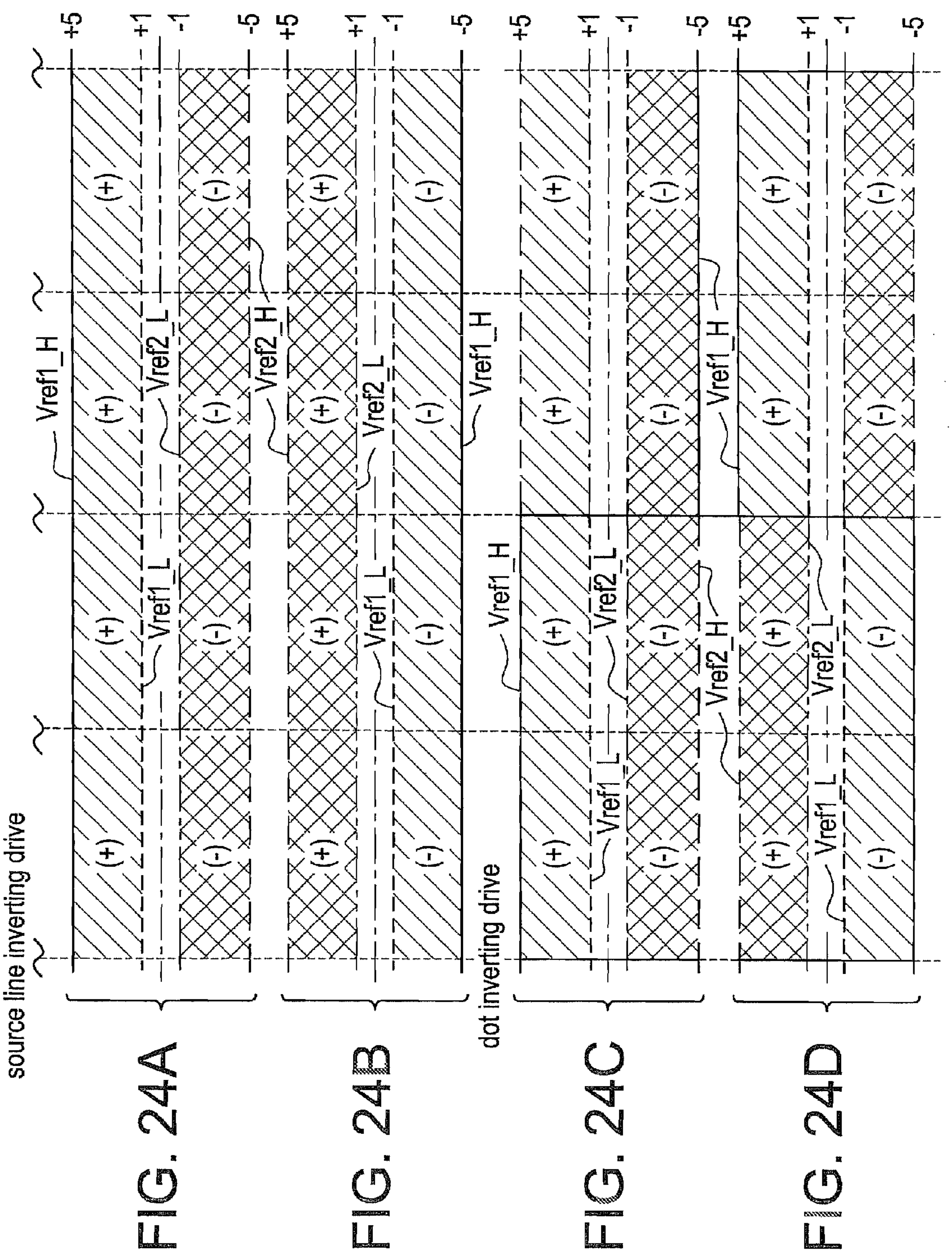

An example of the input of the electric power supply voltage of the four grey-scale electric power supply lines Vref1_L, Vref1_H, Vref2_L, and Vref2_H when performing source line inverting drive is shown in FIGS. 24A and 24B. FIG. 24B shows the electric power supply voltage of the grey-scale electric power supply lines Vref1_L, Vref1_H, Vref2_L, and Vref2_H of the next frame period when the grey-scale electric power supply lines shown by FIG. 24A are input. This has an inverse relationship with FIG. 24A.

Note that, voltage values of the grey-scale electric power supply lines are set so that Vref1_L and Vref2_L take −1 and +1 V, and Vref1_H and Vref2_H take −5 and +5 V in this embodiment. When a combination of voltage values of the grey-scale electric power supply lines is {Vrefx_L=−1 V, Vrefx_H=−5 V (where x=1 or 2)}, the output of the D/A converter circuit is a minus polarity from −5 V to −1 V, and when the combination is {Vrefs_L=+1 V, Vrefs_H=+5 V (where x=1 or 2}, the output of the D/A converter circuit is a plus polarity from +1 V to +5 V. Differing from embodiments 1 to 6, when source line inverting is performed, the polarity of the electric power supply voltage of the grey-scale electric power supply lines is fixed during one frame period.

The source line inverting drive shown by FIG. 12A thus becomes possible in accordance with the above method.

Furthermore, an example of the input of the electric power supply voltage of the four grey-scale electric power supply lines Vref1_L, Vref1_H, Vref2_L and Vre2*f*_H when performing dot inverting drive is shown in FIGS. 24C and 24D. FIG. 24D shows the electric power supply voltage of the grey-scale electric power supply lines Vref1_L, Vref1_H, Vref2_L and Vref2_H of the next frame period when the grey-scale electric power supply lines shown by FIG. 24C are input. This has an inverse relationship with FIG. 24C. Polarity inversion of the electric power supply voltage of the grey-scale electric power supply lines is performed every one gate signal line selection period.

By doing so, the dot inverting control shown by FIG. 12B thus becomes possible.

Note that, the selection signals SS1 and SS2 input to the P/S converter circuits C and to the source line selection circuits C are identical in embodiment 7, but it is also possible to use separate systems.

Furthermore, a circuit driver electric voltage supply supplied to the source signal line driver circuit in embodiment 7 is assumed to be that of one system, but a level shifter circuit may be inserted in portions where necessary for two or more systems.

Embodiment 8

In this embodiment, as an example of manufacturing method of an active matrix liquid crystal display device, a detailed description is set forth regarding a manufacturing method for fabricating the pixel TFTs, switching elements in the pixel region and TFTs for driver circuit provided in peripheral of the pixel region (a source signal driver circuit and gate signal driver circuit) over a same substrate, in accordance with the process steps. Note that for the simplicity of the explanation, a CMOS circuit is shown in figures for the driver circuit, and an n-channel TFT is shown.

Figures 25A, 25B, 25C, 25D:
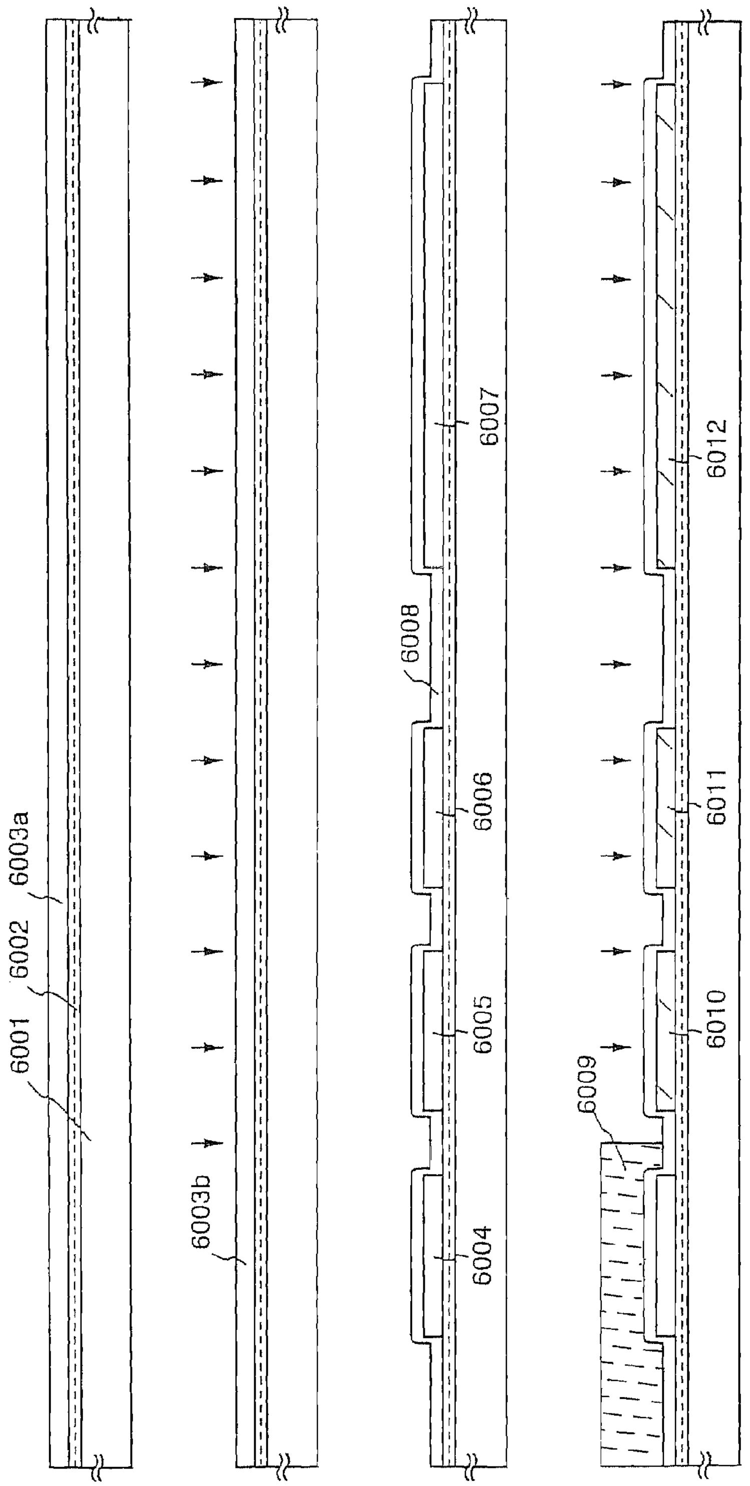
FIGS. 25A to 25D are diagrams showing a method of manufacturing an active matrix liquid crystal display device in accordance with embodiments 1 to 7.

In FIG. 25A, a low alkali glass substrate or a quartz substrate may be used as the substrate (an active matrix substrate) 6001. In this embodiment, a low alkali glass substrate was used. Heat treatment may be performed beforehand at a temperature about 10-20° C. lower than the glass strain temperature. On the surface of the substrate 6001 on which the TFT is formed, there is formed an underlayer film 6002 comprising a silicon oxide film, silicon nitride film or silicon nitride oxide film, in order to prevent diffusion of the impurity from the substrate 6001. For example, laminates in which a silicon nitride oxide film is formed from $SiH_4$, $NH_3$ and $N_2O$ to a thickness of 100 nm and a silicon nitride oxide film is formed from $SiH_4$ and $N_2O$ to a thickness of 200 nm, are formed by plasma CVD.

Next, a semiconductor film 6003*a* having an amorphous structure with a thickness of 20 to 150 nm (preferably 30 to 80 nm) is formed by a publicly known method such as plasma CVD or sputtering. In this embodiment, an amorphous silicon film was formed to a thickness of 54 nm by plasma CVD.

Semiconductor films with amorphous structures include amorphous semiconductor films and micro-crystalline semiconductor films, and a compound semiconductor film with an amorphous structure, such as an amorphous silicon-germanium film, may also be used. Since the underlayer film 6002 and the amorphous silicon film 6003*a* can be formed by the same film deposition method, they may be formed in succession. The surface contamination can be prevented by not exposing to the aerial atmosphere after forming the underlayer film, and the scattering of the characteristics in the formed TFTs and fluctuation of threshold voltage can be reduced. (FIG. 25A)

A publicly known crystallizing technique is then used to form a crystalline silicon film 6003*b* from the amorphous silicon film 6003*a*. For example, a laser crystallizing or heat crystallizing method (solid phase growth method) may be used, and here a crystalline silicon film 6003*b* was formed by a crystallization method using a catalyst element, according to the technique disclosed in Japanese Patent Application Laid-Open No. Hei 7-130652. Though it depends on the hydrogen content of the amorphous silicon film, heat treatment is preferably performed for about one hour at 400 to 500° C. to reduce the hydrogen content to below 5 atom % prior to crystallization. Crystallization of the amorphous silicon film causes rearrangement of the atoms to a more dense form, so that the thickness of the crystalline silicon film that is fabricated is reduced by about 1 to 15% from the thickness of the original amorphous silicon film (54 nm in this embodiment) (FIG. 25B).

The crystalline silicon film 6003*b* is then patterned into island shape to form island semiconductor layers 6004 to 6007. A mask layer 6008 comprising a silicon oxide film is then formed with a thickness of 50 to 150 nm by plasma CVD or sputtering (FIG. 25C).

A resist mask 6009 was provided, and boron (B) was added as a p-type impurity element at a concentration of about $1\times10^{16}$ to $5\times10^{17}$ atoms/cm$^3$ for the purpose of controlling the threshold voltage of the island semiconductor layers 6005 to 6007 forming the n-channel type TFT. The addition of boron (B) may be accomplished by an ion doping, or it may be added simultaneously with formation of the amorphous silicon film. The addition of boron (B) is not necessarily essential (FIG. 25D). After that, the resist mask 6009 is eliminated.

Figures 26A, 26B, 26C, 26D:
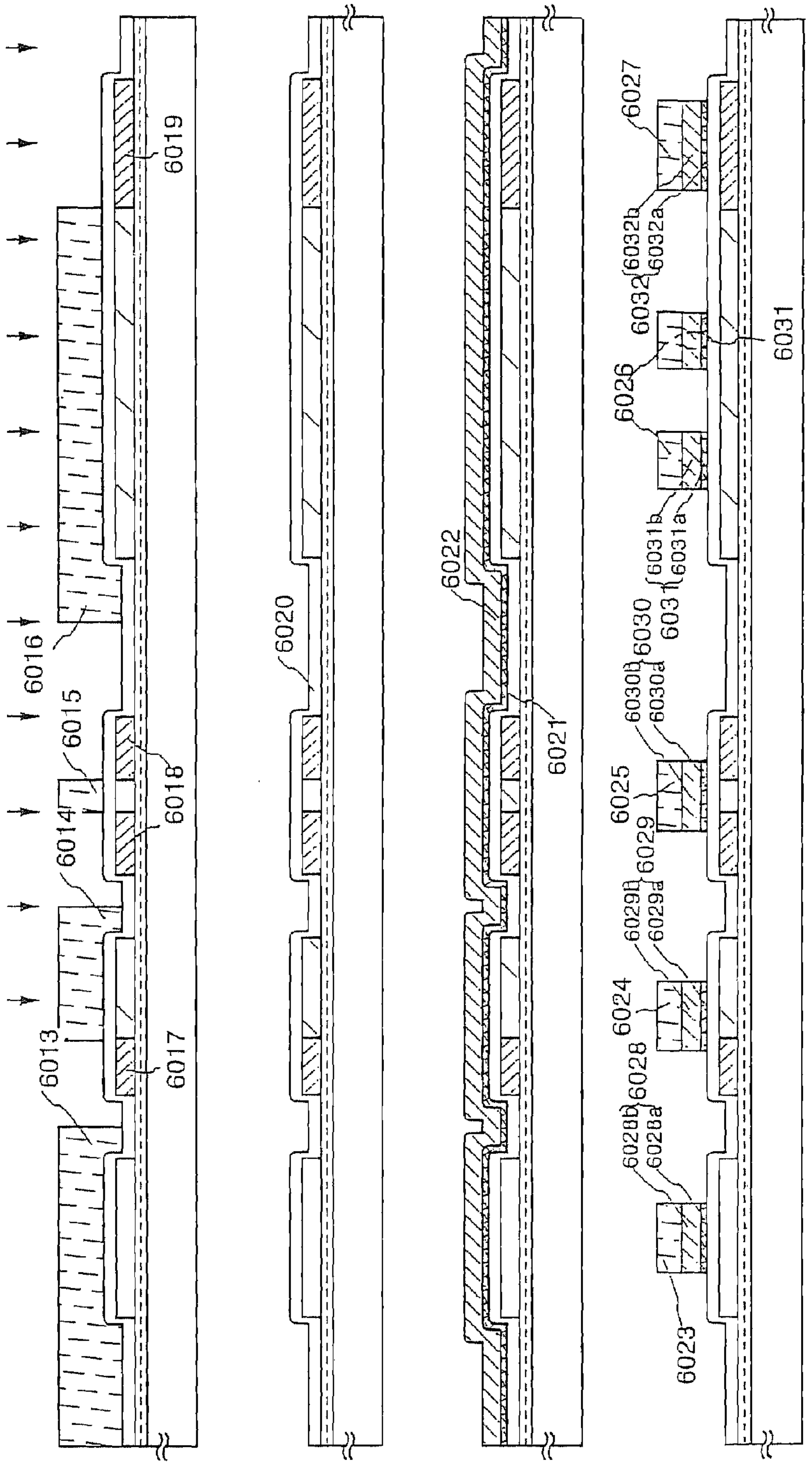
FIGS. 26A to 26D are diagrams showing the method of manufacturing the active matrix liquid crystal display device in accordance with embodiments 1 to 7.

An n-type impurity element is selectively added to the island semiconductor layers 6010 and 6012 in order to form the LDD regions of the n-channel type TFT of the driving circuit. Resist masks 6013 to 6016 are formed beforehand for this purpose. The n-type impurity element used may be phosphorus (P) or arsenic (As), and in this case an ion doping method was employed using phosphine ($PH_3$) for addition of phosphorus (P). The phosphorus (P) concentration of the formed impurity regions 6017, 6018 may be in the range of $2\times10^{16}$ to $5\times10^{19}$ atoms/cm$^3$. Throughout the present specification, the concentration of the n-type impurity element in the impurity regions 6017 to 6019 formed here will be represented as ($n^-$). The impurity region 6019 is a semiconductor layer for formation of the storage capacitor of the pixel region, and phosphorus (P) was added in the same concentration in this region as well (FIG. 26A). After that, resist masks 6013 to 6016 are eliminated.

This is followed by a step of removing the mask layer 6008 by hydrofluoric acid or the like, and activating the impurity elements added in FIG. 25D and FIG. 26A. The activation may be carried out by heat treatment for 1 to 4 hours at 500 to 600° C. in a nitrogen atmosphere, or by a laser activation method. These may also be carried out in combination. In this embodiment, a laser activation method was used in which a linear beam is formed by using KrF excimer laser light (248 nm wavelength) and scanned the laser light at an oscillation frequency of 5 to 50 Hz and an energy density of 100 to 500 ml/cm$^2$ with 80 to 98% overlap ratio, to treat the entire substrate on which the island semiconductor layers had been formed. There are no particular restrictions on the laser light irradiation conditions, and they may be appropriately set by the operator.

A gate insulating film 6020 is then formed with an insulating film including silicon to a thickness of 10 to 150 nm using plasma CVD or sputtering. For example, a silicon nitride oxide film is formed to a thickness of 120 nm. The gate insulating film may also be a single layer or multilayer structure of other silicon-containing insulating films (FIG. 26B).

A first conductive layer is then deposited to form the gate electrodes. This first conductive layer may be formed as a single layer, but if necessary it may also have a laminated structure of two or three layers. In this embodiment, a conductive layer (A) 6021 comprising a metal nitride film and a conductive layer (B) 6022 comprising a metal film were laminated. The conductive layer (B) 6022 may be formed of an element selected from among tantalum (Ta), titanium (Ti), molybdenum (Mo) and tungsten (W), or an alloy composed mainly of one of these elements, or an alloy film comprising a combination of these elements (typically a Mo—W alloy film or Mo—Ta alloy film), and the conductive layer (A) 6021 is formed of tantalum nitride (TaN), tungsten nitride (WN), titanium nitride (TiN) or molybdenum nitride (MoN). As alternative materials for the conductive layer (A) 6021 there may be used tungsten silicide, titanium silicide or molybdenum silicide. The conductive layer (B) may have a reduced impurity concentration for the purpose of lower resistance, and in particular the oxygen concentration was satisfactory at 30 ppm or less. For example, tungsten (W) with an oxygen concentration of 30 ppm or less allowed realization of a resistivity of 20 μWcm or less.

The conductive layer (A) 6021 may be 10 to 50 nm (preferably 20 to 30 nm) and the conductive layer (B) 6022 may be 200 to 400 nm (preferably 250 to 350 nm). In this embodiment, a tantalum nitride film with a thickness of 30 nm was used as the conductive layer (A) 6021 and a Ta film of 350 nm was used as the conductive layer (B) 6022, and both were formed by sputtering. In this film formation by sputtering, addition of an appropriate amount of Xe or Kr to the Ar sputtering gas can alleviate the internal stress of the formed film to thus prevent peeling of the film. Though not shown, it is effective to form a silicon film doped with phosphorus (P) to a thickness of about 2 to 20 nm under the conductive layer (A) 6021. This can improve adhesion and prevent oxidation of the conductive film formed thereover, while also preventing diffusion of trace alkali metal elements into the gate insulating film 6020 that are contained in the conductive layer (A) or a conductive layer (B) (FIG. 26C).

Resist masks 6023 to 6027 are then formed, and the conductive layer (A) 6021 and conductive layer (B) 6022 are etched together to form gate electrodes 6028 to 6031 and a capacitance wiring 6032. The gate electrodes 6028 to 6031 and capacitance wiring 6032 are integrally formed from 6028*a* to 6032*a* comprising conductive layer (A) and 6028*b* to 6032*b* comprising conductive layer (B). Here, the gate electrodes 6028 to 6030 formed in the driving circuit are formed so as to overlap with a portion of the impurity regions 6017 and 6018 by interposing the gate insulating layer 6020 (FIG. 26D).

Figure 27A:
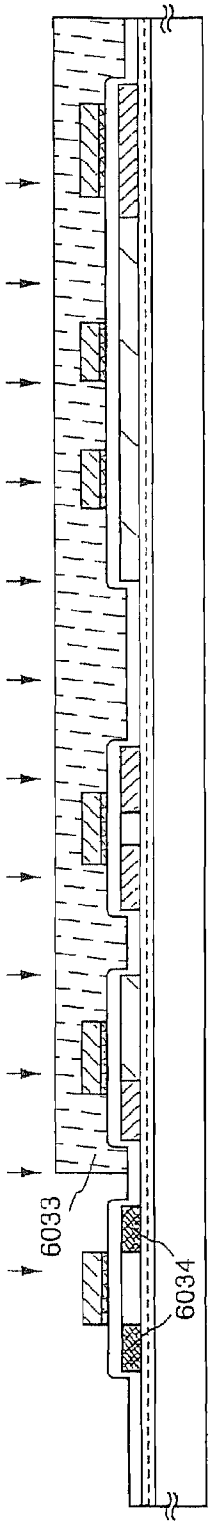
FIGS. 27A to 27D are diagrams showing the method of manufacturing the active matrix liquid crystal display device in accordance with embodiments 1 to 7.

This is followed by a step of adding a p-type impurity element to form the p-channel source region and drain region of the driving circuit. Here, the gate electrode 6028 is used as a mask to form impurity regions in a self-alignment manner. The region in which the n-channel TFT is formed is covered at this time with a resist mask 6033. The impurity region 6034 is formed by ion doping using diborane ($B_2H_6$). The boron (B) concentration of this region is $3\times10^{20}$ to $3\times10^{21}$ atoms/cm$^3$. After that, the resist mask 6033 is eliminated. Throughout this specification, the concentration of the p-type impurity element in the impurity region 6034 formed here will be represented as ($p^{++}$) (FIG. 27A).

Figure 27B:
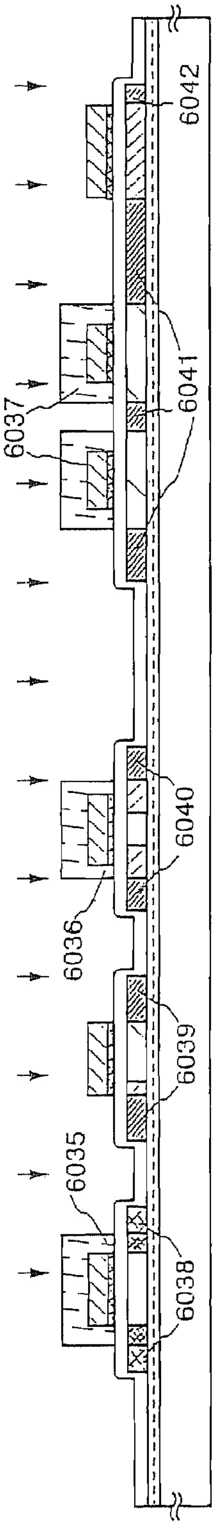

Next, impurity regions functioning as a source region or drain region were formed in the n-channel TFT. Resist masks 6035 to 6037 were formed, and an n-type impurity element was added to form impurity regions 6038 to 6042. This was accomplished by ion doping using phosphine ($PH_3$), and the phosphorus (P) concentration in the regions was in the range of $1\times10^{20}$ to $1\times10^{21}$ atoms/cm$^3$. Throughout the present specification, the concentration of the n-type impurity element in the impurity regions 6038 to 6042 formed here will be represented as ($n^+$) (FIG. 27B).

The impurity regions 6039 to 6042 already contain phosphorus (P) or boron (B) added in the previous step, but since a sufficiently high concentration of phosphorus (P) is added in comparison, the influence of the phosphorus (P) or boron (B) added in the previous step may be ignored. As the concentration of phosphorus (P) added to the impurity region 6038 is ½ to ⅓ of the boron (B) concentration added in FIG. 27A, the p-type conductivity is guaranteed so that there is no effect on the properties of the TFT.

Figure 27C:
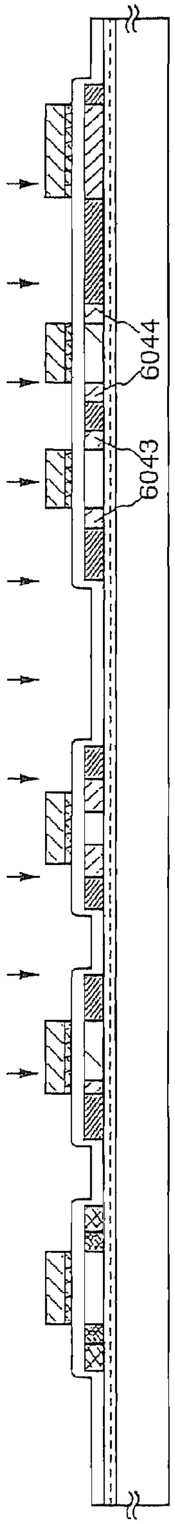

This was followed by a step of adding an n-type impurity to form an LDD region in the n-channel type TFT of the pixel region. Here, the gate electrode 6031 was used as a mask for addition of an n-type impurity element in a self-aligning manner by ion doping. The concentration of phosphorus (P) added was $1\times10^{16}$ to $5\times10^{18}$ atoms/cm$^3$, and addition of a lower concentration than the concentrations of the impurity elements added in FIGS. 26A, 27A and 27B substantially form only impurity regions 6043 and 6044. Throughout this specification, the concentration of the n-type impurity element in these impurity regions 6043 and 6044 will be represented as ($n^-$) (FIG. 27C).

Resist masks 6039 to 6042 are eliminated. This was followed by a step of heat treatment for activation of the n-type or the p-type impurity element added at their respective concentrations. This step can be accomplished by furnace annealing, laser annealing or rapid thermal annealing (RTA). Here, the activation step was accomplished by furnace annealing. The heat treatment is carried out in a nitrogen atmosphere containing oxygen at a concentration no greater than 1 ppm and preferably no greater than 0.1 ppm, at 400 to 800° C., typically 500 to 600° C., and for this embodiment the heat treatment was carried out at 500° C. for 4 hours. When a heat resistant material such as a quartz substrate is used for the substrate 6001, the heat treatment may be at 800° C. for one hour, and this allowed activation of the impurity element and formation of a satisfactory junction between an impurity region added with an impurity element and a channel forming region. Further, in the case that interlayer film is formed to prevent peeling of the Ta, that effect cannot be always attained.

In the heat treatment, conductive layers (C) 6028*c* to 6032*c* are formed to a thickness of 5 to 80 nm from the surfaces of the metal films 6028*b* to 6032*b* which comprise the gate electrodes 6028 to 6031 and the capacity wiring 6032. For example, when the conductive layers (B) 6028*b* to 6032*b* comprise tungsten (W), tungsten nitride (WN) is formed, whereas when tantalum (Ta) is used, a tantalum nitride (TaN) can be formed. The conductive layers (C) 6028*c* to 6032*c* may be formed in the same manner by exposing the gate electrodes 6028 to 6031 and the capacitor wiring 6032 to a plasma atmosphere containing nitrogen, using either nitrogen or ammonia. Further a process for hydrogenation was also performed on the island semiconductor layer by heat treatment at 300 to 450° C. for 1 to 12 hours in an atmosphere containing 3 to 100% hydrogen. This step is for terminating the dangling bond of the semiconductor layer by thermally excited hydrogen. Plasma hydrogenation (using plasma-excited hydrogen) may also be carried out as another means for hydrogenation.

Figure 27D:
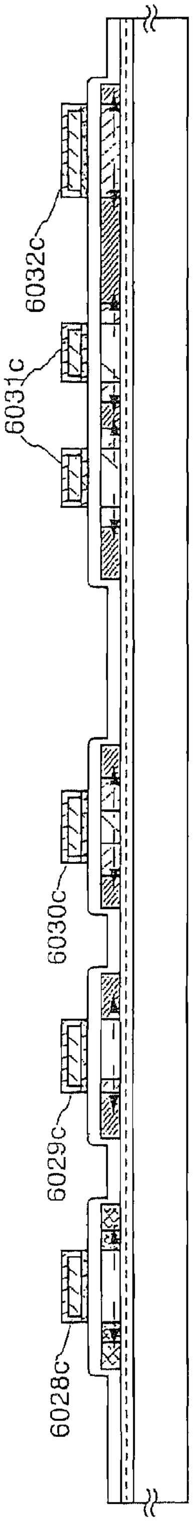

When the island semiconductor layer were fabricated by a method of crystallization from an amorphous silicon film using a catalyst element, a trace quantity of the catalyst element remained in the island semiconductor layers. While the TFT can be completed even in this condition, needless to say, it is more preferable for the residual catalyst element to be eliminated at least from the channel forming region. One means used to eliminate the catalyst element was utilizing the gettering effect by phosphorus (P). The phosphorus (P) concentration necessary for gettering is on the same level as the impurity region ($n^+$) formed in FIG. 27B, and the heat treatment for the activation step carried out here allowed gettering of the catalyst element from the channel forming region of the n-channel type TFT and p-channel type TFT (FIG. 27D).

Figure 28A:
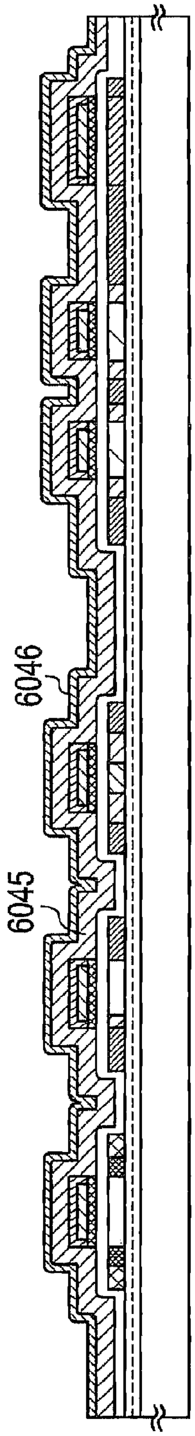
FIGS. 28A to 28C are diagrams showing the method of manufacturing the active matrix liquid crystal display device in accordance with embodiments 1 to 7.
Figure 28B:
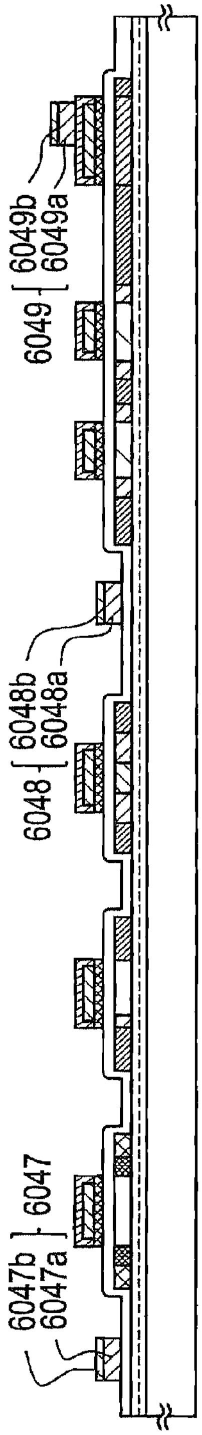

After completion of the steps of activation and hydrogenation, the second conductive layer which becomes the gate wiring (the gate signal line) is formed. This second conductive layer may be formed with a conductive layer (D) composed mainly of aluminum (Al) or copper (Cu) as low resistance materials, and a conductive layer (E) made of titanium (Ti), tantalum (Ta), tungsten (W) or molybdenum (W). In this embodiment, the conductive layer (D) 6045 was faulted from an aluminum (Al) film containing 0.1 to 2 wt % titanium (Ti), and the conductive layer (E) 6046 was formed from a titanium (Ti) film. The conductive layer (D) 6045 may be formed to 200 to 400 nm (preferably 250 to 350 nm), and the conductive layer (E) 6046 may be formed to 50 to 200 nm (preferably 100 to 150 nm) (FIG. 28A).

The conductive layer (E) 6046 and conductive layer (D) 6045 were etched to form gate wirings (gate signal wirings) 6047, 6048 and capacitance wiring 6049 for forming the gate wiring (the gate signal wiring) connecting the gate electrodes. In the etching treatment, first removed from the surface of the conductive layer (E) to partway through the conductive layer (D) by dry etching using a mixed gas of $SiCl_4$, $Cl_2$ and $BCl_3$, and then wet etching was performed with a phosphoric acid-based etching solution to remove the conductive layer (D), thus allowing formation of a gate wiring (a gate signal line) while maintaining selectively working with the ground layer.

A first interlayer insulating film 6050 is formed with a silicon oxide film or silicon nitride oxide film to a thickness of 500 to 1500 nm, and then contact holes are formed reaching to the source region or drain region formed in each island semiconductor layer, to form source wirings (gate signal lines) 6051 to 6054 and drain wirings 6055 to 6058. While not shown here, in this embodiment the electrode has a 3-layer laminated structure with continuous formation of a Ti film to 100 nm, a Ti-containing aluminum film to 300 nm and a Ti film to 150 nm by sputtering.

Figure 28C:
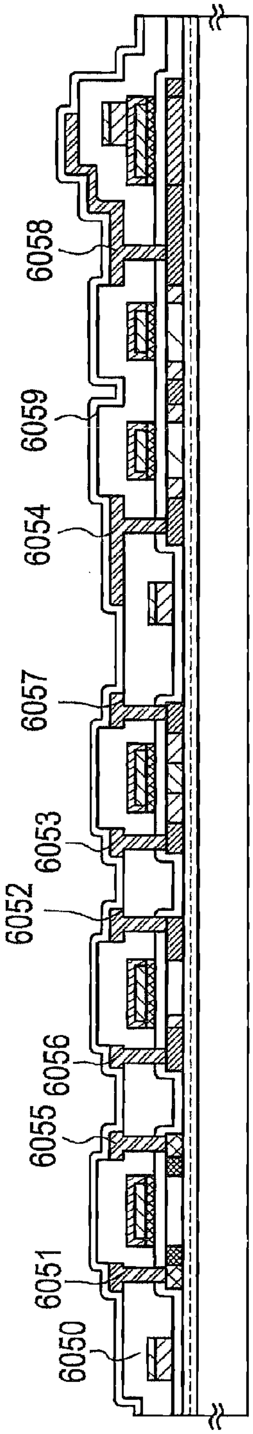

Next, a silicon nitride film, silicon oxide film or a silicon nitride oxide film is formed to a thickness of 50 to 500 nm (typically 100 to 300 nm) as a passivation film 6059. Hydrogenation treatment in this state gave favorable results for enhancement of the TFT characteristics. For example, heat treatment may be carried out for 1 to 12 hours at 300 to 450° C. in an atmosphere containing 3 to 100% hydrogen, or a similar effect may be achieved by using a plasma hydrogenation method. Note that an opening may be formed in the passivation film 6059 here at the position where the contact holes are to be formed for connection of the pixel electrodes and the drain wirings (FIG. 28C).

Figure 29:
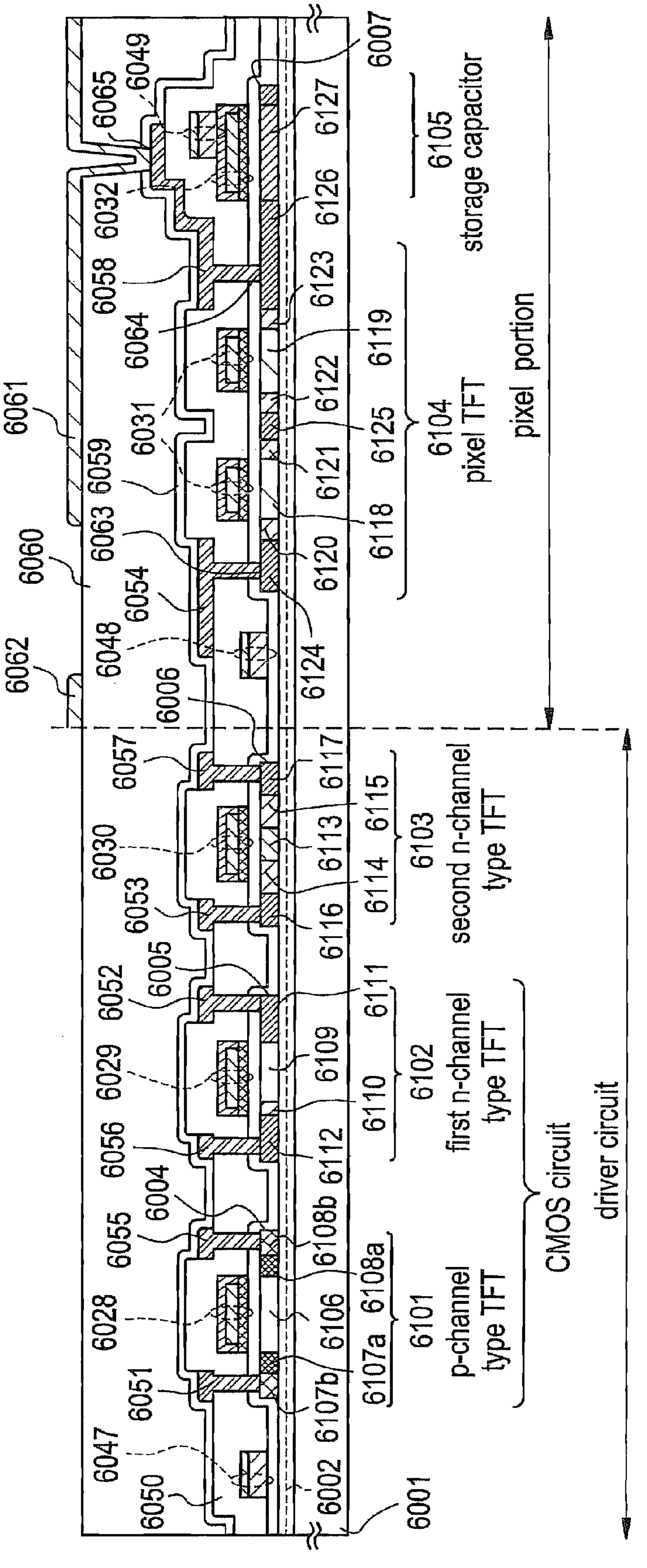
FIG. 29 is a diagram showing the method of manufacturing the active matrix liquid crystal display device in accordance with embodiments 1 to 7.

Next, a second interlayer insulating film 6060 made of an organic resin is formed to a thickness of 1.0 to 1.5 μm. The organic resin used may be polyimide, acrylic, polyamide, polyimideamide, BCB (benzocyclobutene) or the like. Here, a polyimide which thermally polymerizes after coating over the substrate and formed by firing at 300° C. A contact hole reaching to the drain wiring 6058 is then formed in the second interlayer insulating film 6060, and pixel electrodes 6061 and 6062 are formed. The pixel electrodes used may be of a transparent conductive film in the case of forming a transmission type liquid crystal display device, or of a metal film in the case of forming a reflective type liquid crystal display device. In this embodiment, an indium-tin oxide (ITO) film was formed by sputtering to a thickness of 100 nm in order to form a transmission type liquid crystal display device (FIG. 29).

A substrate comprising a driving circuit TFT and a pixel TFT of pixel region on the same substrate was completed in this manner. A p-channel TFT 6101, a first n-channel TFT 6102 and a second n-channel TFT 6103 were formed on the driving circuit and a pixel TFT 6104 and a storage capacitor 6105 were formed on the pixel region. Throughout the present specification, this substrate will be referred to as an active matrix substrate for convenience.

The p-channel TFT 6101 of the driving circuit comprises a channel forming region 6106, source regions 6107*a* and 6107*b* and drain regions 6108*a* and 6108*b* in the island semiconductor layer 6004. The first n-channel TFT 6102 has a channel forming region 6109, an LDD region 6110 overlapping the gate electrode 6029 (hereunder this type of LDD region will be referred to as $L_{ov}$), a source region 6111 and a drain region 6112 in the island semiconductor layer 6005. The length of this $L_{ov}$ region in the channel length direction was 0.5 to 3.0 μm, and is preferably 1.0 to 1.5 μm. The second n-channel TNT 6103 comprises a channel forming region 6113, LDD regions 6114 and 6115, a source region 6116 and a drain region 6117 in the island semiconductor layer 6006. These LDD regions are formed of an $L_{ov}$ region and an LDD region not overlapping the gate electrode 6030 (hereunder this type of LDD region will be referred to as $L_{off}$), and the length of this $L_{off}$ region in the channel length direction is 0.3 to 2.0 μm, and preferably 0.5 to 1.5 μm. The pixel TFT 6104 comprises channel forming regions 6118 and 6119, $L_{off}$ regions 6120 to 6123 and source or drain regions 6124 to 6126 in the island semiconductor layer 6007. The length of the $L_{off}$ regions in the channel length direction is 0.5 to 3.0 μm, and preferably 1.5 to 2.5 μm. A storage capacitor 6105 is formed from: capacitance wirings 6032 and 6049; an insulating film formed from the same material as gate insulating film; and a semiconductor layer 6127 added with impurity element imparting n-type which is connected to drain region 6126 of pixel TFT 6104. In FIG. 29 the pixel TFT 6104 has a double gate structure, but it may also have a single gate structure, and there is no problem with a multi-gate structure provided with multiple gate electrodes.

Thus, the present invention optimizes the structures of the TFTs of each circuit in accordance with the specifications required for the pixel TFT and driving circuit, thus allowing the operating performance and reliability of the image display device to be improved.

Next, the steps of manufacturing the transparent type liquid crystal display device is explained as a base of the active matrix substrate formed by above mentioned steps.

Figure 30:
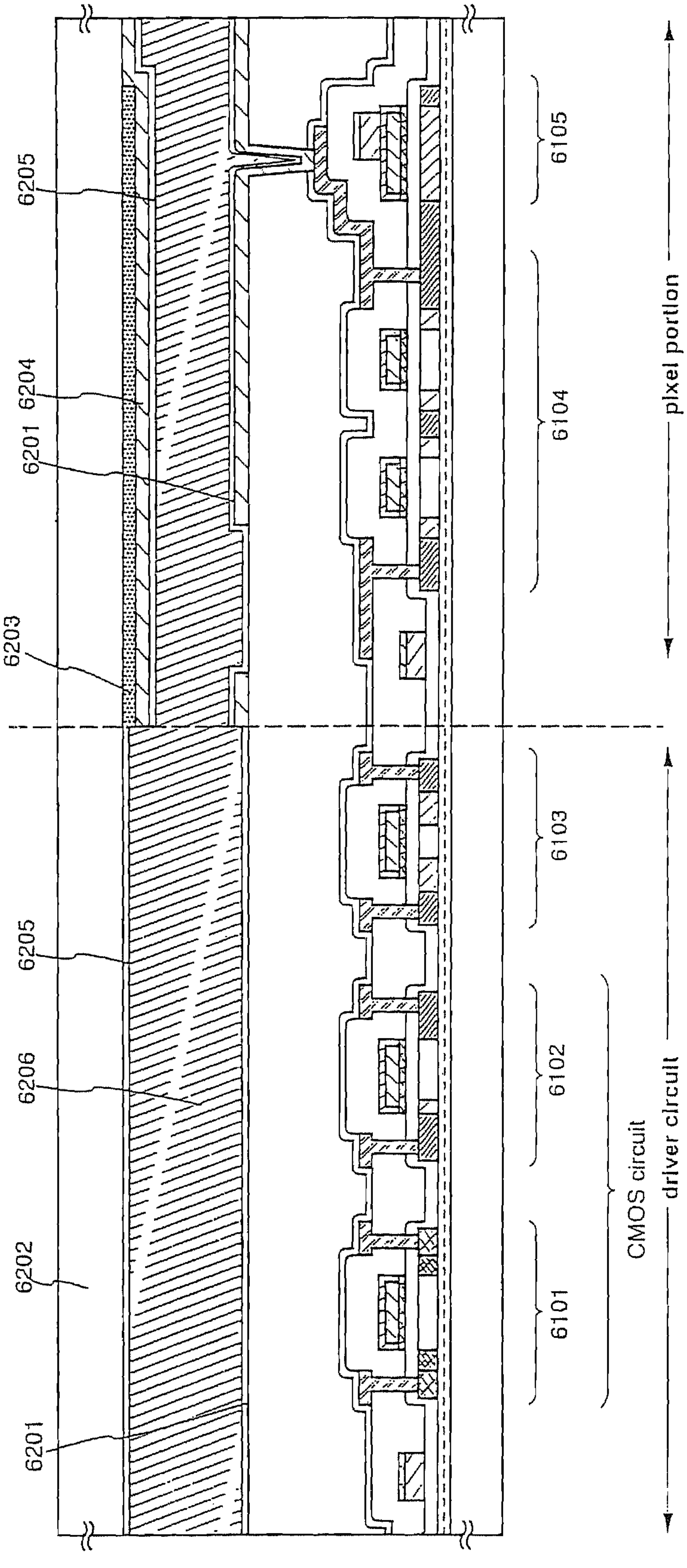
FIG. 30 is a diagram showing the method of manufacturing the active matrix liquid crystal display device in accordance with embodiments 1 to 7.

FIG. 30 is referred. An orientation film 6201 is formed for the active matrix substrate in the state of FIG. 29. In this embodiment, a polyimide is used for the orientation film 6201. Next, an opposing substrate is prepared. The opposing substrate is formed of a glass substrate 6202, a light shielding film 6203, an opposing electrode 6204 made from a transparent conductive film, and an orientation film 6205.

In this embodiment, a polyimide resin film in which liquid crystal molecules are orientated parallel to the substrate is used for the orientation film. Note that, after forming the alignment films, a rubbing process is performed to give the liquid crystal molecules a certain fixed pre-tilt angle, bringing them into parallel orientation.

The active matrix substrate and the opposing substrate which have undergone the above steps are then adhered to each other by a publicly known cell assembling process through a sealing material or a spacer (neither is shown). After that, liquid crystal 6206 is injected between the substrates and a sealant (not shown) is used to completely seal the substrates. A transmission type liquid crystal display device as shown in FIG. 30 is thus completed.

While the TFT manufactured according to the above-mentioned steps has a top gate structure, the present invention can be applied to a bottom gate structure and other type structure.

Further, while the display device manufactured according to the above-mentioned steps is a transparent type liquid crystal display device, the present invention can be applied to the reflection type liquid crystal display device.

The present invention can be also applied to the EL display device, which is a self-emissioned type display device using electro luminescence (EL) materials substituted for liquid crystal materials.

Embodiment 9

In this embodiment, an example of manufacturing an EL display device using the present invention substituted for an active matrix type display device is explained in embodiments 1 to 7.

Figure 31A:
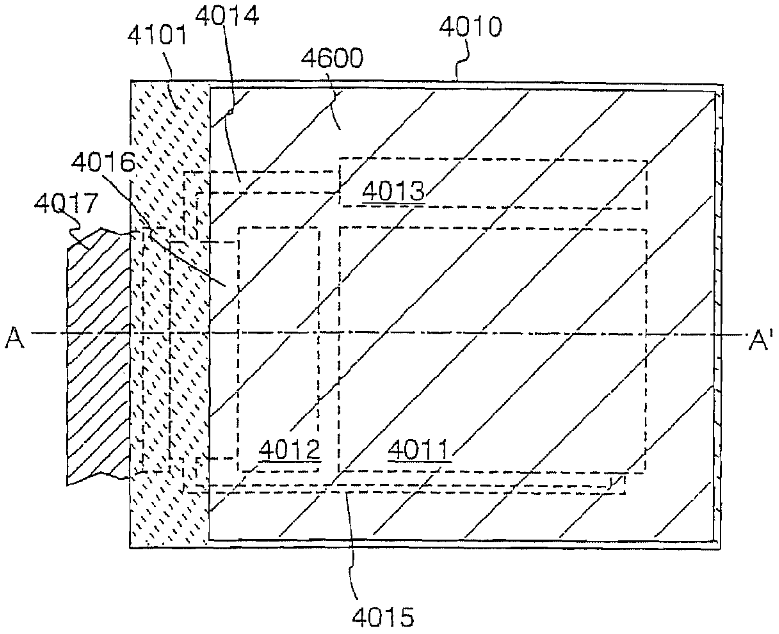
FIGS. 31A and 31B are diagrams showing an example of manufacturing an EL display device in accordance with embodiments 1 to 7.
Figure 31B:
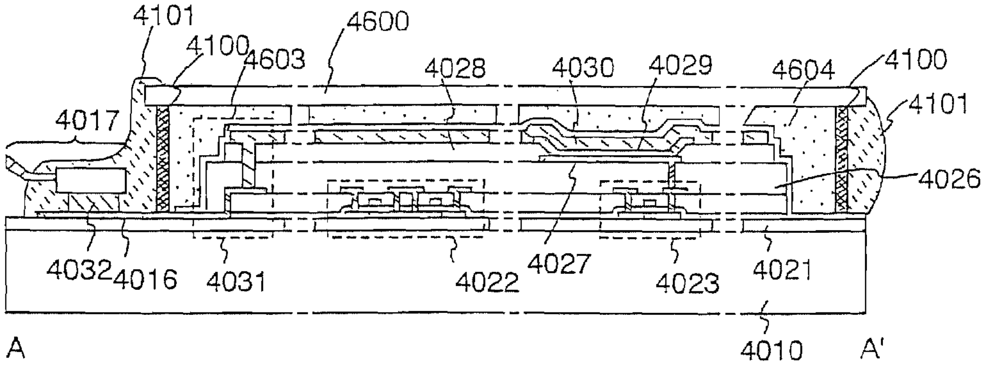

FIG. 31A is a top view of an EL display device using the present invention. FIG. 31B is a cross sectional structure of an EL display device cut the line at A-A' shown in FIG. 31A. In FIG. 31A, reference numeral 4010 is a substrate, reference numeral 4011 is a pixel portion, reference numeral 4012 is a source signal side driver circuit, and reference numeral 4013 is a gate signal side driver circuit. The driver circuits are connected to external equipment, through an FPC 4017, via wirings 4014 to 4016.

A covering material 4600, a sealing material (also referred to as a housing material) 4100, and an airtight sealing material (a second sealing material) 4101 are formed so as to enclose at least the pixel portion, preferably the driver circuits and the pixel portion, at this point.

As shown in FIG. 31B, a driver circuit TFT 4022 (note that a CMOS circuit in which an n-channel TFT and a p-channel TFT are combined is shown in the figure here), a pixel portion TFT 4023 (note that only a TFT for controlling the current flowing to an EL element is shown here) are formed on a base film 4021 on a substrate 4010. The TFTs may be formed using a publicly known structure (a top gate structure or a bottom gate structure).

After the driver circuit TFT 4022 and the pixel portion TFT 4023 are completed, a pixel electrode 4027 is formed on an interlayer insulating film (leveling film) 4026 made from a resin material. The pixel electrode is formed from a transparent conducting film for electrically connecting to a drain of the pixel TFT 4023. An indium oxide and tin oxide compound (referred to as ITO) or an indium oxide and zinc oxide compound can be used as the transparent conducting film. An insulating film 4028 is formed after forming the pixel electrode 4027, and an open portion is formed on the pixel electrode 4027.

An EL layer 4029 is formed next. The EL layer 4029 may be formed having a lamination structure, or a single layer structure, by freely combining known EL materials (such as a hole injecting layer, a hole transporting layer, a light emitting layer, an electron transporting layer, and an electron injecting layer). A known technique may be used to determine which structure to use. Further, EL materials exist as low molecular weight materials and high molecular weight (polymer) materials. Evaporation is used when using a low molecular weight material, but it is possible to use easy methods such as spin coating, printing, and ink jet printing when a high molecular weight material is employed.

In this embodiment, the EL layer is formed by evaporation using a shadow mask. Color display becomes possible by forming emitting layers (a red color emitting layer, a green color emitting layer, and a blue color emitting layer), capable of emitting light having different wavelengths, for each pixel using a shadow mask. In addition, methods such as a method of combining a charge coupled layer (CCM) and color filters, and a method of combining a white color light emitting layer and color filters may also be used. Of course, the EL display device can also be made to emit a single color of light.

After forming the EL layer 4029, a cathode 4030 is formed on the EL layer. It is preferable to remove as much as possible any moisture or oxygen existing in the interface between the cathode 4030 and the EL layer 4029. It is therefore necessary to use a method of depositing the EL layer 4029 and the cathode 4030 in an inert gas atmosphere or within a vacuum. The above film deposition becomes possible in this embodiment by using a multi-chamber method (cluster tool method) film deposition apparatus.

Note that a lamination structure of a LiF (lithium fluoride) film and an Al (aluminum) film is used in this embodiment as the cathode 4030. Specifically, a 1 nm thick LiF (lithium fluoride) film is formed by evaporation on the EL layer 4029, and a 300 nm thick aluminum film is formed on the LiF film. An MgAg electrode, a known cathode material, may of course also be used. The wiring 4016 is then connected to the cathode 4030 in a region denoted by reference numeral 4031. The wiring 4016 is an electric power supply line for imparting a predetermined voltage to the cathode 4030, and is connected to the FPC 4017 through a conducting paste material 4032.

In order to electrically connect the cathode 4030 and the wiring 4016 in the region denoted by reference numeral 4031, it is necessary to form a contact hole in the interlayer insulating film 4026 and the insulating film 4028. The contact holes may be formed at the time of etching the interlayer insulating film 4026 (when forming a contact hole for the pixel electrode) and at the time of etching the insulating film 4028 (when forming the opening portion before forming the EL layer). Further, when etching the insulating film 4028, etching may be performed all the way to the interlayer insulating film 4026 at one time. A good contact hole can be formed in this case, provided that the interlayer insulating film 4026 and the insulating film 4028 are the same resin material.

A passivation film 4603, a filling material 4604, and the covering material 4600 are formed covering the surface of the EL element thus made.

In addition, the sealing material 4100 is formed between the covering material 4600 and the substrate 4010, so as to surround the EL element portion, and the airtight sealing material (the second sealing material) 4101 is formed on the outside of the sealing material 4100.

The filling material 4604 functions as an adhesive for bonding the covering material 4600 at this point. PVC (polyvinyl chloride), epoxy resin, silicone resin, PVB (polyvinyl butyral), and EVA (ethylene vinyl acetate) can be used as the filling material 4604. If a drying agent is formed on the inside of the filling material 4604, then it can continue to maintain a moisture absorbing effect, which is preferable.

Further, spacers may be contained within the filling material 4604. The spacers may be a powdered substance such as BaO, giving the spacers themselves the ability to absorb moisture.

When using spacers, the passivation film 4603 can relieve the spacer pressure. Further, a film such as a resin film can be formed separately from the passivation film to relieve the spacer pressure.

Furthermore, a glass plate, an aluminum plate, a stainless steel plate, an FRP (fiberglass-reinforced plastic) plate, a PVF (polyvinyl fluoride) film, a Mylar film, a polyester film, and an acrylic film can be used as the covering material 4600. Note that if PVB or EVA is used as the filling material 4604, it is preferable to use a sheet with a structure in which several tens of μm of aluminum foil is sandwiched by a PVF film or a Mylar film.

However, depending upon the light emission direction from the EL element (the light radiation direction), it is necessary for the covering material 4600 to have light transmitting characteristics.

Further, the wiring 4016 is electrically connected to the FPC 4017 through a gap between the sealing material 4100, the sealing material 4101 and the substrate 4010. Note that although an explanation of the wiring 4016 has been made here, the wirings 4014 and 4015 are also electrically connected to the PPC 4017 by similarly passing underneath the sealing material 4100 and sealing material 4101.

In this embodiment, the covering material 4600 is bonded after forming the filling material 4604, and the sealing material 4100 is attached so as to cover the lateral surfaces (exposed surfaces) of the filling material 4604, but the filling material 4604 may also be formed after attaching the covering material 4600 and the sealing material 4100. In this case, a filling material injection opening is formed through a gap formed by the substrate 4010, the covering material 4600, and the sealing material 4100. The gap is set into a vacuum state (a pressure equal to or less than $10^{-2}$ Torr), and after immersing the injection opening in the tank holding the filling material, the air pressure outside of the gap is made higher than the air pressure within the gap, and the filling material fills the gap.

Embodiment 10

Figure 32A:
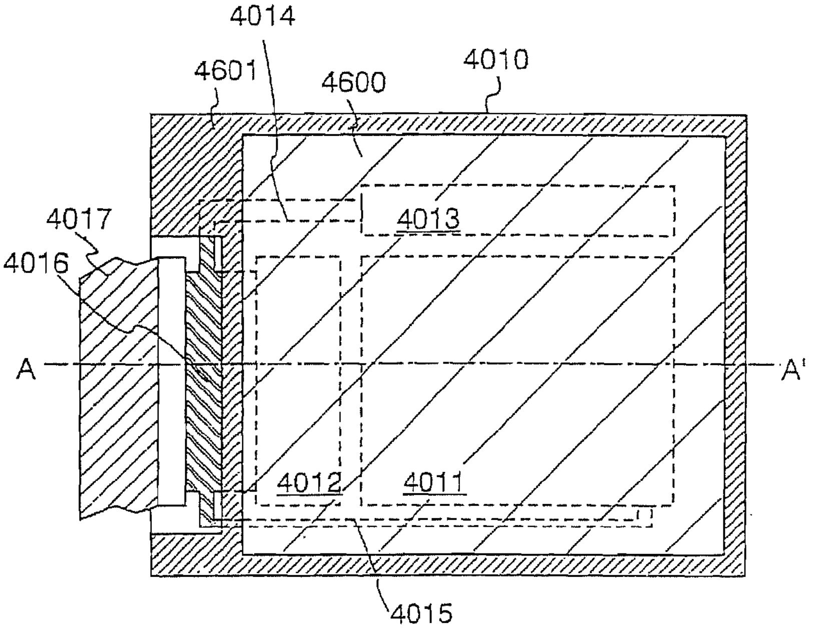
FIGS. 32A and 32B are diagrams showing an example of manufacturing the EL display device in accordance with embodiments 1 to 7.
Figure 32B:
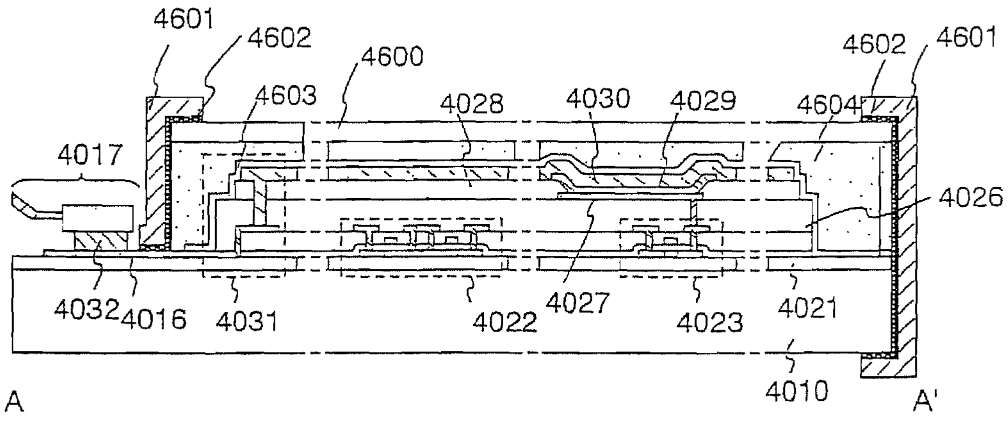

An example of manufacturing an EL display device using the present invention, and which differs from that of embodiment 9, is explained in embodiment 10 using FIGS. 32A and 32B. Portions having the same reference numerals as those in FIGS. 31A and 31B indicate the same portions, and therefore an explanation is omitted.

FIG. 32A is a top view of an EL display device of embodiment 10, and a cross sectional diagram of FIG. 32A cut along a line A-A' is shown in FIG. 32B.

The EL display device is formed in accordance with embodiment 9 until the formation of the passivation film 4603 covering the surface of the EL element.

In addition, the filler material 4604 is formed so as to cover the EL element. The filler material 4604 also functions as a sealant in order to bond the covering material 4600. PVC (polyvinyl chloride), epoxy resin, silicone resin, PVB (polyvinyl butyral), and EVA (ethylene vinyl acetate) can be used as the filler material 4604. If a drying agent is formed on the inside of this filler material 4604, then it can continue to maintain a moisture absorbing effect, and this is preferable.

Furthermore, spacers may be contained within the filler material 4604. The spacers themselves may also be given moisture absorbing characteristics by using a granular substance such as BaO.

When forming the spacers, the passivation film 4603 can relieve spacer pressure. Further, a film such as a resin film may also be formed separately from the passivation film.

Materials such as a glass plate, an aluminum plate, a stainless steel plate, an FRP (fiberglass-reinforced plastic) plate, a PVF (polyvinyl fluoride) film, a Mylar film, a polyester film, and an acrylic film can be used as the covering material 4600. Note that, when using PVB or EVA as the filler material 4604, it is preferable to use a sheet structure in which several tens of μm of aluminum foil is sandwiched by a PVF film or a Mylar film.

Note that, when the direction of light emitted from the EL element is toward the covering material 4604 side, it must possess transparency.

Next, after bonding the covering material 4600 using the filler material 4604, the frame material 4601 is attached so as to cover the side surface (exposed surface) of the filler material 4604. The frame material 4601 is bonded by a sealing material (which functions as a sealant) 4602. It is preferable to use a light hardening resin as the sealing material 4602 at this point, but a thermally hardening resin may also be used provided that the thermal resistance of the EL layer permits. Note that, it is preferable that the sealing material 4602 be a material through which as little moisture and oxygen as possible are transmitted. Further, a drying agent may also be added to the inside of the sealing material 4602.

Further, the wiring 4016 is electrically connected to an FPC 4017 through a gap between the sealing material 4602 and the substrate 4010. Note that, the wiring 4016 is explained here, but the other wirings 4014 and 4015 are also electrically connected to the FPC 4017 by passing under the sealing material 4602.

The covering material 4600 is bonded after the filler material 4604 is formed in embodiment 10, and the frame material 4601 is attached so as to cover the side face (exposed face) of the filler material 4604, but the filler material 4604 may also be formed after attaching the covering material 4600 and the frame material 4601. In this case, a gap formed by the substrate 4010, the covering Material 4600, and the frame material 4601 forms an injection port for the filler material. A vacuum ($10^{-2}$ Torr or less) is formed in the gap, and after the injection port is immersed in a water tank in which the filler material is held, the pressure outside of the gap is increased to be greater than that within the gap, and the filler material fills the inside of the gap.

In accordance with a driving method of the present invention, source line inverting drive and dot inverting drive become possible in a method in which a plurality of source signal lines are driven by one D/A converter circuit. Further, by using a method of inputting a switching control signal of grey-scale electric power supply lines, or of inputting electric power supply voltage of the grey-scale electric power supply lines, the period of the control signal, or the period in which the polarity of the electric power supply voltage of the grey-scale electric power supply lines is inverted, is lengthened, and the load on the circuits can be reduced, as shown in embodiment modes 3, 4, and 6.

In particular, as can be seen by embodiment modes 3, 4, and 6, the period of the control signal, or the period in which the electric power supply voltage of the grey-scale electric power supply lines is inverted, in dot inverting drive with which high image quality is generally expected, can be made equivalent or longer, than the periods in source line inverting drive, which is a large advantage. Most effectively, the period of the control signal, or the period in which the polarity of the electric power supply voltage of the grey-scale electric power supply lines is inverted, in dot inverting drive can be lengthened to be the same as that of a gate line inverting drive method. In other words, dot inverting drive becomes possible at the same period as that of normal gate line inverting drive method.

Embodiment 11

Figure 33:
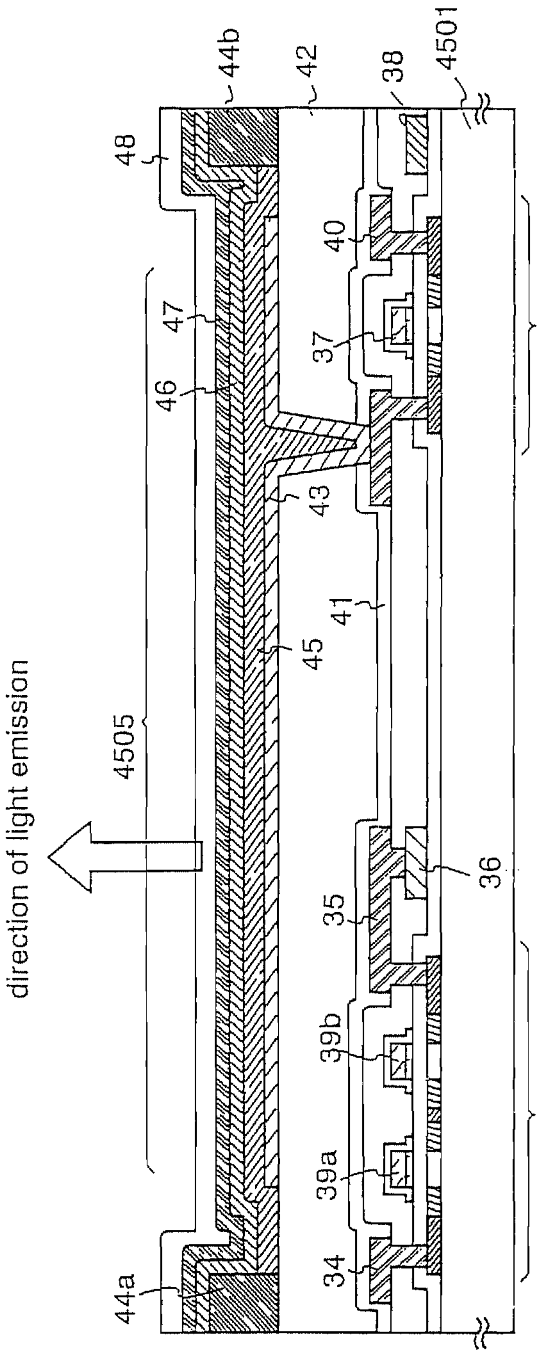
FIG. 33 is a diagram showing an example of manufacturing the EL display device in accordance with embodiments 1 to 7.
Figure 34A:
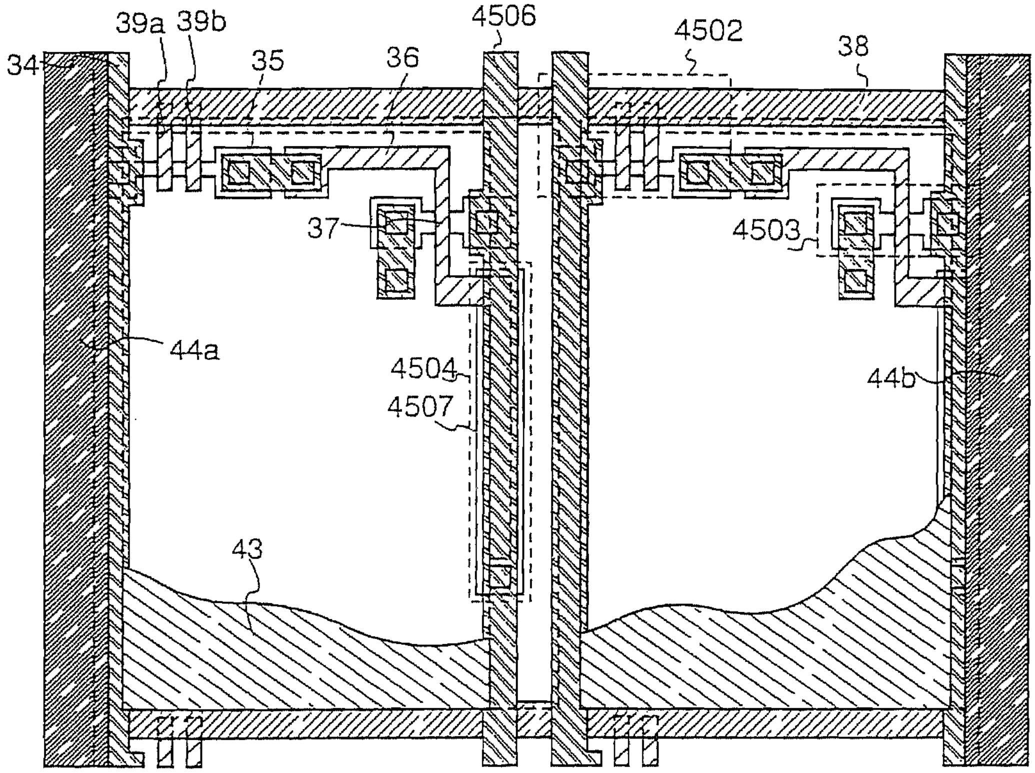
FIGS. 34A and 34B are diagrams showing an example of manufacturing the EL display device in accordance with embodiments 1 to 7.
Figure 34B:
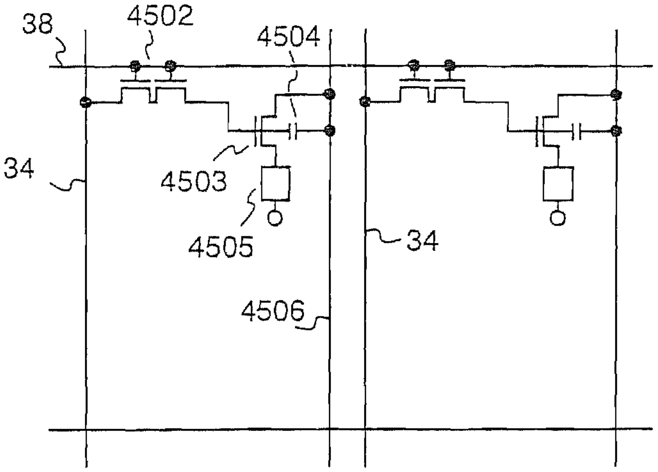

FIG. 33 shows a more detailed cross-sectional structure of the pixel portion. FIG. 34A shows a top view thereof, and FIG. 34B shows a circuit diagram thereof. In FIGS. 33, 34A and 34B, the same components are denoted with the same reference numerals.

In FIG. 33, TFT 4502 for switching provided on a substrate 4501 is formed by using the n-channel TFT formed by publicly known manufacturing method. In this embodiment, the TFT 4502 has a double-gate structure. Since there is no substantial difference in its structure and production process, its description will be omitted. Due to the double-gate structure, there is an advantage in that substantially two TFTs are connected in series to reduce an OFF current value. In this embodiment, TFT 4502 has a double-gate structure; however, it may have a single gate structure, a triple gate structure, or a multi-gate structure having 4 or more gates. Alternatively, a p-channel TFT according to the present invention may be used.

A TFT 4503 for controlling a current is formed by using the n-channel TFT formed by well-known manufacturing method. The source wiring (source signal line) of the TFT 4502 for switching denoted as 34. A drain line 35 of the TFT 4502 for switching is electrically connected to a gate electrode 37 of the TFT for controlling current by wiring 36. Furthermore, a line 38 is a gate wiring (gate signal line) electrically connected to gate electrodes 39*a* and 39*b* of the TFT 4502 for switching.

The TFT 4503 for controlling a current functions for controlling the amount of a current flowing through an EL element, so that the TFT 4503 is likely to be degraded by heat and hot carriers due to a large amount of current flown therethrough. Therefore, the structure of the present invention is very effective, in which an LDD region is provided in the drain side of the TFT 4503 for controlling a current so as to overlap the gate electrode via the gate insulating film.

Furthermore, in this embodiment, the TFT 4503 for controlling a current has a single gate structure. However, it may have a multi-gate structure in which a plurality of TFTs are connected in series. Furthermore, it may also be possible that a plurality of TFTs are connected in parallel to substantially divide a channel formation region into a plurality of parts, so as to conduct highly efficient heat release. Such a structure is effective for preventing degradation due to heat.

As shown in FIG. 34A, a line 36 to be the gate electrode 37 of the TFT 4503 for controlling a current overlaps the power supply line 4506 connected to a drain line 40 of the TFT 4503 for controlling a current via an insulating film in a region 4504. In the region 4504, a capacitor is formed. The capacitor functions for holding a voltage applied to a gate 37 of t TFT 4503 for controlling a current. The capacitor 4504 is formed between the semiconductor film 4507 connected electrically to the power source supply line 4506, gate insulating film (not shown in figures) and the insulating film of same layer, the wiring 36. Further, the capacitance, which is formed from the wiring 36, the same layer (not shown in figures) of first interlayer insulating film and the power source supply line 4506 can be used as a capacitor. The drain of the TFT for controlling a current is connected to a power source supply line (power source line) 4506 so as to be always supplied with a constant voltage.

A first passivation film 41 is provided on the TFT 4502 for switching TFT and the TFT 4503 for controlling a current, and a flattening film 42 that is made of a resin insulating film is formed thereon. It is very important to flatten the step difference due to TFTs by using the flattening film 42. The step difference may cause a light-emitting defect because the EL layer to be formed later is very thin. Thus, it is desirable to flatten the step difference before forming a pixel electrode, so that the EL layer is formed on a flat surface.

Reference numeral 43 denotes a pixel electrode (cathode of an EL element) that is made of a conductive film with high reflectivity and is electrically connected to the drain of the TFT 4503 for controlling a current. As the pixel electrode 43, a low resistant conductive film such as an aluminum alloy film, a copper alloy film, and a silver alloy film, or a layered structure thereof can be preferably used. Needless to say, a layered structure with other conductive films may also be used.

A light-emitting layer 45 is formed in a groove (corresponding to a pixel) formed by banks 44*a* and 44*b* made of an insulating film (preferably resin). In FIG. 34A, a portion of bank is eliminated to clarify the position of the capacitor 4504, so only the bank 44*a* and 44*b* are shown in figures. The banks are provided between the power source supply line 4506 and the source wiring (source signal line) 34 to overlap the portion of the power source supply line 4506 and the source wiring (source signal line) 34. Herein, only two pixels are shown; however, light-emitting layers corresponding to each color R (red), G (green), and B (blue)) may be formed. As an organic EL material for the light-emitting layer, a ð -conjugate polymer material is used. Examples of the polymer material include polyparaphenylene vinylene (PPV), polyvinyl carbazole (PVK), and polyfluorene.

There are various types of PPV organic EL materials. For example, materials as described in "H. Shenk, H. Becker, O. Gelsen, E. Kluge, W. Kreuder and H. Spreitzer, "Polymers for Light Emitting Diodes," Euro Display, Proceedings, 1999, pp. 33-37" and Japanese Laid-Open Publication No. 10-92576 can be used.

More specifically, as a light-emitting layer emitting red light, cyanopolyphenylene vinylene may be used. As a light-emitting layer emitting green light, polyphenylene vinylene may be used. As a light-emitting layer emitting blue light, polyphenylene vinylene or polyalkyl phenylene may be used. The film thickness may be prescribed to be 30 to 150 nm (preferably 40 to 100 nm).

The above-mentioned organic EL materials are merely examples for use as a light-emitting layer. The present invention is not limited thereto. A light-emitting layer, a charge-transporting layer, or a charge injection layer may be appropriately combined to form an EL layer (for light emitting and moving carriers therefor).

For example, in this embodiment, the case where a polymer material is used for the light-emitting layer has been described. However, a low molecular-weight organic EL material may be used. Furthermore, an inorganic material such as silicon carbide can also be used for a charge-transporting layer and a charge injection layer. As these organic EL materials and inorganic materials, known materials can be used.

In this embodiment, an EL layer with a layered structure is used, in which a hole injection layer 46 made of PEDOT (polythiophene) or PAni (polyaniline) is provided on the light-emitting layer 45, and an anode 47 made of a transparent conductive film is provided on the hole injection layer 46. In this embodiment, light generated by the light-emitting layer 45 is irradiated toward the upper surface (the upper direction for the TFT), so that the anode 47 must be transparent to light. As a transparent conductive film, a compound of indium oxide and tin oxide, or a compound of indium oxide and zinc oxide can be used. The transparent conductive film is formed after forming the light-emitting layer and the hole injection layer with low heat resistance, so that the transparent conductive film that can be formed at a possibly low temperature is preferably used.

When the anode 47 is formed, the EL element 4505 is completed. The EL element 4505 refers to a capacitor composed of the pixel electrode (cathode) 43, the light-emitting layer 45, the hole injection layer 46, and the anode 47. As shown in FIG. 34A, the pixel electrode 43 substantially corresponds to the entire area of a pixel. Therefore, the entire pixel functions as an EL element. Thus, a light image display with very high light use efficiency can be performed.

In this embodiment, a second passivation film 48 is further formed on the anode 47. As the second passivation film 48, a silicon nitride film or a silicon nitride oxide film is preferably used. The purpose of the passivation film 48 is to prevent the EL element from being exposed to the outside. That is, the passivation film 48 protects an organic EL material from degradation due to oxidation, and suppresses the release of gas from the organic EL material. Because of this, the reliability of the EL display device is enhanced.

As described above, the EL display panel of the present invention has a pixel portion made of a pixel with a structure as shown in FIG. 33, and includes a TFT for switching having a sufficiently low OFF current value and a TFT for controlling a current that is strong to the injection of hot carriers. Thus, an EL display panel is obtained, which has high reliability and is capable of displaying a satisfactory image.

Embodiment 12

In this embodiment, there will be described a construction in which the structure of the EL element 4505 is reversed in the pixel unit stated in Embodiment 11. Reference will be used FIG. 35. Incidentally, since the points of difference from the structure shown in FIG. 33 lie only in parts of the EL element and the TFT for controlling a current, the others will be omitted from description.

Figure 35:
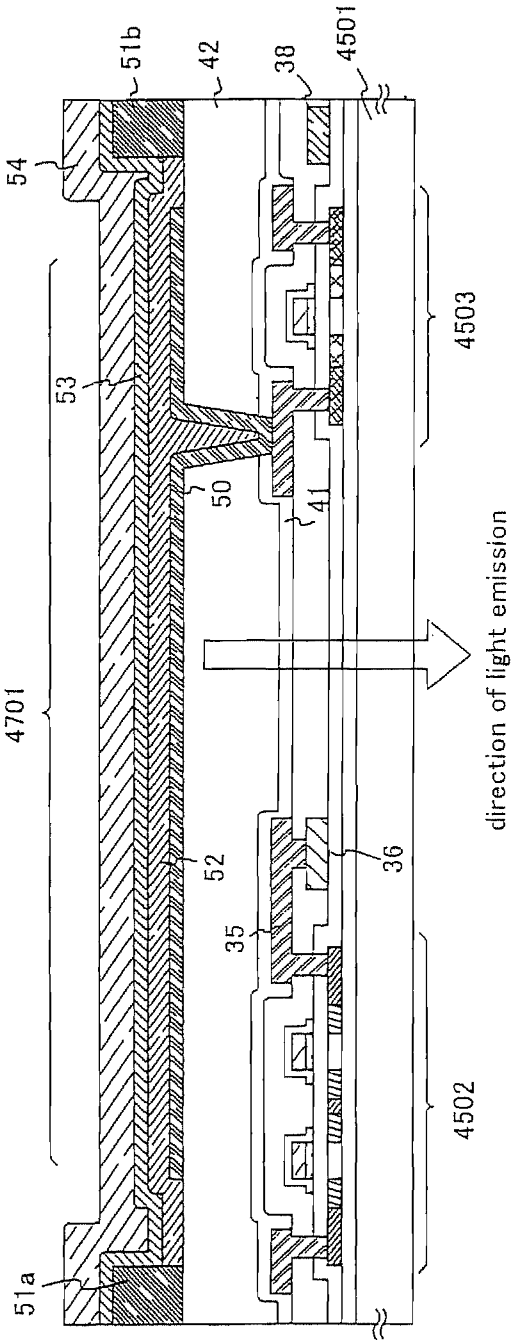
FIG. 35 is a diagram showing an example of manufacturing the EL display device in accordance with embodiments 1 to 7.

Referring to FIG. 35, a TFT for controlling a current 4503 is formed using the p-channel type TFT manufactured by publicly known method.

In this embodiment, a transparent conductive film is employed as a pixel electrode (anode) 50. Concretely, the conductive film is made of a compound of indium oxide and zinc oxide. Of course, a conductive film made of a compound of indium oxide and tin oxide may well be employed.

Besides, after banks 51*a* and 51*b* made of an insulating film have been formed, a luminescent layer 52 made of polyvinylcarbazole is formed on the basis of the application of a solution. The luminescent layer 52 is overlaid with an electron injection layer 53 made of potassium acetylacetonate (expressed as "acacK"), and a cathode 54 made of an aluminum alloy. In this case, the cathode 54 functions also as a passivation film. Thus, an EL element 4701 is formed.

In the case of this embodiment, light generated by the luminescent layer 52 is radiated toward a substrate formed with TFTs as indicated by an arrow.

Embodiment 13

In this embodiment, examples in the case where a pixel has a structure different from that of the circuit diagram shown in FIG. 34(B) will be described with reference to FIGS. 36(A) to 36(C). Here in this embodiment, numeral 4801 designates the source wiring line of a 1P1 for switching 4802, numeral 4803 the gate wiring line of the TFT for switching 4802, numeral 4804 a TFT for controlling a current, numeral 4805 a capacitor, each of numerals 4806 and 4808 a current supply line, and numeral 4807 an EL element.

Figure 36A:
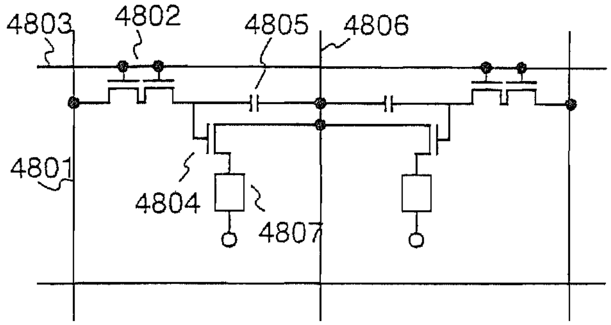
FIGS. 36A to 36C are diagrams showing examples of manufacturing the EL display device in accordance with embodiments 1 to 7.

FIG. 36(A) illustrates the example in the case where the current supply line 4806 is made common to two pixels. That is, this example features that the two pixels are formed in line symmetry with respect to the current supply line 4806. In this case, the number of the supply voltage supply lines can be decreased, so that a pixel unit can be endowed with a still higher definition.

Figure 36B:
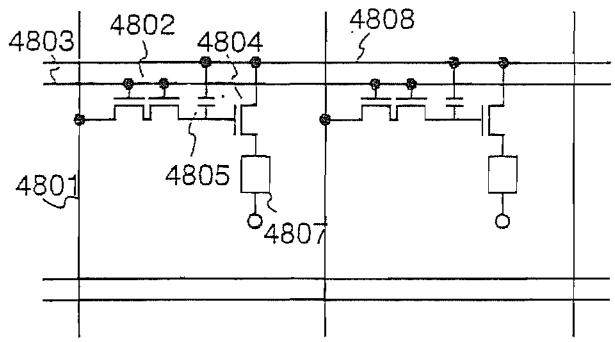
Figure 36C:
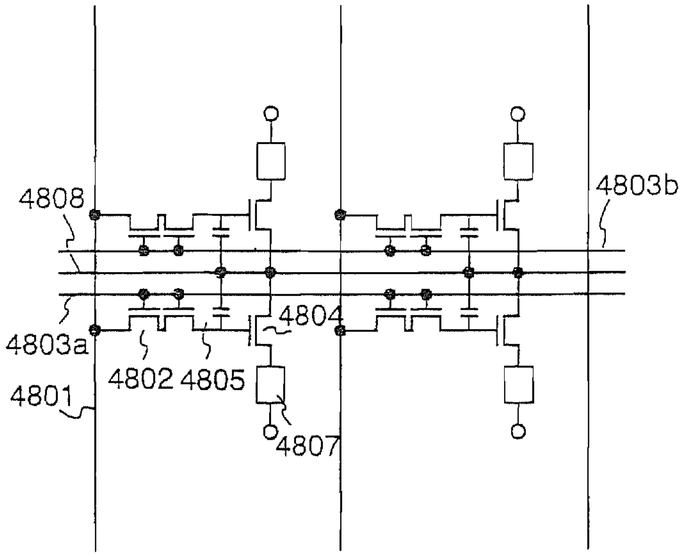

Besides, FIG. 36(B) illustrates the example in the case where the current supply line 4808 is laid in parallel with the gate wiring line (gate signal line) 4803. In the structure of FIG. 36(B), the current supply line 4808 and the gate wiring line (gate signal line) 4803 are laid so as not to overlap each other, but when both the wiring lines are formed in different layers, they can be laid so as to overlap each other through an insulating film. Since, in this case, the supply voltage supply line 4808 and the gate wiring line (gate signal line) 4803 can share an occupation area, a pixel unit can be endowed with a still higher definition.

Embodiment 14

In the structure of Embodiment 11 shown in FIGS. 34(A) and 34(B), the capacitor 4504 is disposed in order to hold the voltage applied to the gate of the TFT 4503 for controlling a current. It is also possible, however, to dispense with the capacitor 4504. In the case of Embodiment 11, the LDD region provided so as to be overlapped by the gate electrode through the gate insulating film in the drain side of the TFT for controlling a current. A parasitic capacitance generally called "gate capacitance" is formed in the overlapping domain. This embodiment features that the parasitic capacitance is positively utilized instead of the capacitor 4504. Since the magnitude of the parasitic capacitance changes depending upon the area of the overlap between the gate electrode and the LDD region, it is determined by the length of the LDD region included in the overlapping domain.

Also in each of the structures of Embodiment 13 as shown in FIGS. 36(A), 36(13) and 36(C), the capacitor 4805 can be similarly dispensed with.

Embodiment 15

In this embodiment, an active matrix type crystal display device incorporated a driving method of this present invention or an electronic device incorporated an EL display device are explained. Mentioned as such electronic device, a portable information terminal (such as electronic book, mobile computer or mobile telephone), video camera, steel camera, personal computer and television and so forth. Examples of the electronic equipment are illustrated in FIGS. 37 to 39. Examples of an active matrix type crystal display device is applied FIGS. 37, 38 and 39, and an EL display unit applied to FIGS. 37 and 38.

Figure 37A:
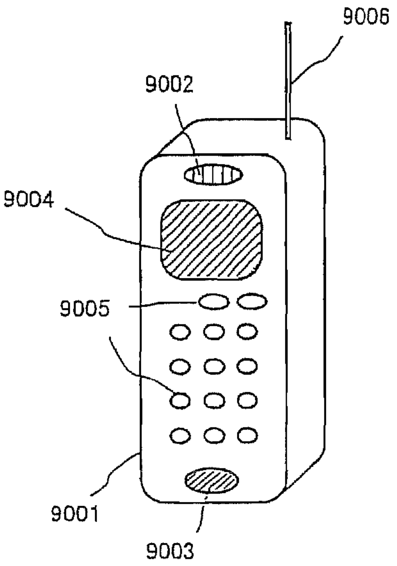
FIGS. 37A to 37F are diagrams showing examples of image display devices.

FIG. 37A shows a mobile phone, which includes the body 9001, a sound output unit 9002, a sound input unit 9003, display unit 9004, an operating switch 9005, an antenna 9006. The present invention can be applied to a display unit 9004.

Figure 37B:
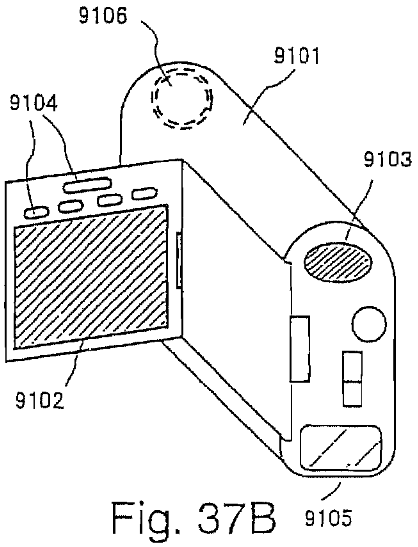

FIG. 37B shows a video camera, which includes the body 9101, a display unit 9102, a sound input unit 9103, operating switches 9104, a battery 9105, and an image receiving unit 9106. The present invention can be applied to a display unit 9102.

Figure 37C:
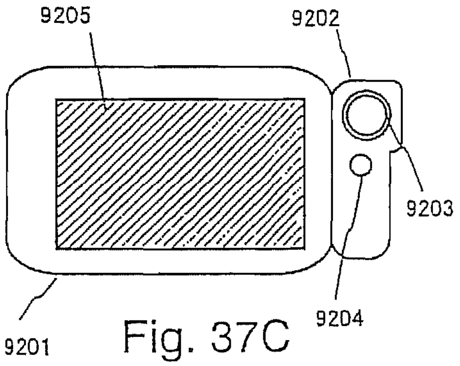

FIG. 37C shows a mobile computer, a kind of a personal computer or a portable information terminal which includes the body 9201, camera unit 9202, an image receiving unit 9203, an operating switch 9204, a display unit 9205. The present invention can be applied to a display unit 9205.

Figure 37D:
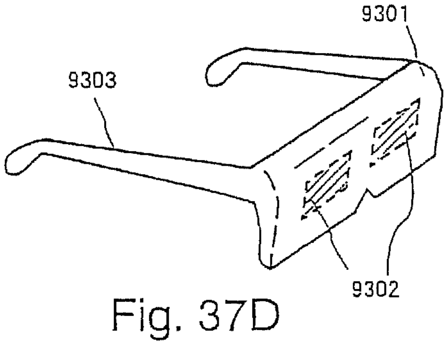

FIG. 37D shows a head mounted display (goggle type display), which includes the body 9301, a display unit 9302, arm portion 9303. The present invention can be applied to the display unit 9302.

Figure 37E:
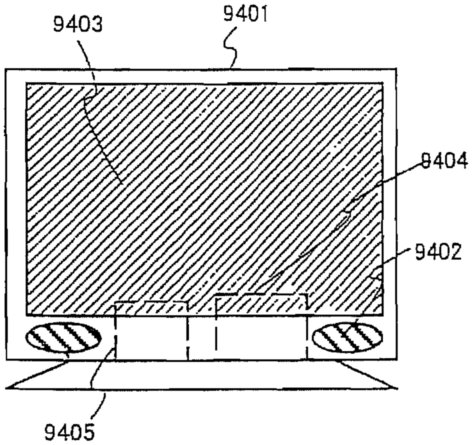

FIG. 37E shows a rear type projector, which includes the body 9401, a speaker 9402, a display unit 9403, a reception device 9404 and an amplifier 9405 and so forth. The present invention can be applied the display unit 9403.

Figure 37F:
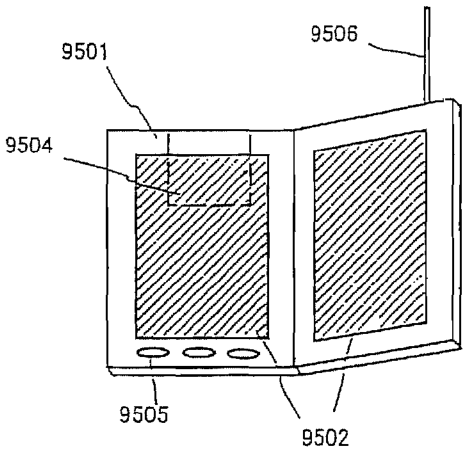

FIG. 37F shows a portable book, which includes the body 9501, display unit 9502, the record medium 9504, an operating switch 9505 and an antenna 9506. This book displays a data recorded in mini disc (MD) and DVD (Digital Versatile Disc), and a data received by an antenna. The present invention can be applied these display unit 9502.

Figure 38A:
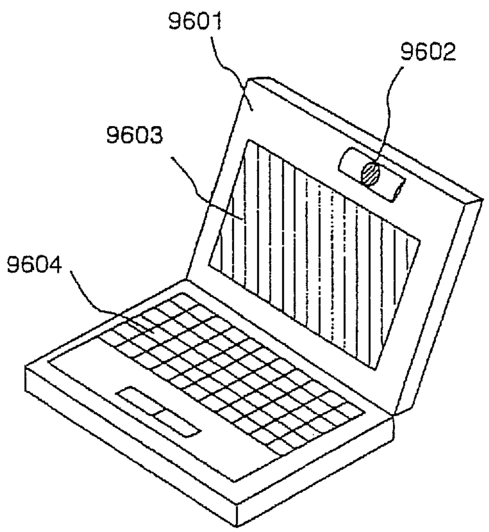
FIGS. 38A to 38D are diagrams showing examples of image display devices.

FIG. 38A shows a personal computer, which includes the body 9601, an image receiving unit 9602, a display unit 9603 and a keyboard 9604. The present invention can be applied this display units 9603.

Figure 38B:
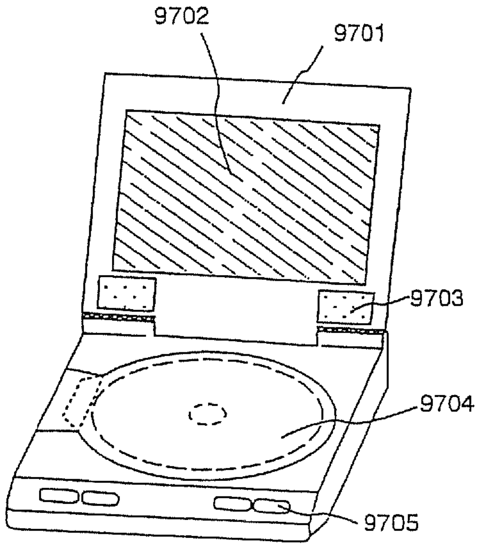

FIG. 38B shows a player using recording medium (herein after described as a recording medium) recorded a program, which includes the body 9701, the display unit 9702, the speaker unit 9703, the record medium 9704, the operating switches 9705. This equipment can be realized music appreciation, movie appreciation, playing game and Internet by using the DVD, CD etc. as a recording medium. The present invention can be applied display unit 9702.

Figure 38C:
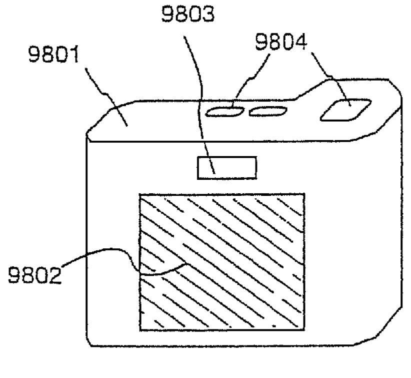
Figure 38D:
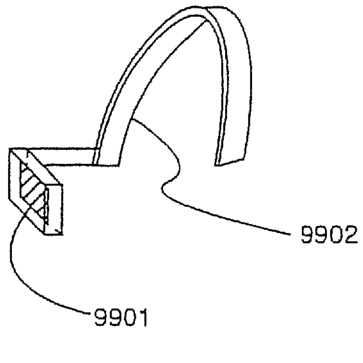

FIG. 38C shows a digital camera, which includes the body 9801, display unit 9802, a view finder 9803, an operating switch 9804 and an image receiving unit (not shown). The present invention can be applied display unit 9802.

Figure 39A:
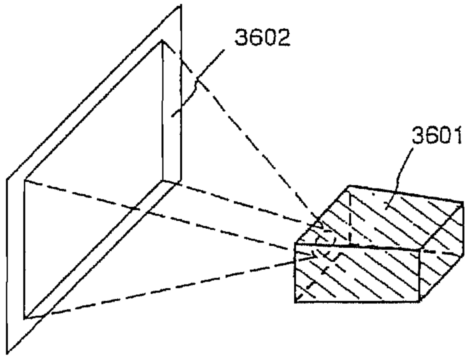
FIGS. 39A to 39D are diagrams showing a composition of a projecting type liquid crystal display device.

FIG. 39A shows a front type projector, which includes the display unit 3601, and a screen 3602.

Figure 39B:
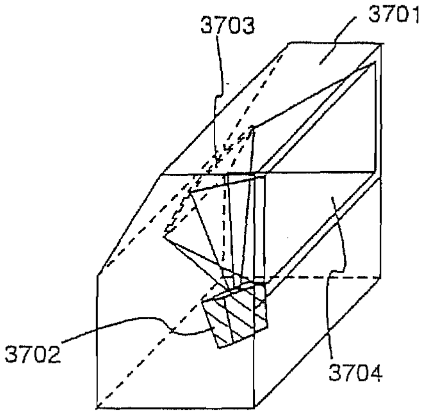

FIG. 39B shows a rear type projector, which includes the body 3701, the display unit 3702, a mirror 3703 and a screen 3704.

Figure 39C:
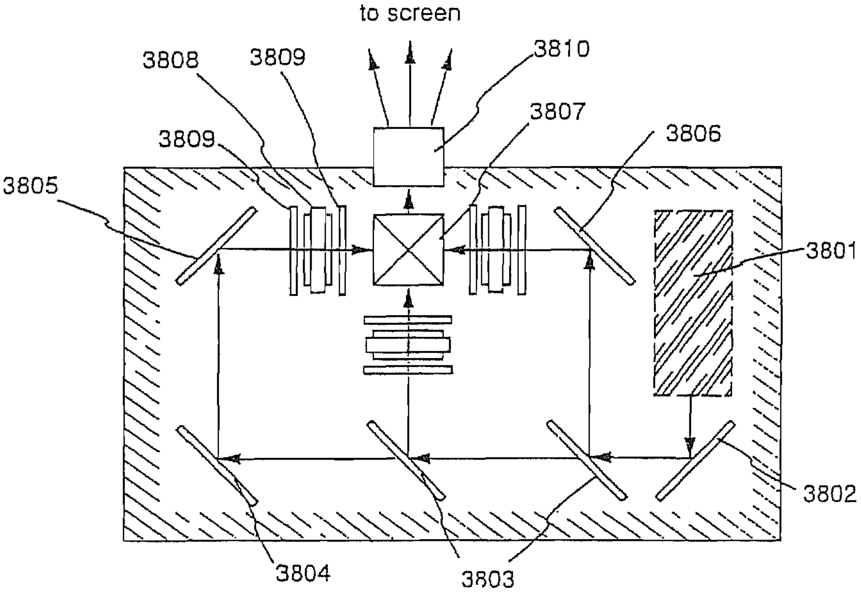

Illustrated in FIG. 39C is an example of the structure of the projection units 3601 and 3702 that are shown in FIGS. 39A and 39B, respectively. Each of the projection units 3601 and 3702 comprises a light source optical system 3801, mirrors 3802 and 3804 to 3806, diachronic mirrors 3803, a prism 3807, liquid crystal display units 3808, phase difference plates 3809, and a projection optical system 3810. The projection optical system 3810 is constructed of an optical system including projection lenses. An example of a three plate system is shown in this embodiment, but there are no special limitations. For instance, an optical system of single plate system is acceptable. Further, the operator may suitably set optical systems such as optical lenses, polarizing film, film to regulate the phase difference, IR film, within the optical path shown by the arrows in FIG. 39C. The present invention can be applied to a liquid crystal display device 3808.

Figure 39D:
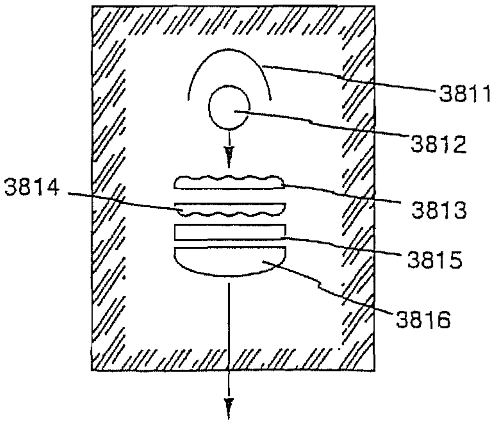

In addition, FIG. 39D shows an example of the structure of the light source optical system 3801 of FIG. 39C. In this embodiment, the light source optical system 3801 is composed of a reflector 3811, a light source 3812, lens arrays 3813 and 3814, a polarizing conversion element 3815, and a condenser lens 3816. Note that the light source optical system shown in FIG. 39D is an example, and it is not limited to the illustrated structure. For example, the operator may suitably set optical systems such as optical lenses, polarizing film, film to regulate the phase difference, and IR film.

As described above, the present invention has very wide applications and is applicable to electronic equipment using an image display unit in all fields.

What is claimed is:

1. A semiconductor device comprising:

a pixel portion and a source signal line driver circuit over a first substrate, wherein the source signal line driver circuit comprises:

a first circuit connected to a plurality of digital image signal lines and a plurality of selection signal lines, the first circuit configured to gather input digital image signals for N-pixels together and convert the input digital image signals for N-pixels into a digital image signal for each pixel according to selection signals;

a second circuit connected to the first circuit and a plurality of grey-scale electric power supply lines, the second circuit configured to convert the digital image signal output from the first circuit into an analog image signal; and a third circuit connected to the second circuit, the plurality of selection signal lines connected to the first circuit, and a plurality of source signal lines, the third circuit comprising a plurality of switches.

2. The semiconductor device according to claim 1, wherein the source signal line driver circuit further comprises a shift register portion and a latch.

3. The semiconductor device according to claim 1, wherein the first circuit is a parallel/serial converter circuit.

4. The semiconductor device according to claim 1, wherein the first circuit comprises NAND circuits.

5. The semiconductor device according to claim 1, wherein the second circuit is a D/A converter circuit.

6. The semiconductor device according to claim 1, wherein the third circuit is a source line selection circuit.

7. The semiconductor device according to claim 1, wherein the third circuit is further input with inversions of the selection signals input to the first circuit.

8. A semiconductor device comprising:

a pixel portion and a source signal line driver circuit over a first substrate, wherein the source signal line driver circuit comprises:

a first circuit configured to gather input digital image signals for a plurality of pixels together and convert the input digital image signals for N-pixels into a digital image signal for each pixel according to first to N-th selection signals;

a second circuit connected to the first circuit and a plurality of grey-scale electric power supply lines, the second circuit configured to be input with grey-scale electric power supply voltages and the digital image signal output from the first circuit and output an analog image signal; and a third circuit configured to select first to N-th source signal lines according to the first to N-th selection signals, wherein the first to N-th source signal lines are selected sequentially and alternately, and wherein first to N-th selection signal lines are connected to both the first circuit and the third circuit.

9. The semiconductor device according to claim 8, wherein the source signal line driver circuit further comprises a shift register portion and a latch.

10. The semiconductor device according to claim 8, wherein the first circuit is a parallel/serial converter circuit.

11. The semiconductor device according to claim 8, wherein the first circuit comprises NAND circuits.

12. The semiconductor device according to claim 8, wherein the second circuit is a D/A converter circuit.

13. The semiconductor device according to claim 8, wherein the third circuit is a source line selection circuit.

14. The semiconductor device according to claim 8, wherein the third circuit comprises transfer gates.

15. The semiconductor device according to claim 8, wherein the third circuit is further input with inversions of the first to N-th selection signals.

16. A semiconductor device comprising:

a pixel portion, a source signal line driver circuit, and a gate signal line driver circuit over a first substrate, a second substrate over the pixel portion;

a first sealing material interposed between the first substrate and the second substrate, and surrounding the pixel portion, the source signal line driver circuit, and the gate signal line driver circuit; and a second sealing material provided outside of the first sealing material, wherein the second sealing material is in contact with at least a side surface of the second substrate, and wherein the source signal line driver circuit comprises:

a shift register portion;

a latch circuit portion connected to the shift register portion and a plurality of digital image signal lines;

a circuit connected to the plurality of digital image signal lines and a plurality of selection signal lines, the circuit configured to gather input digital image signals for N-pixels together and convert the input digital image signals for N-pixels into a digital image signal for each pixel according to selection signals;

a D/A converter circuit connected to the circuit and a plurality of grey-scale electric power supply lines; and a source line selection circuit connected to the D/A converter circuit, the plurality of selection signal lines connected to the circuit, and a plurality of source signal lines.

17. The semiconductor device according to claim 16, wherein the second sealing material covers an FPC over the first substrate.

18. The semiconductor device according to claim 16, wherein the circuit is a parallel/serial converter circuit.

19. The semiconductor device according to claim 16, wherein the circuit comprises NAND circuits.

20. The semiconductor device according to claim 16, wherein the source line selection circuit is further input with inversions of the selection signals input to the circuit.

* * * * *